US012254697B2

(12) United States Patent
Ramanathan et al.

(10) Patent No.: US 12,254,697 B2
(45) Date of Patent: Mar. 18, 2025

(54) VEHICULAR ACCESS CONTROL BASED ON VIRTUAL INDUCTIVE LOOP

(71) Applicant: ObjectVideo Labs, LLC, Tysons, VA (US)

(72) Inventors: Narayanan Ramanathan, Chantilly, VA (US); Allison Beach, Leesburg, VA (US); Robert S. Hastings, Tysons, VA (US); Weihong Yin, Great Falls, VA (US); Sima Taheri, McLean, VA (US); Dana Eubanks, Herndon, VA (US); Kyoung-Jin Park, Ellicott City, MD (US); Donald Gerard Madden, Columbia, MD (US); Gang Qian, McLean, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 0 days.

(21) Appl. No.: 17/863,075

(22) Filed: Jul. 12, 2022

(65) Prior Publication Data
US 2023/0046840 A1 Feb. 16, 2023

Related U.S. Application Data

(60) Provisional application No. 63/226,288, filed on Jul. 28, 2021.

(51) Int. Cl.
*G06V 20/52* (2022.01)
*E01F 13/04* (2006.01)
(Continued)

(52) U.S. Cl.
CPC .............. *G06V 20/52* (2022.01); *E01F 13/04* (2013.01); *G06T 7/246* (2017.01); *G06T 7/60* (2013.01);
(Continued)

(58) Field of Classification Search
CPC .. G06V 20/52; G06V 10/776; G06V 2201/08; G06T 7/80; G06T 7/246;
(Continued)

(56) References Cited

U.S. PATENT DOCUMENTS 7,801,330 B2    9/2010  Zhang et al.
10,169,665 B1 *  1/2019  Zhang ....................... G06T 7/80
(Continued)

OTHER PUBLICATIONS

Bradski, Gary, "The OpenCV Library," Dr. Dobb's Journal of Software Tools, Nov. 1, 2000, 5 pages.
(Continued)

*Primary Examiner* — Christopher S Kelley
*Assistant Examiner* — Asmamaw G Tarko
(74) *Attorney, Agent, or Firm* — Fish & Richardson P.C.

(57) ABSTRACT

Methods, systems, and apparatus, including computer programs encoded on computer storage media, for monitoring events using a Virtual Inductive Loop system. In some implementations, image data is obtained from cameras. A region depicted in the obtained image data is identified, the region comprising lines spaced by a distance that satisfies a distance threshold. For each line included in the region: an object depicted crossing the line is determined whether to satisfy a height criteria indicating that the line is activated. In response to determining that an object depicted crossing the line satisfies the height criteria, an event is determined to have likely occurred using data indicating (i) which lines of the lines were activated and (ii) an order in which each of the lines were activated. In response to determining that an event likely occurred, actions are performed using at least some of the data.

20 Claims, 32 Drawing Sheets

(51) Int. Cl.
    *G06T 7/246*     (2017.01)
    *G06T 7/60*     (2017.01)
    *G06T 7/73*     (2017.01)
    *G06T 7/80*     (2017.01)
    *G08B 13/00*     (2006.01)
    *H04N 7/18*     (2006.01)
    *G06V 10/776*     (2022.01)

(52) U.S. Cl.
    CPC ................. *G06T 7/73* (2017.01); *G06T 7/80* (2017.01); *H04N 7/181* (2013.01); *G06T 2207/30232* (2013.01); *G06V 10/776* (2022.01); *G06V 2201/08* (2022.01); *G08B 13/00* (2013.01)

(58) Field of Classification Search
    CPC ... G06T 7/73; G06T 7/60; G06T 2207/30232; E01F 13/04; H04N 7/181; G08B 13/00
    USPC .......................... 348/156; 382/103; 345/633
    See application file for complete search history.

(56) References Cited

U.S. PATENT DOCUMENTS

| | | | | |
|---|---|---|---|---|
| 10,565,733 | B1* | 2/2020 | Zhang | G06T 7/20 |
| 11,113,841 | B1* | 9/2021 | Zelenskiy | G06T 7/74 |
| 11,182,598 | B2* | 11/2021 | Sriram | G06V 40/20 |
| 11,443,555 | B2* | 9/2022 | Sriram | G06V 10/147 |
| 2016/0110623 | A1* | 4/2016 | Kim | G06T 7/246 |
| | | | | 382/103 |
| 2016/0350921 | A1* | 12/2016 | Bataller | G06T 7/75 |
| 2017/0286778 | A1* | 10/2017 | Madden | G06V 20/52 |
| 2018/0301031 | A1* | 10/2018 | Naamani | G06V 20/52 |
| 2019/0294889 | A1* | 9/2019 | Sriram | G06F 18/24143 |
| 2020/0302161 | A1* | 9/2020 | Sriram | G06T 7/246 |
| 2023/0016568 | A1* | 1/2023 | Sriram | G06V 40/20 |

OTHER PUBLICATIONS

Goodfellow et al., "Deep Learning," MIT Press, 2016, [retrieved on Feb. 9, 2023], retrieved from: URL< http://www.deeplearningbook.org>, 2 pages.

Guillou et al., "Using vanishing points for camera calibration and coarse 3D reconstruction from a single image," The Visual Computer, 2000, 16:396-410.

Klose, Bill, "What are differences between vehicle detection technologies," Machine Design, Sep. 20, 2017, [retrieved on Feb. 9, 2023], retrieved from: URL<https://www.machinedesign.com/mechanical-motion-systems/article/21835963/what-are-the-differences-between-vehicledetection-technologies>, 11 pages.

Orghidan et al., "Camera calibration using two or three vanishing points," Proceedings of the Federated Conference on Computer Science and Information Systems (FedCSIS), 2012, pp. 123-130.

Redmon et al., "YOLO9000: Better, Faster, stronger," Computer Vision Foundation, 2016, pp. 7263-7271.

Smith, Ray and Google Inc., "An Overview of the Tesseract OCR Engine," Proc. Ninth Int. Conference on Document Analysis and Recognition (ICDAR), IEEE Computer Society, 2007, pp. 629-633.

Zhi-Qiang et al., "Mean-Shift Tracking Algorithm with Improved Background-Weighted Histogram." 2014 Fifth International Conference on Intelligent Systems Design and Engineering Applications, IEEE, 2014, pp. 597-602.

Zhu et al., "A Review of Video Object Detection: Datasets, Metrics and Methods of video object detection; deep learning-based video object detection," Applied Sciences, Nov. 2020, 10:7834, 25 pages.

* cited by examiner

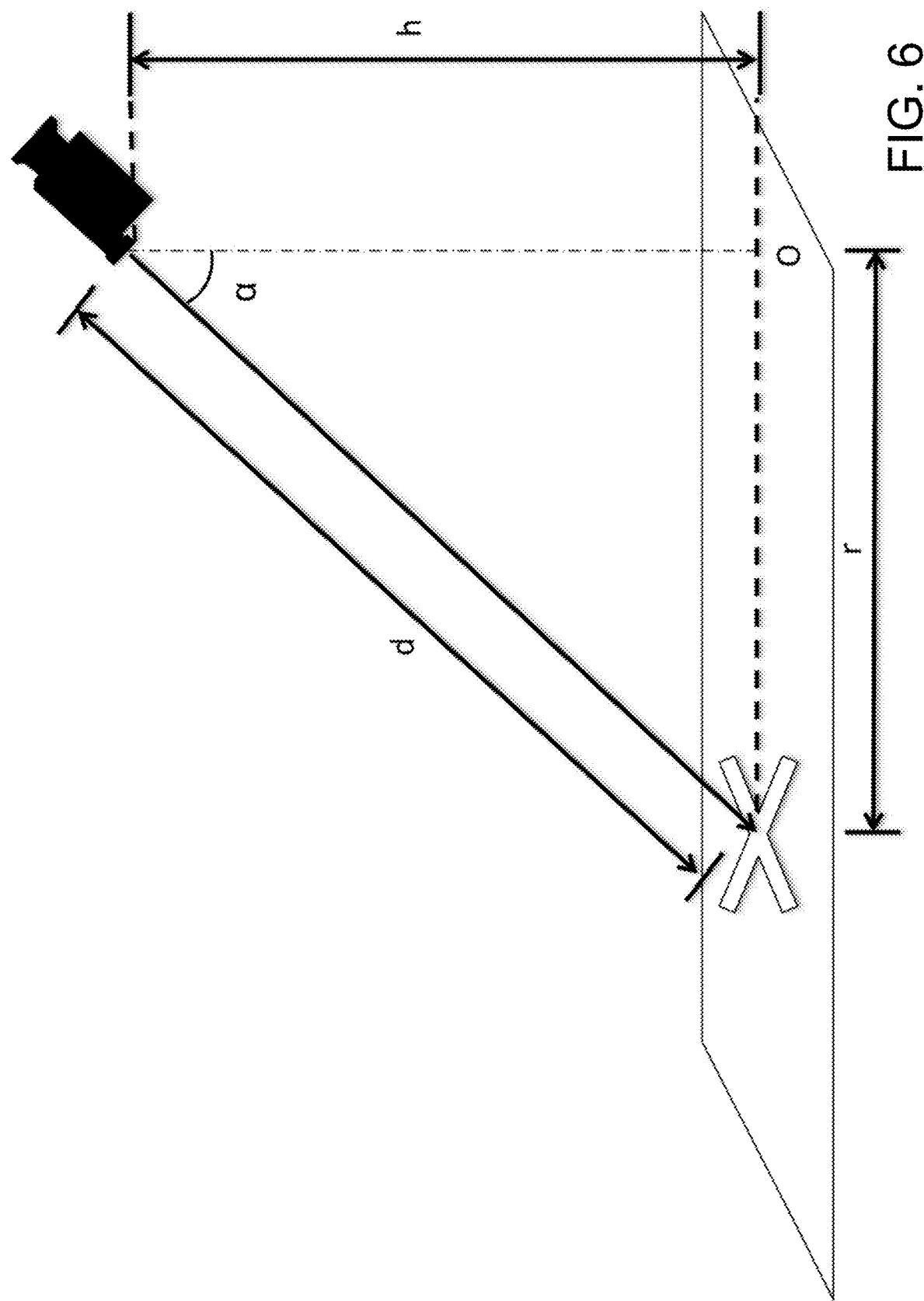

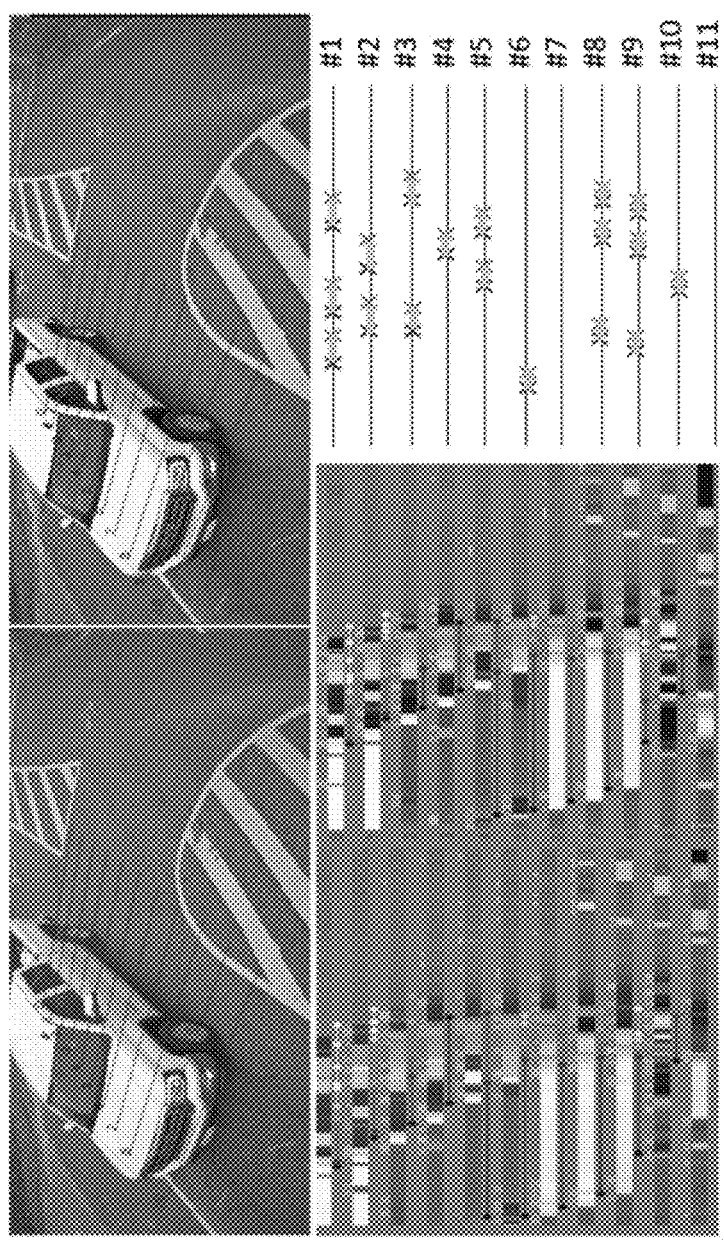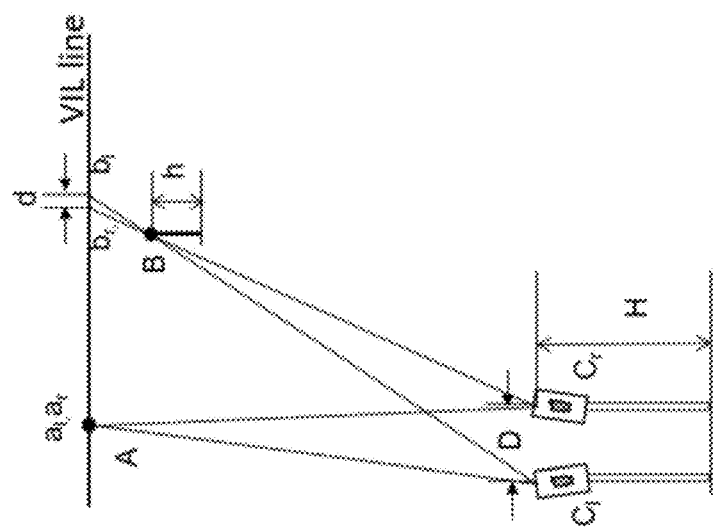
FIG. 21

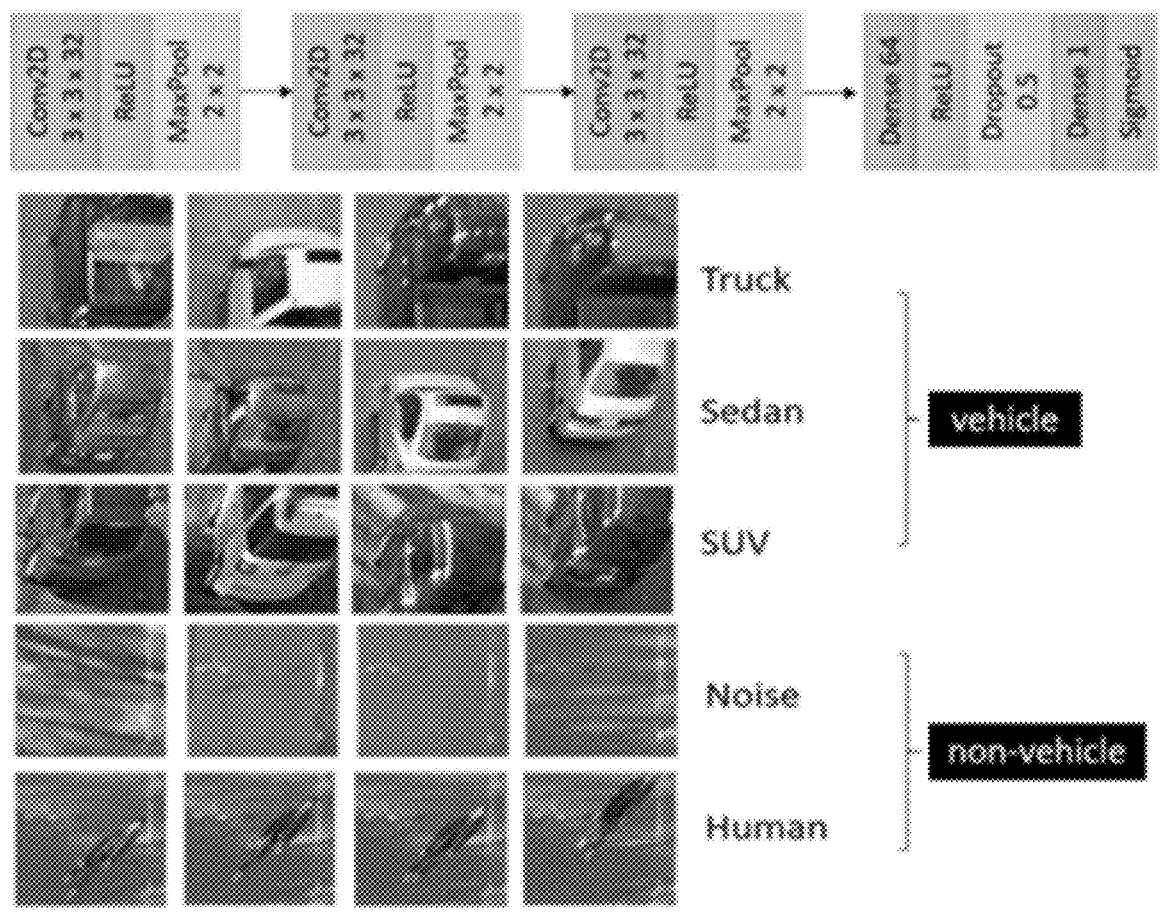
(a)
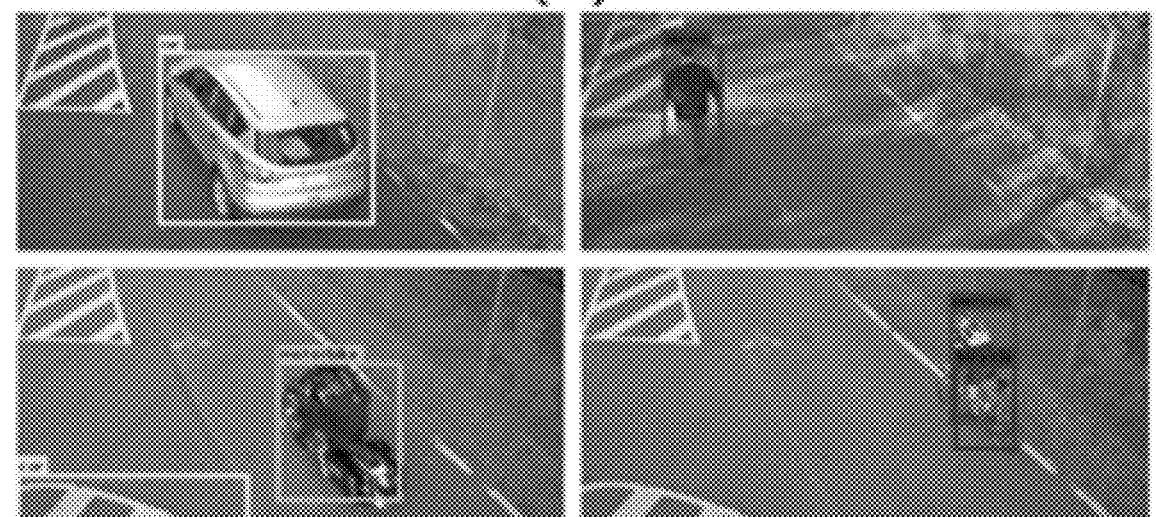
(b)
FIG. 25

2700

Obtaining, by one or more processors, image data from one or more cameras
2702

Identifying, by the one or more processors, a region in the image data, the region comprising a plurality of lines spaced a predetermined distance apart
2704

For each line in the region: determining, by the one or more processors, an activated line based on whether an object that satisfies a height criteria is detected in the line
2706

In response to determining that the object that is detected in the line satisfies the height criteria, determining, by the one or more processors, whether an event occurred based on (i) which of the lines were activated and (ii) an order in which each of the activated lines were activated.
2708

FIG. 27

VEHICULAR ACCESS CONTROL BASED ON VIRTUAL INDUCTIVE LOOP

CROSS-REFERENCE TO RELATED APPLICATION

This application claims the benefit of U.S. Provisional Application No. 63/226,288, filed on Jul. 28, 2021, the contents of which are incorporated by reference herein.

GOVERNMENT RIGHTS IN INVENTION

This invention was made with government support under #N00014-17-C-7030 awarded by the Office of Naval Research. Accordingly, the U.S. Government has certain rights in the invention.

TECHNICAL FIELD

The technology in this application relates generally to access control systems.

BACKGROUND

Detecting the presence of a moving object, such as a person, animal, or vehicle is important for many applications, including home or retail surveillance, security, marketing analysis, traffic analysis, people counting, vehicle counting, wild life tracking, etc. Video surveillance cameras, inductive loops, motion detectors, light curtains, etc., have typically been deployed to monitor for a moving object under a wide variety of settings such as access control points, retail environments, loading docks, driveways, backyards, and places of high security such as airports, train stations, nuclear facilities, army bases, naval bases, air force bases, etc. Each of these technologies have are limited in various aspects. For example, use of an inductance loop is often used to detect the presence of a vehicle at a stop light or at an entrance through a security barrier. However, installation of an inductance loop is typically complicated, requiring burying the inductance loop under a roadway. Further, it can be difficult to set the inductance loop to achieve the correct sensitivity—an insensitive inductance loop may result in a long wait for a vehicle operator, while an overly sensitive inductance loop may trigger false vehicle detections, and can result in unwanted or even dangerous actions responsive thereto. For example, a barrier gate arm at a security barrier may close on a car previously cleared to pass due to detection of a second car in a neighboring lane. Bicycles may be undesirably detected and a barrier gate arm may close on the bicyclist.

Systems other than an inductance loop may also be used to monitor a location. For example, a video camera may be used to detect loitering, left behind objects, count people, etc. Analysis of a single image or video obtained from one camera is useful in many applications, but incurs challenges in other applications. When attempting to detect the presence of a vehicle, ground shadows and spotlights formed by vehicle headlights may be processed as edges during video analysis, which may result in incorrect object detection.

Use of multiple video cameras can address inaccuracies in single camera video analytics, but multiple video camera systems are often computationally expensive. In addition, multi-camera video analytics often require precise and overly complex installation, mistakes in which can lead to poor results. Motion detectors are known to trigger false alarms in outdoor environments due to inclement weather conditions, moving tree branches, and the like. The motion detectors are typically oblivious to the types of objects detected. In another example, light curtains require precise alignment of LED transmitters and receivers. As such, the light curtains are not typically adopted for residential and commercial settings.

SUMMARY

In some implementations, a Virtual Inductive Loop (VIL) system provides real time video analytics for monitoring vehicular events at an access point. The VIL system can rely on various cameras and video analytics to determine and monitor the vehicular events. The cameras can be calibrated for different real world environments to determine geometric properties of these environments. Once calibrated, the VIL system and the cameras can accurately monitor the access points using a set of VIL lines that are virtually overlaid at the access point in the image data. The VIL system can acquire the image data continuously and upon detecting a change on a VIL line, the VIL system can invoke a process for determining and monitoring the vehicular event. Once the VIL system determines the vehicular event at the access point, the VIL system can apply one or more deep learning models to verify the detected vehicular event using the image data.

In one general aspect, a method is performed. The method includes: obtaining image data from one or more cameras; identifying a region depicted in the obtained image data, the region comprising a plurality of lines spaced by a distance that satisfies a distance threshold; for each line in the plurality of lines included in the region: determining whether an object depicted crossing the line satisfies a height criteria indicating that the line is activated; in response to determining, for at least one of the lines in the plurality of lines, that an object depicted crossing the line satisfies the height criteria, determining whether an event likely occurred using data indicating (i) which lines of the plurality of lines were activated and (ii) an order in which each of the lines were activated; and in response to determining that an event likely occurred, performing one or more actions using at least some of the data.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. For example, one embodiment includes all the following features in combination.

In some implementations, prior to identifying the region depicted in the obtained image data, performing calibration of the one or more cameras, the method includes: identifying a first mat and a second mat depicted in the region in the image data, the first and second mat displaying a visible pattern that aid the one or more cameras to detect a location of the first mat and the second mat; detecting the visible pattern on the first mat and the second mat in the image data;

estimating physical locations of the visible pattern on the first mat and the second mat using the detected visible pattern; in response to estimating the physical locations of the visible pattern, determining camera parameters of the one or more cameras using the estimated physical locations of the visible pattern on the first mat and the second mat, wherein the camera parameters comprise one or more of a focal length, a tilt angle, and a roll angle; obtaining second image data from the one or more cameras; and validating, using the obtained second image data, the camera parameters and the physical locations of the visible pattern.

In some implementations, identifying the region in the obtained image data further includes: obtaining initial image data from the one or more cameras; projecting one or more identifiers in the initial image data; determining, for each of the one or more projected identifiers in the initial image data, a location of the region in which the identifier is depicted; generating, for each of the locations of the one or more projected identifiers in the region, an initial line of a plurality of initial lines in the initial image data with respect to the locations of the one or more projected identifiers at the region; determining a respective projected ground level plane in the initial image data; and determining a first line from the plurality of initial lines by projecting the initial line of the plurality of initial lines onto the respective projected ground level plane in the region in the image data.

In some implementations, the method includes: the one or more cameras comprises two or more cameras; and determining the lines that were activated based on whether the object that satisfies the height criteria is detected in the lines further comprises: identifying (i) one or more first distinctive features along a first image plane of one or more lines of the plurality of lines from a first camera of the two or more cameras and (ii) one or more second distinctive features along a second image plane of one or more lines of the plurality of lines from a second camera of the two or more cameras; matching the one or more first distinctive features along the first image plane from the first camera to at least some of the one or more second distinctive features along the second image plane from the second camera; estimating a plurality of cross sectional outlines of an object that intersected with the plurality of lines using the matched first distinctive features and the matched second distinctive features, wherein the plurality of cross sectional outlines comprise a height and a width of the object that intersected with the plurality of lines; determining, for each cross sectional outline of the plurality of cross sectional outlines of the object, whether the cross sectional outline satisfies the height criteria; and in response to determining at least some of the cross sectional outlines of the object satisfy the height criteria, the method comprises identifying the lines of the plurality of lines intersected by the object as activated.

In some implementations, the method includes: in response to determining at least some of the cross sectional outlines of the object satisfy the height criteria, identifying a type of the object that intersected with the lines that were activated; in response to identifying the type of the object that intersected with the lines that were activated: determining, using the type of the object, whether to open a security gate; and in response to determining to open the security gate, transmitting a notification to a security gate causing the security gate to open that allows passage of the object; or in response to determining to not open the security gate, transmitting a notification to the security gate causing the security gate to remain closed to prevent passage of the object.

In some implementations, identifying the one or more first and second distinctive features comprises one or more of identifying a change in light intensity along the first image plane and the second image plane, a change in color along the first image plane and the second image plane, a predetermined length of a particular intensity along the first image plane and the second image plane, and a predetermined length of a particular color along the first image plane and the second image plane.

In some implementations, the method includes determining a three-dimensional outline of the object by analyzing a speed of the object that intersected the lines that were activated, wherein determining whether the event likely occurred uses the three-dimensional outline of the object.

In some implementations, analyzing the speed of the object further includes: determining an amount of time taken by the object to move between a first line and a subsequent second line of the lines that were activated; determining a distance between each cross sectional outline of the plurality of cross sectional outlines; determining the speed of the object using (i) the amount of time taken by the object to move between the first line and the subsequent second line of the lines that were activated and (ii) the distance between each cross sectional outline of the plurality of cross sectional outlines; and determining the three-dimensional outline of the object using the distance between each cross sectional outline of the plurality of cross sectional outlines and the speed of the object.

In some implementations, determining whether the event occurred based on (i) which line of the plurality of lines were activated and (ii) the order in which each of the lines that were activated further includes: in response to determining to track the object, assigning a unique track-ID associated with the object over a course of a traversal of the object through each line of the plurality of lines; and during the tracking, detecting one or more events that occurred associated with the object.

In some implementations, the one or more events include at least one of (i) detecting tailgating between two vehicles traversing over the plurality of lines, (ii) detecting a vehicle moving in a wrong direction while traversing over the plurality of lines, (iii) detecting an oversized vehicle, or (iv) detecting a vehicle traveling in excess speed over the plurality of lines.

In some implementations, performing the one or more actions using at least some of the data includes: in response to detecting the one or more events that occurred associated with the object, identifying, using at least some of the data, a frame of image data that illustrates the detected event; and providing the frame of image data to a trained machine-learning model to verify that the detected event was property detected.

In some implementations, obtaining the image data from the one or more cameras includes synchronizing the image data obtained by a first camera and a second camera, the first camera and the second camera monitoring the region.

In some implementations, the method includes detecting whether the object is depicted crossing one or more lines from the plurality of lines.

In some implementations, the region includes the plurality of lines spaced by the distance that satisfy the distance threshold further comprises setting the distance between each line of the plurality of lines by at least a predetermined distance apart.

The subject matter described in this specification can be implemented in various embodiments and may result in one or more of the following advantages. In some implementations, the Virtual Inductive Loop (VIL) system can provide a method for detecting vehicle presence in a flexible manner. Specifically, the VIL system can detect vehicle presence in one location, be moved to a new location, and detect vehicle presence in the new location with ease. For example, a movement of the VIL system may require moving the calibration mat to the new location. In cases where the system relies on a buried inductive loop for detecting vehicles, the buried inductive loop would need to be dug up before moving to the new location, which may be time inefficient.

In some implementations, a VIL system can enable additional features, such as vehicle classification, differentiating between tailgating vehicles and trailers, e.g., which is made possible through computer vision, or both, compared to other systems. In some implementations, compared to other camera-based solutions, a VIL system can be more efficient, e.g., from a compute standpoint, because the VIL system can achieve high precision and recall without running expensive neural networks on each frame of recorded video. In some implementations, the manner in which a VIL system's cameras are paired can be more cost efficient compared to a typical stereo camera setup, which requires precise measurements of the baseline between the cameras and requires a large amount of processing to compute the disparity between images from the stereo camera.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 is a diagram of an example relationship between a camera and a surface region.

FIG. 21 is an example of an event detection using a virtual inductive loop system.

FIG. 25 is an example of training data for a neural network classifier in a virtual inductive loop system.

FIG. 27 is a flowchart illustrating an example process for determining whether an object passes a virtual inductance loop line.

Like reference numbers and designations in the various drawings indicate like elements.

DETAILED DESCRIPTION

Automated access control can entail automatically detecting incoming vehicles in real-time and allowing access only to authorized vehicles. Access control systems typically adopt one or more sensors such as inductive loops, light array sensors, and wireless magnetometers in detecting vehicles at access points. The techniques discussed below relate to an analytics system, referred to as a "Virtual Inductive Loop" (VIL), which may be an alternative cost-efficient solution for access control. The VIL system may pose precision and recall rates over 98%, and may perform on par in latency towards detecting event onset and may further add a suite of additional capabilities to access control systems such as vehicle classification, tailgate detection, and unusual event detection.

Access control systems can play a critical role in securing facilities by providing access to authorized vehicles. Further, seamless operation of such systems may be critical towards traffic control, optimal allocation of site's resources, e.g., parking lots, and naturally towards the overall functioning of the facility. In serving such a purpose, such systems may need to be highly accurate in detecting the arrival and departure of vehicles at access points irrespective of vehicle type, varying ambient scene conditions, and other site-specific challenges that may exist. Typically, access control systems can be designed to allow access to two-wheelers, four-wheelers, other larger variants such as trucks and tractor-trailers, but can deny access to pedestrians and bicyclists who are provided with alternate dedicated paths for access. Finally, an important aspect in the design of such systems may be that authorized vehicles need to be provided access to the facility one at a time. Tailgating and other forms of simultaneous vehicular entry into the facility may be deemed as security breaches and may be prevented from happening.

One innovative aspect of the subject matter described in this specification is embodied in methods that include the actions of calibrating, using calibration parameters, cameras directed towards a scene, obtaining, by the cameras, images corresponding to the scene, identifying reference structures in the scene, and determining, based on the reference structures and the images, locations in the scene for generating virtual inductance loop lines in the scene. The method also includes generating the virtual inductance loop lines to be imposed on the images, comparing the virtual inductance loop lines to determine one or more offsets, and determining, based on the offsets, characteristics of the scene.

Figure 1:
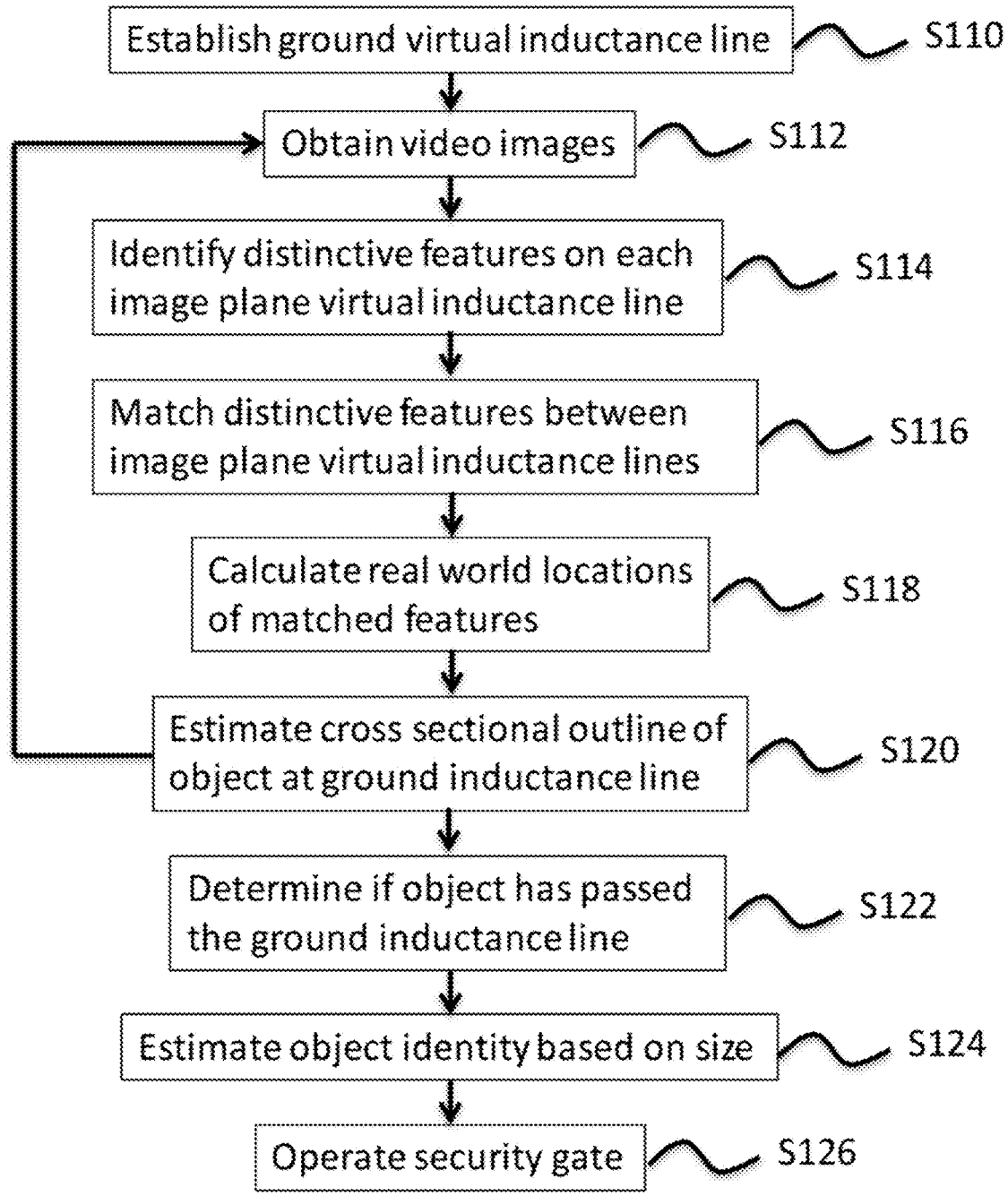
FIG. 1 is a flow chart illustrating an example process for determining whether an object passes a virtual inductance loop line.
Figure 2A:
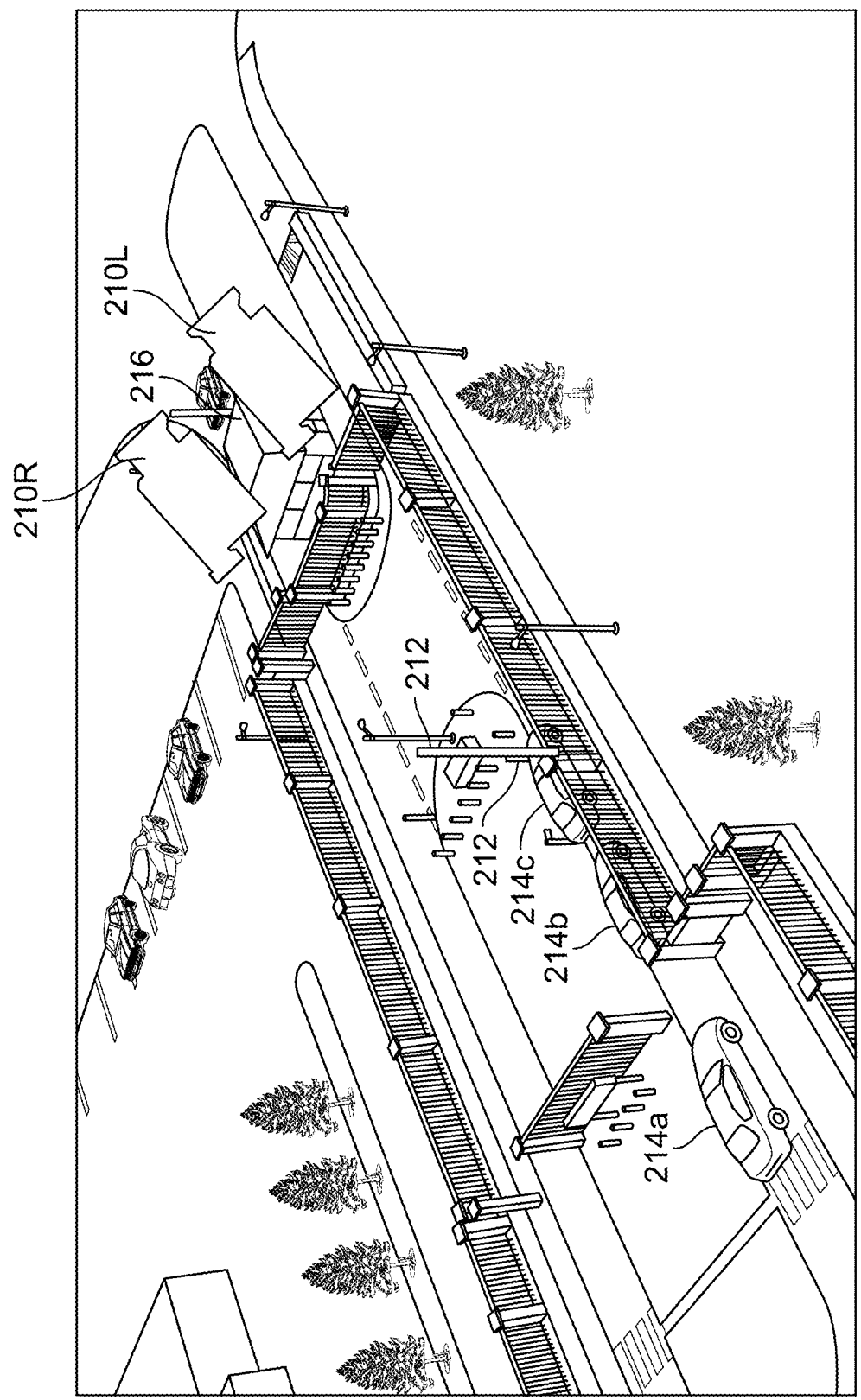
FIGS. 2A-B are diagrams of example virtual inductance loop systems.
Figure 2B:
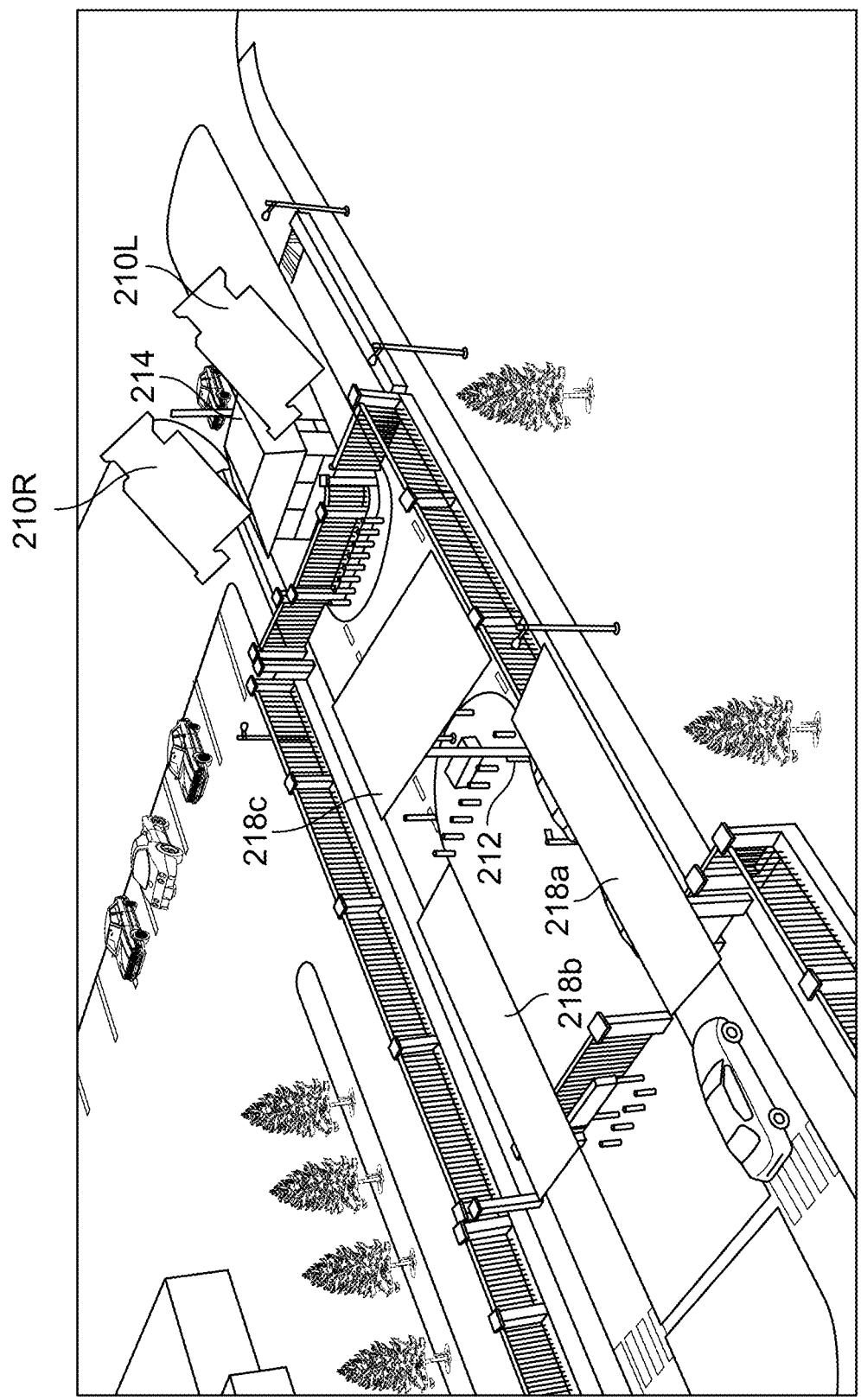

FIG. 1 illustrates an example of a virtual inductance loop method according to an embodiment. As described herein, the virtual inductance loop may be implemented by a single VIL line or a plurality of VIL lines (which may be spaced apart, or may be overlapping). For ease of explanation, the discussion herein will assume use of only two video cameras, but it will be apparent the more than two video cameras may be used. FIGS. 2A and 2B illustrate an example implementation of a surveillance system that may implement the method of FIG. 1. As shown in FIGS. 2A and 2B, two cameras 210L and 210R are positioned to view an automated access control point. The cameras may be mounted on any suitable structure (e.g., light post, side, or roof of building, etc.) at a height that allows viewing of the regions (e.g., 218a, 218b, and 218c) to be monitored by the virtual inductance loop. In some examples, a pair of cameras may be used to view each of the regions 218a, 218b, and 218c to be monitored by one or more virtual inductance loops. The pair of cameras may be used to view a driveway region, a backyard region, a docking area, a security checkpoint, a retail location, and the like. For example, a first pair of cameras may be mounted to view region 218a at an inbound access point to a security station, a second pair of cameras may be mounted to view region 218b at an outbound access point to the security station, and a third pair of cameras may be mounted to view region 218c at a reject-lane of the security station. A pivoting barrier arm security gate 212 may be lowered to extend across a roadway or raised, to thereby selectively prevent or allow passage of vehicles (214a, 214b, 214c). A security booth 216 may house a computer and user interface of the surveillance system, which may include one or more displays to display one or more of the regions 218a, 218b and 218c to be monitored by the virtual inductance loop, controls to operate the security gate 212 and audio and/or visual alarms to alert security personnel.

In step S110, at least one ground virtual inductance loop line, e.g., ground VIL line, may be established to extend between two corresponding fixed points at ground level in the real world. To simplify the immediately following description, reference is made to establishing a single ground VIL line, but the method applies to other ground VIL lines that may be established. The two points in the real world may have been previously identified during calibration of the system. For example, during calibration, markers or identifiers may be placed in the real world that are visible by a left camera and a right camera. The left and right camera may be displaced by a certain amount of distance. For example, the left and right cameras may be separated by a distance such as two to three feet. The left camera 210L and right camera 210R may analyze the scene to identify the markers and provide real world coordinates to the markers. For example, an origin may be determined as a point at ground level equidistant between the left camera and the right camera, or the origin may be determined as a point below one of the cameras 210L and 210R. Locations of a first marker, e.g., $(x_1,y_1,z_1)$, and a second marker, e.g., $(x_2,y_2,z_2)$, relative to the origin may be determined. The real world ground VIL line may be determined as a line extending between the locations of the first and second marker, i.e., between points $(x_1,y_1,z_1)$ and $(x_2,y_2,z_2)$.

The first and second markers may be placed on the ground in the real world and may also be used to establish a ground reference such as a ground plane in the real world, e.g., the origin (having a height of zero by definition) may have a height set at the same level of (or average level of) $z_1$ and $z_2$. In some examples, the first and second markers may be at different heights in the real world, but still set so that the z components representing the vertical location of each of the markers is set to zero for both markers. That is, the plane established as the ground plane by the markers may not best represent a real world ground plane for the real world viewable by the cameras, but may be at an angle with respect to horizontal direction in the real world, e.g., tilted. Other video analytics performed on the images of the cameras may reference a different real world ground plane. The roll angle of the camera may be calculated with respect to a line extending between the two markers, which lies in the determined real world ground plane, and may not correspond to a direction perpendicular to the force of gravity in the real world, but be instead offset by some angle. In this case, the x direction and y direction of a Cartesian coordinate system may also not correspond to a direction perpendicular to the force of gravity in the real world, but be instead offset by some angle.

It should be emphasized that the ground VIL line need not extend between the determined locations of the first marker and second marker. Rather, the determined real world locations of the first marker and second marker may be used to determine other points between which the ground VIL line should extend, e.g., the ground VIL line may be offset a certain horizontal distance between the locations of the first marker and the second marker, and/or may be rotated a certain angle in the horizontal plane from the line extending between the first marker and second marker. Step S110 may use more than two markers to establish the ground VIL line, exemplary details of which are discussed elsewhere herein.

Figure 3:
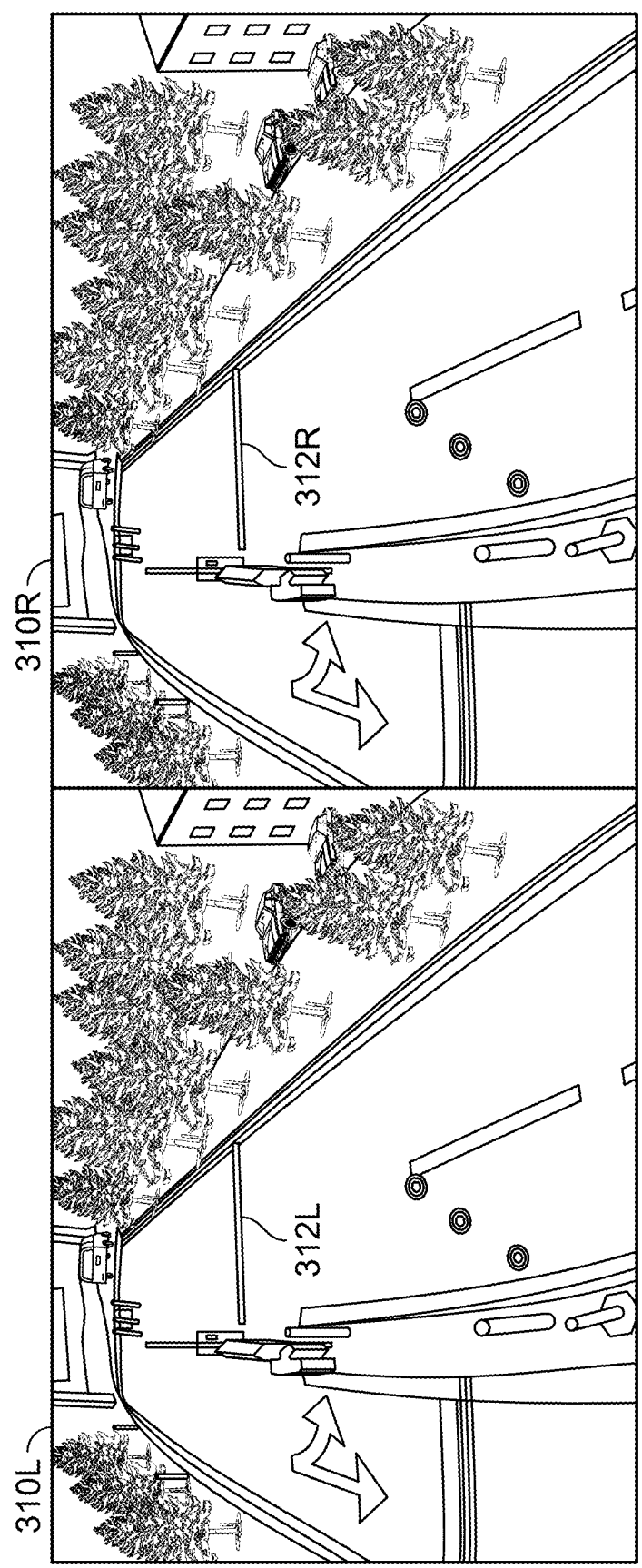
FIG. 3 is a diagram of example images obtained from cameras.

An image plane VIL line may be established in the image plane of each camera, e.g., an image plane VIL line in the image plane of the left camera 210L and an image plane VIL line in the image plane of the right camera 210R. FIG. 3 illustrates exemplary images 310L and 310R that may be respectively obtained from the left camera 210L and the right camera 210R. Image plane VIL lines 312L and 312R, shown to extend across the image planes of the left camera 210L and the right camera 210R, correspond to the ground VIL line at a monitoring region similar to that shown in FIGS. 2A and 2B. Each image plane VIL line may be a line in each of the camera's 2D image plane overlapping the corresponding ground VIL line. For example, each image plane VIL line may be identified as a line extending between two pixels of the corresponding camera's image sensor, the two pixels identifying the location overlapping the two endpoints of the ground VIL line, which may overlap the two markers in the image plane of each camera or be offset and/or rotated some amount, such as a distance and/or rotational angle determined by a user or a distance corresponding to a predetermined distance in the real world. Thus, each of the image plane VIL lines may overlap, with respect to the image plane of the corresponding camera, the ground VIL line. Each image plane VIL line may be the ground VIL line projected onto the image plane of cameras 210R and 210L. In some embodiments, the line to identify an image plane VIL line may have some width, so that it may overlap more than one pixel in its width direction. Calculations, discussed below, along the length of the image plane VIL line, e.g., comparison of pixel values along the length of the image plane VIL line, may be with respect to the average value of pixels along the width of the line rather than value of a single pixel. It should be noted that establishing a ground VIL line may be done simply by establishing the corresponding image plane VIL lines of each of the cameras, and real world definition of the ground VIL, such as by use of real world coordinates, may not be necessary.

In step S112, video images are obtained from two or more video cameras. The video images may be a sequence of still images taken at periodic intervals, which may be from a conventional video camera or still image camera. The images that are analyzed, as discussed below, need not be every image provided, such as to assist in computational efficiency. For example, 10 images or less, or four images or less, per second may be analyzed, although higher amounts of images per second, e.g., 30 or 60 per second, may be utilized if higher accuracy is desired. The video images obtained from the two or more cameras may be synchronized so that the system may analyze and compare information obtained from frames of the video images that are taken at the same moment in time.

In step S114, distinctive features along the image plane VIL lines of each of the video images are identified. The distinctive features along the image plane VIL lines may be identified by estimating one-dimensional gradients on the VIL lines. For example, the distinctive features along the image plane VIL line may arise as a result of a sudden change in intensity of light, a sudden change in color, identification of a somewhat consistent uninterrupted length of intensity, and/or a somewhat consistent uninterrupted length of the same color.

In step S116, at least some of the identified distinctive features along the image plane VIL line of one camera are matched with at least some of the identified distinctive features along the image plane VIL line of the other video camera.

In step S118, the real world location of each of the matched features is calculated.

In step S120, the height of each of the matched features is calculated to estimate a cross sectional outline that may comprise the height and width of a cross section of any object intersecting the VIL line, e.g., an object that is interposed between the cameras and a line extending between two known points in the real world.

Steps S114 to S120 may be periodically repeated, for example at a regular time interval, such as every ¹⁄₁₀ (tenth) of a second or every $60^{th}$ of a second. In step S122, the plurality of cross sectional outlines obtained by step S116 are used to estimate when the object has completely passed the ground VIL line. Alternatively, or in addition, the plurality of cross sectional outlines obtained by step S116 are used to estimate when an object has initially obstructed the ground VIL line. For example, movement of the object may be presumed to be in the correct direction of traffic for the road, e.g., the direction associated with a one-way street. After determining the existence of an object obstructing the ground VIL line, detecting the absence of an object may indicate that the initially detected object has fully passed the ground VIL line. Movement of the object using video analytics, e.g., identifying an object in a video and tracking movement of the object through time, may also be used to determine location of the object, direction of movement of the object and speed of movement of a detected object, relative to the ground VIL line. For example, the video analytics can be used to identify the direction of the motion of the object using a plurality of VIL lines. In another example, a sequence in which the object traverses across a plurality of VIL lines may be used to identify the object's direction of motion.

In step S124, the object is identified based on the determined size of the object in step S122. The identity of the object may be estimated after it is determined that the object has completely passed over the ground VIL line, e.g., to thereby provide a set of cross sectional outlines across the entire length of the object, or may be estimated as the object passes over the ground VIL line. For example, it may be estimated that the object passing over the ground VIL line in step S122 is a vehicle based on determining that a detected size of the object, such as the detected height, height and width and/or 3D size of the object, from the plurality of cross sectional outlines obtained in step S116 is consistent with a known vehicle size, e.g., consistent with a size of a sedan, SUV, pickup truck, convertible, eighteen-wheeler truck, etc. For example, minimum height and widths of a vehicle may be determined, e.g., a minimum height of 3 feet and a minimum width of 5 feet, and if the detected object has a height taller than the minimum height, e.g., higher than 3 feet, in height and wider than the minimum width, e.g., wider than 5 feet, it may be estimated that the object is a vehicle.

As will be appreciated, such an approach may make not allow for detection of smaller vehicles, such as a motorcycle. Thus, there may be a different set of size criteria for detection of a motorcycle or the minimum sizes may be reduced to take into account motorcycles. In some examples, a plurality of sets of sizes, e.g., height and width, criteria may be used to detect different types of vehicles or other types of objects where detection of a type of vehicle may cause different actions. For example, detection of standard size cars and trucks may result in closure of the security gate in a normal manner, detection of a motorcycle may cause a slower closure of the security gate at a slower pace and provide a warning alarm, e.g., beeping sound and/or flashing lights, to the motorcycle operator, detection of a pedestrian may simply cause activation of the warning alarm without closure of the security gate, and detection of trucks of certain size or greater may result in sending an alert, e.g., to the security guard manning the security booth or to a central security command center, to allow implementation of additional security measures that may be desired, either automatically, in response to the alert, or by the security personnel.

In some examples, the 3D size of the object crossing the ground VIL line may be analyzed to determine the type of object that crossed the VIL line. When using a single ground VIL line, speed of the object may be estimated by detecting the speed of the object using standard video analytics. The speed of the object may be used to determine a relative spacing between the plurality of cross sectional outlines and thus determine a 3D outline of the object. Alternatively, or in addition, plural ground VIL lines may be established along the expected path of a vehicle on the road. The cross sectional outlines, e.g., height and width, detected by two ground VIL lines may be matched and thus the speed of the object may be estimated by determining how long it took the same portions of the object to move from the first ground VIL line to the second ground VIL line. Based on the detected speed of the object, the distances between the cross sectional outlines may be determined.

In some examples, the two or more ground VIL lines may be placed at a spacing that allow simultaneous detection of cross sectional outlines of the object at one or more instants in time. For example, ten ground VIL lines may be established across a roadway at a spacing one foot apart. Thus, a known spacing, e.g., one foot, between the cross sectional outlines, e.g., height and width, obtained by each ground VIL line may be used to provide a 3D profile of the vehicle. Even if the vehicle exceeds the depth of the plurality of ground VIL lines, e.g., in this example, exceeds 10 feet, matching of the cross sectional outlines, e.g., either an exact match, or matched to an interpolated cross sectional outline obtained by interpolating heights and widths of neighboring detected cross sectional outlines, may allow obtaining the full 3D profile of the object.

In step S126, upon determining that a vehicle has completely crossed the ground VIL line, a security gate may be opened or closed. For example, a security gate at the location of the VIL line may be closed behind the vehicle and/or a security gate in front of the vehicle may be opened. In some examples, the system may be used with at a security check point. Two security gates, e.g., a forward security gate and a rearward security gate, may be used to secure a vehicle within a particular area on the road at the security check point. Upon a vehicle's approach to the security check point, the forward security gate may be closed, while the rearward security gate may be open. The VIL line may be defined to extend across the road below the rearward security gate and used to determine that a vehicle has crossed the rearward VIL line to cause the rearward security gate to close. At this time, the vehicle may be secured between two security gates, e.g., one in front and one behind the vehicle, so that the vehicle may not either proceed into the secure area or leave by reversing its direction until a security officer operating the security barrier is able to check and inspect the vehicle and operator and determine that the vehicle may pass into the secure area. In an alternative security check point implementation, the vehicle may first approach closed rearward and forward security gates. After stopping in front of the rearward security gate, the security officer may approve passage of the vehicle into the secure area, and cause the rearward security gate to open, but not the forward security gate. After the vehicle passes the rearward security gate, as automatically determined based on use of the VIL line located at the rearward security gate, the rearward security gate may close. After closure of the rearward security gate, the forward security gate may open to allow the vehicle to pass.

It will be apparent that use of a barrier arm as a security gate is simply one example and other security gates may be used, such as buttress steel plate barriers that may pivot up from a flat position on the road surface, retractable bollards, or typical vertical gate panel(s) that slide horizontally away from the road or pivot around a vertical axis, e.g., by use of hinges, to allow the gate(s) to open and close and thus allow or prevent access to the secure area, for the gate in front of the vehicle, as well as similar restrictions to the security check area.

Figure 4:
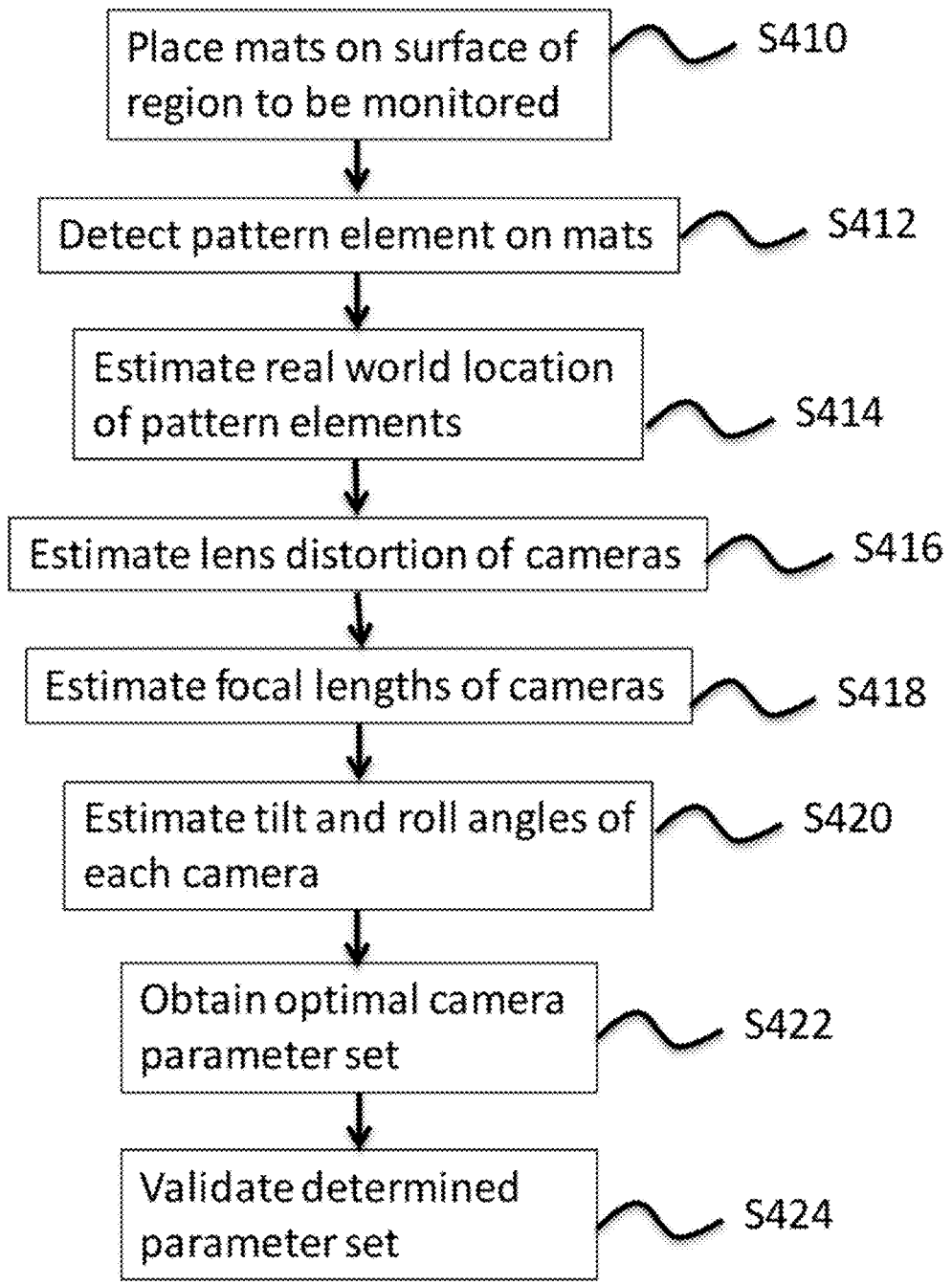
FIG. 4 is a flow chart illustrating an example process for establishing a virtual inductance loop line.

FIG. 4 illustrates an exemplary method for establishing real world virtual inductance loop line(s) at ground level, e.g., ground VIL lines, and image plane virtual inductance lines, e.g., image plane VIL lines. FIG. 4 may be implemented in a calibration mode of the surveillance system. A user may provide an input to the surveillance system, e.g., via an input device or user interface of a computer operating the surveillance system, such as a mouse, keyboard, track pad, touchscreen, etc., to cause the surveillance system to enter calibration mode. Alternatively, detection of the existence of the mats themselves in the images taken by the cameras 210L and 210R may cause the surveillance system to enter calibration mode. The ground VIL lines and image plane VIL lines may not have been established prior to entering calibration mode, thus, the surveillance system may not perform video analysis until these VIL lines are established, e.g., to detect the presence and/or identify a type of a vehicle.

Figure 5:
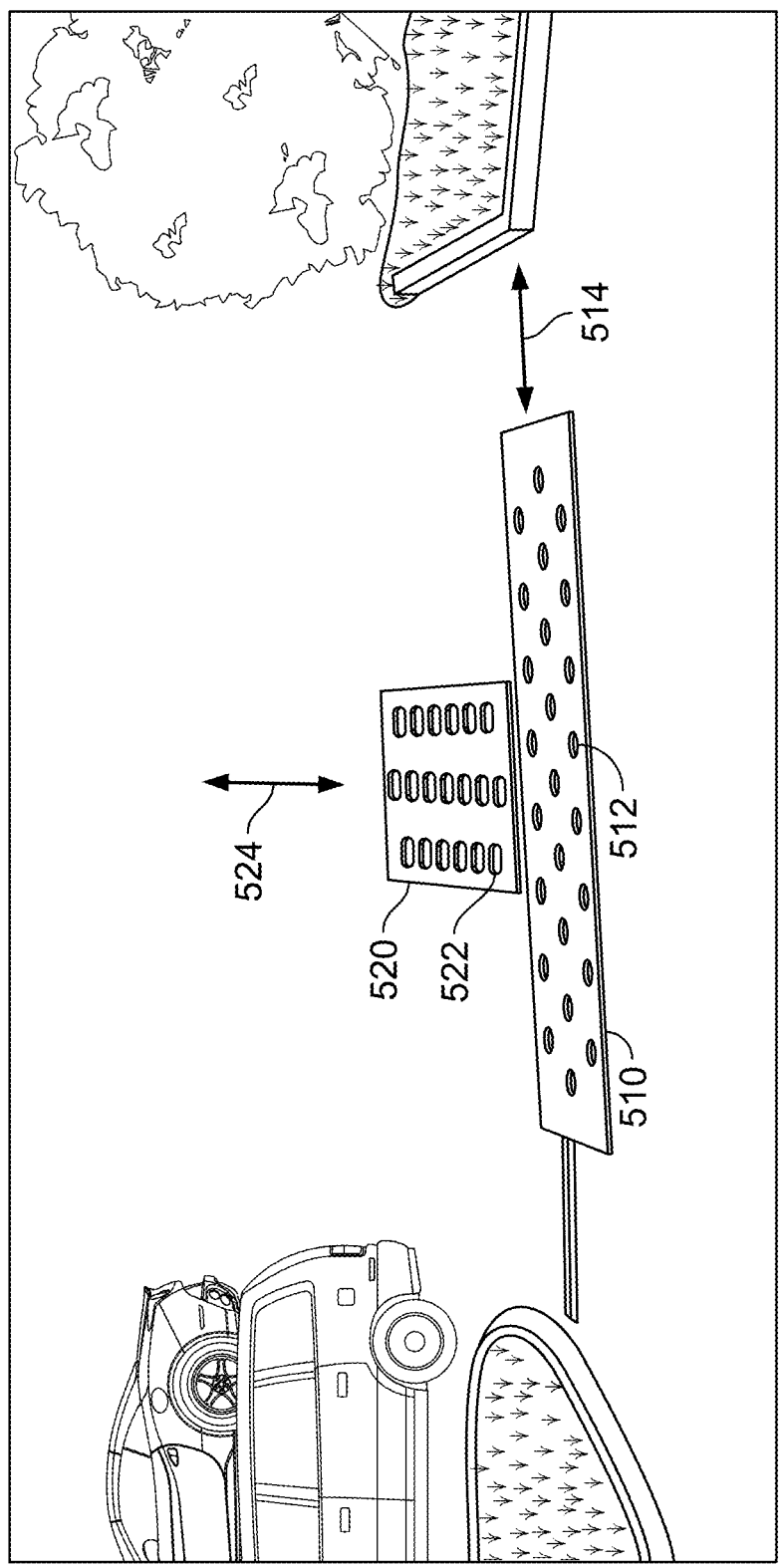
FIG. 5 is a diagram of an example virtual inductance loop system using two surface regions.

In step S410, one or more mats are placed in the region, e.g., one of 218a, 218b, and 218c, to be monitored by the virtual inductance loop. FIG. 5 illustrates an example using two mats 510 and 520. Each of the mats 510 and 520 may have a visible pattern that may help cameras 210L and 210R detect the location of the mat as well as distinctive visible features of the mat. The mats may be portable so that they may be easily carried and positioned by a user. Use of rigid mats, such as a thin rigid plastic mat, may provide slightly higher accuracy. However, it has been found that collapsible mats, such as rollable mats, e.g., a rubber like mat, or foldable mats, e.g., hinged to unfold in an accordion like manner, provide sufficient accuracy and conform to the surface of the road to identify the ground plane. When implementing the method and system with a rollable mat, such as one made of thick rollable plastic or a rubber like material, it is preferable to use mats that are resistant to wrinkling so that they may be easily displaced on the road surface while maintaining a predetermined distance between pattern elements on the mat.

Here, each mat includes a pattern formed of dots 512, 522 that are arranged in three linear rows. Use of pattern elements other than dots may be implemented, but discussion herein will reference dots as the pattern elements for ease of description. Mat 510 may be placed so that the linear rows of dots 512 extend in a direction 514 that is parallel to the horizontal displacement of the left and right cameras 210L and 210R, i.e., parallel to a line extending between the cameras as viewed from a top down view. Mat 520 may be placed so that linear rows of dots 522 extend in a direction 524 of the expected direction of vehicle movement, e.g., parallel to the lane direction of the road. This placement of mats may be helpful for better disparity computations, but is not necessary. For example, mats may be placed so that they are not parallel or perpendicular to a line extending between the cameras, and/or parallel or perpendicular to the real world VIL line. In addition, placement of the cameras need not be positioned to have a head on view of the real world VIL line. It will be appreciated that the cameras 210L and 210R may be positioned to have view traffic travel away from the cameras as they approach the real world VIL line, so that cameras 210L and 210R view the rear of the vehicle. Cameras 210L and 210R may be placed at different heights. In addition, the cameras may be positioned at different heights without a horizontal offset, e.g., they may be both mounted on the same vertical pole. When a real world VIL line is established to cross a roadway where the cameras view the real world VIL line from the side, the image lane VIL lines may have a substantially vertical direction in their respective image plane. The following describes an example where the cameras 210L and 210R view traffic crossing the real world VIL line head on, with the real world VIL line running in a direction somewhat parallel to a line extending between the cameras 210L and 210R. However, it will be recognized that the description also is applicable to alternative arrangements of the real world VIL line and cameras, such as those described herein.

In step S412, each camera of the system, e.g., 210R, 210L, automatically detects the dots on the mats 510 and 520. Here, video analysis of video or still images captured by the cameras 210R and 210L automatically detect each dot 512, 522 on the mats. First, region-based segmentation method may be applied to segment each video frame into separate region blobs; each region blob comprises connected image pixels with similar color values, e.g., pixels all within a certain threshold of a particular color value. Next, the region blobs that look similar to the "dots" on the VIL mats are detected based on their size, color, and neighborhood region colors. For example, if the feature dots on the VIL mat are red dots on a green background, all the red region blobs that are surrounded by green regions will be selected. Last, all the detected neighboring region blobs will be used to form a feature array. The formed feature array may be compared with the known VIL pattern. The comparison may be used to confirm if the detected blob pattern, e.g., as represented by the feature array, matches with the known VIL mat pattern. For example, if there are 3 arrays of 7 red dots evenly placed on the VIL mat and the system detect 3 rows of 7 red region blobs evenly distributed in a local region of the image, the detection decision can be made with high confidence because this is very unlikely to happen in a random scene without the VIL mat.

Additional matching criteria may be used to detect dots on mats 510 and 520. Objects identified as a parallelogram, or otherwise matching an expected geometrical shape of the mat, such as a circle, oval, triangle, etc., are inspected to identify dots therein. First within each identified parallelogram, initially identified pattern elements are detected. The dots may be identified by comparison of shapes and sizes, e.g., where size may be area and/or length, of the initially identified pattern elements, e.g., to identify those having the same shape and size within an appropriate threshold. For example, the dots may be identified by selecting from the initially identified pattern elements those having (a) the same or substantially the same shape in the image, (b) the same or substantially the same size within the image, (c) the same or substantially the same color or intensity with respect to remaining portions of the mat, (d) the appropriate size with respect to the size of the identified parallelogram within the image, e.g., a ratio of the image size of the identified pattern element to the image size of the identified parallelogram matches, within a threshold, such as +/−5%, a ratio of a known size of a dot to a known size of the mat, (e) the appropriate spacing between each other, e.g., if some of the initially identified pattern elements have an expected hexagonal arrangement on the mats, or some are evenly spaced along a line as expected, the dots may be identified as those initially identified pattern elements corresponding to a similar arrangement and/or spacing in the image, e.g., consistent with a real world to image plane transformation, and/or (f) matching an expected number, e.g., if an initially identified pattern element is not initially identified as a dot due to a partial occlusion, shadow, reflection, etc., it may be considered a dot if its location is at a location where a dot is expected to be located, e.g., if the mat includes 9 dots arranged in a line along a row, if 8 out of 9 dots have been identified, the location of the 9$^{th}$ dot may be identified by knowing the expected location of the missing dot within the 9 dot linear pattern and examining the existence of an identified pattern at that location.

At step S414, real world locations of the dots 512, 522 are estimated. Dot location, e.g., dot center or other identifiable point of the pattern element, may be determined based on initial calibration parameters of the surveillance system. Use of initial calibration parameters may not be necessary, but may help the surveillance system find the optimal calibration parameter more quickly. When the calibration process is a global optimization process, the initial values may provide a bound to the search range and prevent the optimization process stop at some local optimal points. The initial calibration parameters may comprise camera height, e.g., with respect to a ground plane at which the mats 510, 520 rest, camera tilt angle, camera roll angle, camera azimuth angle, location of the dots 512, 522 in the image plane, e.g., pixel location of the center of the dots 512, 522, and internal camera parameters, such as lens distortion and focal length. Such initial calibration parameters may be input by a user during set up of the surveillance system, e.g., height, camera tilt angle and camera roll angle may be measured after camera placement, while internal camera parameters may be input based on information provided by the camera manufacturer. For examples of calibration procedures that may be used to obtain initial calibration parameters, see U.S. Pat. No. 7,801,330, issued to Zhang et al. on Sep. 21, 2010, the contents of which are incorporated herein by reference in their entirety.

Based on such initial calibration parameters, an angle $\alpha$ between a line from the camera to the dot, e.g., dot center, and the vertical direction may be determined, and thus, based on the known height of the camera, a distance r from a location below the camera at the ground plane to the dot may be determined, i.e., r=h×sin ($\alpha$). FIG. 6 illustrates such relationships with respect to a line from the camera to the center of an "X" to represent a location of a center of a dot. Dot location in the real world may be represented in Cartesian coordinates (x, y, z). For example, assume the origin of the Cartesian coordinate system representing locations in the real world is located at O below the camera in FIG. 6, that z represents a height of the object and (x, y) represents a location of the object in a horizontal plane parallel to the ground plane. The (x, y) location can then be determined by the distance r and an azimuth angle between the line from the camera to the dot center with respect to the coordinate system's x and y axes. It will be appreciated that the height (z) of the object with respect to the ground plane should be known to determine the (x, y) horizontal plane location of the object (e.g., if the "X" was viewed by the camera of FIG. 6 at the same angle $\alpha$ but at a location above the ground plane, the depth d and distance r would both be shorter).

In steps S416, S418, S420 and S422, the initial calibration parameters of the surveillance system, such as parameters of the cameras 210L and 21R, are adjusted based on the calculated real world locations of the dots 512, 522. In step S416, lens distortion for each camera 210L and 210R is estimated based on the calculation of the real world locations of the dots 512, 522. For example, the calculations of the real world locations of dots 512, 522 in step S414 may indicate that the dots are positioned on a slightly curved line, rather than a straight line. By knowing that the dots are actually placed on the mats 510, 520 in a straight line, the determination of a curved line positioning may be attributed to lens distortion, or more particularly, to improper initial estimation of lens distortion used to initially estimate the real world locations of dots 512, 522 in step S414. Correction of lens distortion parameters may be parameters associate with a first-order radial distortion model, but other lens distortion models may be used.

In step S418, camera focal length of each camera 210L and 210R is estimated. The system may determine focal length based on vanishing point detection, which may comprise detecting an intersection location, e.g., in the image plane, of the lines extending through the dots. The focal length may be estimated from the camera field of view. The array of VIL dots on the VIL mat provides a set of parallel orthogonal lines on the real world ground. The horizon line in the camera view can be computed from these parallel orthogonal lines. The horizon lines indicate a direction corresponding to a 90-degree tilt up angle of the camera, thus the field of view angle between the horizon line and the VIL mat center can be determined. When the distance between the camera and the VIL mat is much greater than the size of the VIL mat, the camera vertical field of view can be estimated from the angle between the VIL mat center and the horizon line and their corresponding image distance.

In step S420, the tilt angle and the roll angle of each of the cameras are estimated. The tilt angle may be determined based on comparison of the measured horizontal lengths to the measured vertical lengths of the mats 510, 520, or of other known features, such as pattern sizes, on the mats. For example, the ratio of the length, e.g., considered the long dimension, to width, e.g., perpendicular to length from a top down view, of mat 510 may be previously known. The measured ratio of the length to width of mat 510 as it appears in a camera's image plane, e.g., as it appears as shown in FIG. 5, may be calculated. The difference in the two ratios may be attributed to the camera's tilt angle. The tilt angle may be an angle between the horizon and a central axis of the camera lens. The roll angle of each camera may be determined as the angle between direction 524, e.g., the row direction of the linear rows of dots 512 of mat 510, and the horizontal direction of the image plane of the camera. The horizontal direction in the image plane may be the same as the longer dimension of a rectangular display, and may be parallel to a line of pixel sensors, i.e., photodetector, of the image sensor that extend in the longer direction of a rectangular array of the pixel sensors of the image sensor. Assuming there are two perpendicular line segments on the ground plane with same length, one line is in parallel with a line extending between the two cameras 210L and 210R, which is also in perpendicular to the camera viewing direction. The difference in lengths of these two lines in a camera's image plane is mainly determined by the camera-viewing angle. Thus the camera view angle can be estimated using two orthogonal line segments with known lengths. The known lengths between detected VIL dots on the VIL mat may be used to provide the lengths of these two orthogonal line segments. When the lengths of the two orthogonal line segments are the same, a ratio of 1 indicates a completely overhead camera view, and a very large ratio implies near 90-degree viewing angle. For a position close to the middle of the image, the angle can be computed as: viewing angle=arccosine(height/width). When the length of the two orthogonal line segments are not the same, e.g., it is known that the horizontal line segment length is five times as large as the vertical line segment length, appropriate adjustments to the calculations may be made, e.g., the ratio may be made between 5 times the vertical line segment length and the horizontal line segment length.

In step S422, the optimal camera parameter set is obtained. The camera calibration parameters computed in steps S416, S418, and S420 may not be true in reality. Thus, the camera parameters obtained in steps S416, S418, and S420 may not be accurate enough. In the next step, a further search is performed to find the optimal parameters around those initial estimations. For example, gradient-based optimization method as well as numerical method optimization may be used. A search is performed from coarse step to fine step on the values around the original estimations. For example, each estimated initial camera parameter may be modified a predetermined amount, e.g., +/−1%. Each possible combination of the modified camera parameters may provide a camera parameter set with which the locations of the dot patterns on mats may be estimated. Resulting dot pattern locations associated with each set may provide a new camera parameter set, from which further parameter modification and dot location estimation may be made, e.g., using deviations from this new parameter set at smaller increments, such as +/−0.5%. The optimal parameter set may be determined as the camera parameter set that brings the minimal mean matching distance error between the computed VIL dots locations and their actual relative locations. Take two VIL dots for example, given a set of camera calibration parameters, their ground locations and then their ground distance between these two VIL dots can be computed. If their computed ground distance is the same as their actual known distance on the VIL mat, the distance matching error is zero. The goal of the optimization process is to find the set of the parameters that minimize the mean distance matching error, of the known distance and calculated distance, over all the VIL dot pairs. Determining the optimal parameter set may also take into account differences in calculated real world locations of the VIL dots of the different cameras. Thus, the set of parameters of multiple cameras that minimize the mean distance of each camera's matching error and of difference in calculated real world locations of the VIL dots may be used to determine the optimal camera parameters.

In step S424, after obtaining adjusted camera parameters, the new camera parameters, and/or determined real world location of the mats 510, 520 and/or dots 512 of the mats may be validated. Validation may be performed by displaying images captured by each camera with a corresponding virtual mat pattern superimposed on each of these images. For each camera, the virtual mat pattern may be determined based on the determined real world location and orientation of the appropriate mat 510 or 520 using the known locations of the VIL dots on that mat, as translated to the image plane of the appropriate camera based on the determined optimal camera parameters. It will be appreciated that the views of the virtual mat as translated to the image planes of each camera may differ from each other, as they are translated to differently positioned image planes. The determined real world location may be a single location, e.g., a single (x,y,z) coordinate of the mat, with known relative locations of dots to this single real world location used to determine the dot real world location, as well as the corresponding translated views in the image planes of the cameras 210L or 210R. Alternatively, the determined real world location may include coordinates that identify the real world locations of the dots. A user may thus view the images with the corresponding mat pattern superimposed thereon to confirm that the determined location of the mats 510, 520 and or dots 512, 522 as well as the adjusted camera parameters are accurate. After confirming accuracy of the same, a user may provide an input to the surveillance system, e.g., via an input device or user interface of a computer operating the surveillance system, such as a mouse, keyboard, track pad, touchscreen, etc., to cause the surveillance system to exit calibration mode.

Calibration of the camera system as performed by the method of FIG. 4 may be performed in less than three seconds, for example, and obtain an accuracy of within one inch within the region of the mats 510, 520 from a distance of 40 feet, e.g., for an accuracy of about 0.2% of the distance to the mats, or less.

Figure 7A:
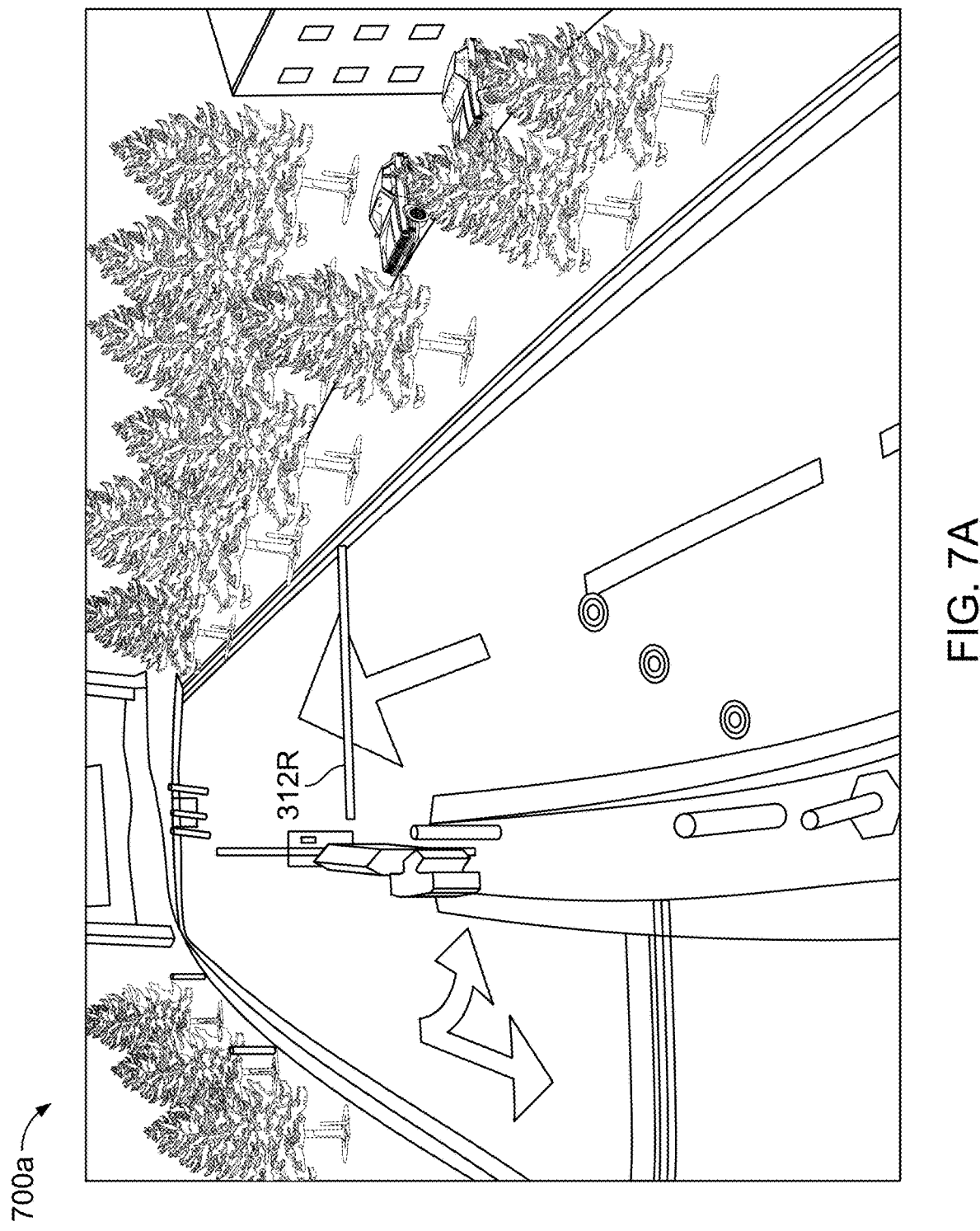
FIG. 7A-C are diagrams of examples of identifying features at a scene.

FIG. 7A shows an image 700a obtained by a camera, e.g., 210R, and image plane VIL line 312R without a vehicle present. In FIG. 7C, portion 710b is an exploded view of a portion of the image 700a where it intersects the image plane VIL line 312R. In image 700a, an image portion comprises a relatively higher intensity portion, e.g., between A and B, between two relatively lower intensity portions. A derivative of the image portion represents the light intensity of image portion. In this example, distinctive features $a_r$ and $b_r$ on the image plane VIL line 312R are identified by analyzing the change of intensity of image portion along the length of the image lane VIL line 312R. Here, the second derivative of the image portion shows the change of intensity of image portion (e.g., a derivative of the intensity of 710a' with respect to a left to right view of image portion). As image portion may comprise pixel data for a line of pixels across image 700a, e.g., corresponding to image plane VIL line 312R, intensity of derivative of the image portion may be the grayscale value assigned to each of the pixels in this line of pixels. In some examples, the image plane VIL line is given a width that overlaps a plurality of pixels in the width direction, e.g., in the up and down direction in FIG. 7C); in this instance, the intensity of derivative of the image portion at a location along the length of the image plane VIL line may be an average grayscale value of all pixels in the width direction at that location. It should be understood that line as used in this application does not exclude a line having some thickness in its width direction.

Change of intensity may then be measured as the change, e.g., with respect to the length direction, or left to right in FIG. 7C, in grayscale values of neighboring pixels or in grayscale values of neighboring sets of pixels. Alternatively, in some examples, change of intensity may be measured as the difference in an average grayscale value of neighboring groups of pixels along image portion 710b. For example, for six pixels in a row (p1, p2, . . . p6) along a segment of image portion 710b, a change of intensity between pixel p3 and pixel p4 may be represented as the difference between the average grayscale value of pixels p1, p2, and p3 and the average grayscale value of pixels p4, p5, and p6. Changes of intensity that exceed a predetermined threshold may be identified as a distinctive feature, e.g., $a_r$ and $b_r$. Change of intensity that do not exceed a predetermined threshold may be ignored. For example, changes of intensity that are not greater than three, for example, in a 256-value grayscale, e.g., 8-bit data intensity representation, may be ignored.

Each of the identified distinctive features may simply be represented and stored in memory of the surveillance system as (i) a location along image plane VIL line 312R, (ii) such location and a direction of the change of intensity, i.e., either a positive or negative change in intensity, representing an increase or decrease in brilliance, respectively, or (iii) such location, such direction of the change of intensity and a magnitude of the change of the intensity. It will also be appreciated that other analyses may be used to identify distinctive features, such as color analysis that may detect significant changes in color. For example, when color is represented as three color intensity components, e.g., a red intensity value, a green intensity value and a blue intensity value, a gradient for each color intensity component may be determined and used to in comparison calculations, e.g., correlation calculations, described herein. Gradients of each color intensity component not greater than three, for example, in a 256-value intensity representation may be ignored.

Figure 7B:
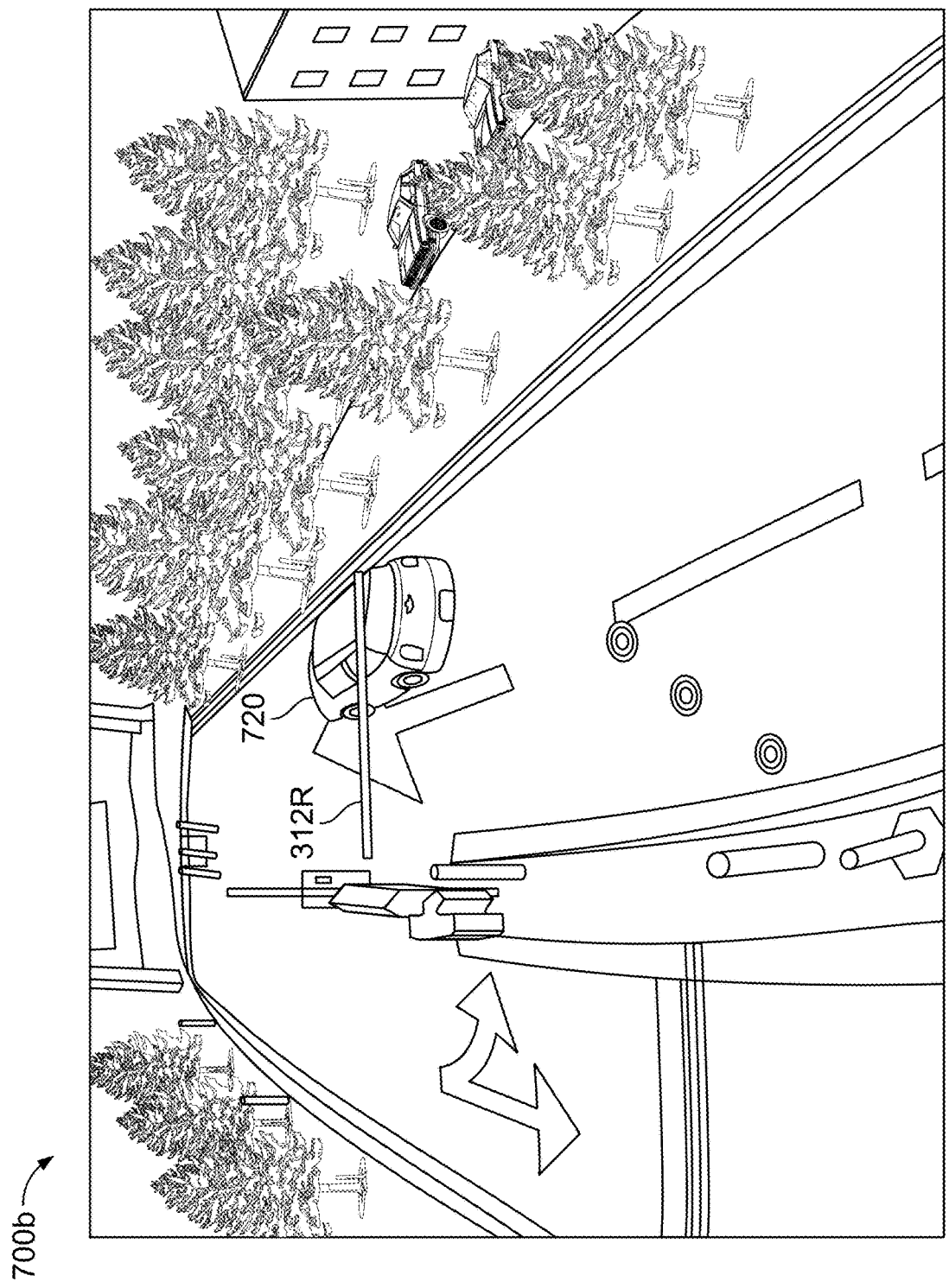
Figure 7C:
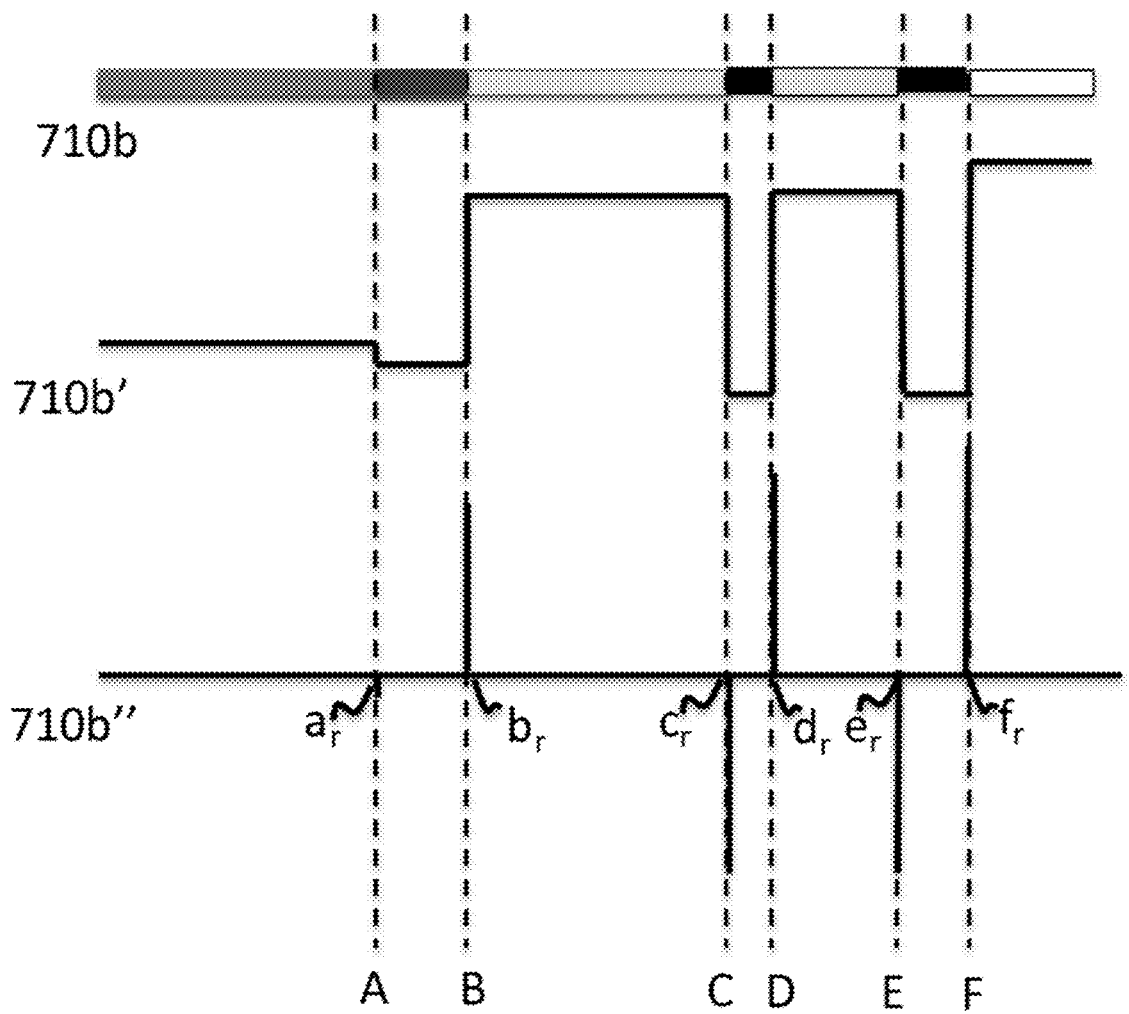

FIG. 7B shows an image 700b obtained by the camera 210R with a vehicle 720 interposed between the ground VIL line and the camera 210R as the vehicle 720 is crossing the ground VIL line. In FIG. 7C, portion 710b is an exploded view of a portion of the image 700b where it intersects the image plane VIL line 312R. 710b' shows the light intensity of image portion 710b. 710b" shows the change of intensity of image portion 710b, which may be determined as discussed herein. In this example, distinctive features $a_r$, $b_r$, $c_r$, $d_r$, $e_r$ and $f_r$ have been identified. It will be recognized that the image plane VIL line 312R is composed of the same pixels, but differences between images 700a and 700b and more specifically, due to the presence of the vehicle occluding the ground VIL line, create different intensity values, e.g., grayscale values, for pixels of the image plane VIL line 312R. The different intensity patterns create different distinctive feature identification in these two examples.

While FIGS. 7A-7C show examples of identifying distinctive features in two different frames of a video taken from one camera, here, 210R, it will be understood that distinctive features are identified along each image plane VIL line of each camera. In this example, cameras 210L and 210R on both image plane VIL lines 312L and 312R identify distinctive features. When these identified distinctive features correspond to elements in the real world at ground level, e.g., distinctive features derived from shadows or painted lines on the road along the ground VIL line, identified distinctive features resulting from the same real world object feature are expected to be identified at the same relative location along each of the image plane VIL lines 312L and 312R.

Figure 8A:
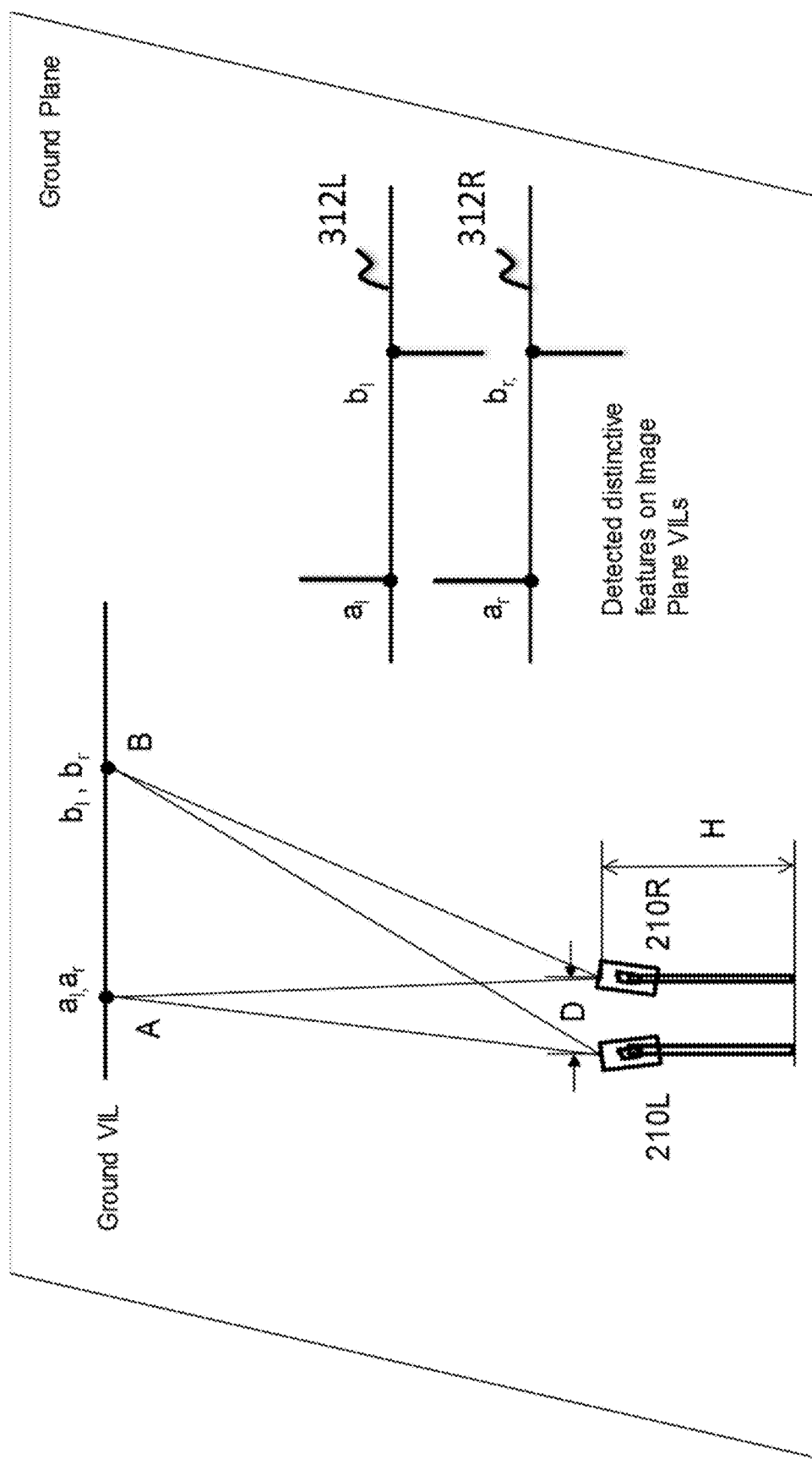
FIG. 8A is an example of cameras obtaining an unobstructed image along a virtual inductance loop line.

FIG. 8A illustrates an example of the same, with cameras 210L and 210R obtaining an unobstructed image along a ground VIL line. In this example, the ground VIL line has features at locations A and B that are identified as distinctive features along image plane VIL lines 312L and 312R, via separate analysis of the images from cameras 210L and 210R, as discussed herein. As shown in FIG. 8A, identified distinctive features $a_l$ and $a_r$ share the same relative location along their respective image plane VIL lines 312L and 312R. Similarly, identified distinctive features $b_l$ and $b_r$ share the same relative location along their respective image plane VIL lines 312L and 312R. In addition, the direction, e.g., positive or negative, of the gradient is the same for features $a_l$ and $a_r$, here, positive, and for features $b_l$ and $b_r$, here, negative. In addition, the magnitudes of the measured gradients, e.g., the gradient of intensity, associated with features $a_l$ and $a_r$ are the same or similar as well the magnitudes of the measured gradients associated with features $b_l$ and $b_r$. It will be appreciated that magnitude of the measured gradient may be dependent on camera characteristics, e.g., a clean v. dirty lens, sensor sensitivity, image processing firmware, etc.

Figure 8B:
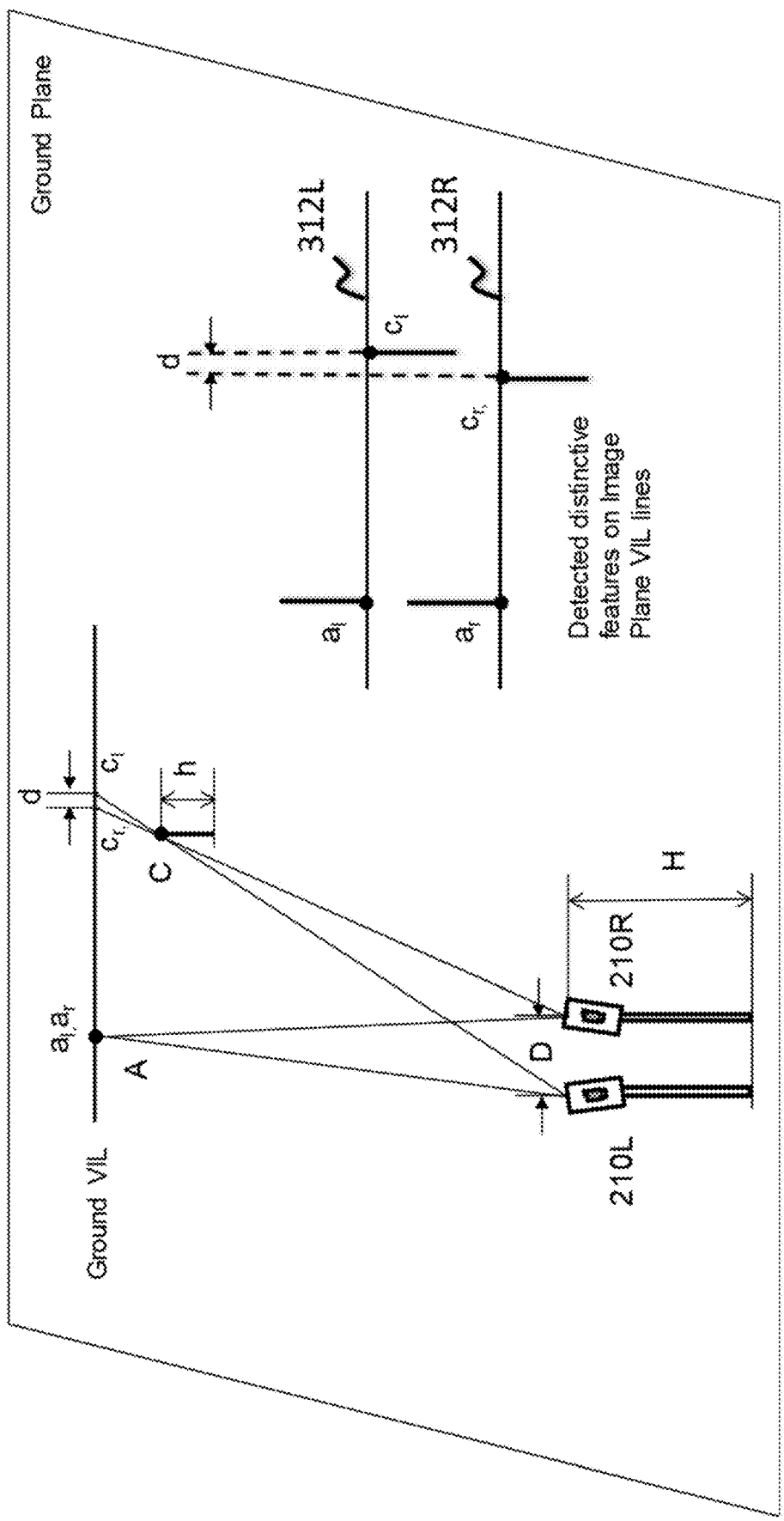
FIG. 8B is an example of a distinctive feature interposed between cameras and a virtual inductance loop line.

However, when an object, such as a vehicle, is interposed between the ground VIL line and the cameras 210L and 210R, differences in camera location cause matching identified distinctive features on image plane VIL lines 312L and 312R to differ in their relative location along each of the image plane VIL lines 312L and 312R. FIG. 8B illustrates an example where an object with a distinctive feature at location C is interposed between cameras 210L and 210R and the ground VIL line.

In the example of FIG. 8B, the identified distinctive features $c_l$, and $c_r$, e.g., derived from the same feature of the object at location C, are not located at the same relative location along their respective image plane VIL lines 312L and 312R. It will be appreciated that the location of the object at location C—closer to the cameras 210L and 210R than the ground VIL line—causes the deviation between the locations of the identified distinctive features $c_l$ and $c_r$ along their respect image plane VIL lines 312L and 312R. If distinctive features $c_l$ and $c_r$ as identified along their respective image plane VIL lines 312L and 312R can be recognized as being associated with the same location C in the real world, then the coordinates of the real world location C can be determined. Specifically, a distance "d" between features $c_l$ and $c_r$ as identified along their respective image plane VIL lines 312L and 312R, the distance "D" between cameras 210L, 210R, the real world coordinates of the ground VIL line can be used to detect the (x, y) coordinate of location C, its location projected onto the ground plane from a top down view. From the (x, y) location C and height H of the cameras 210L and 210R, the height h of location C above the ground plane, i.e., the z coordinate of location C, can be determined. In general, the h of location C above the ground plane may be approximated as:

$$h \approx H*d/(d+D) \tag{1}$$

Figure 9:
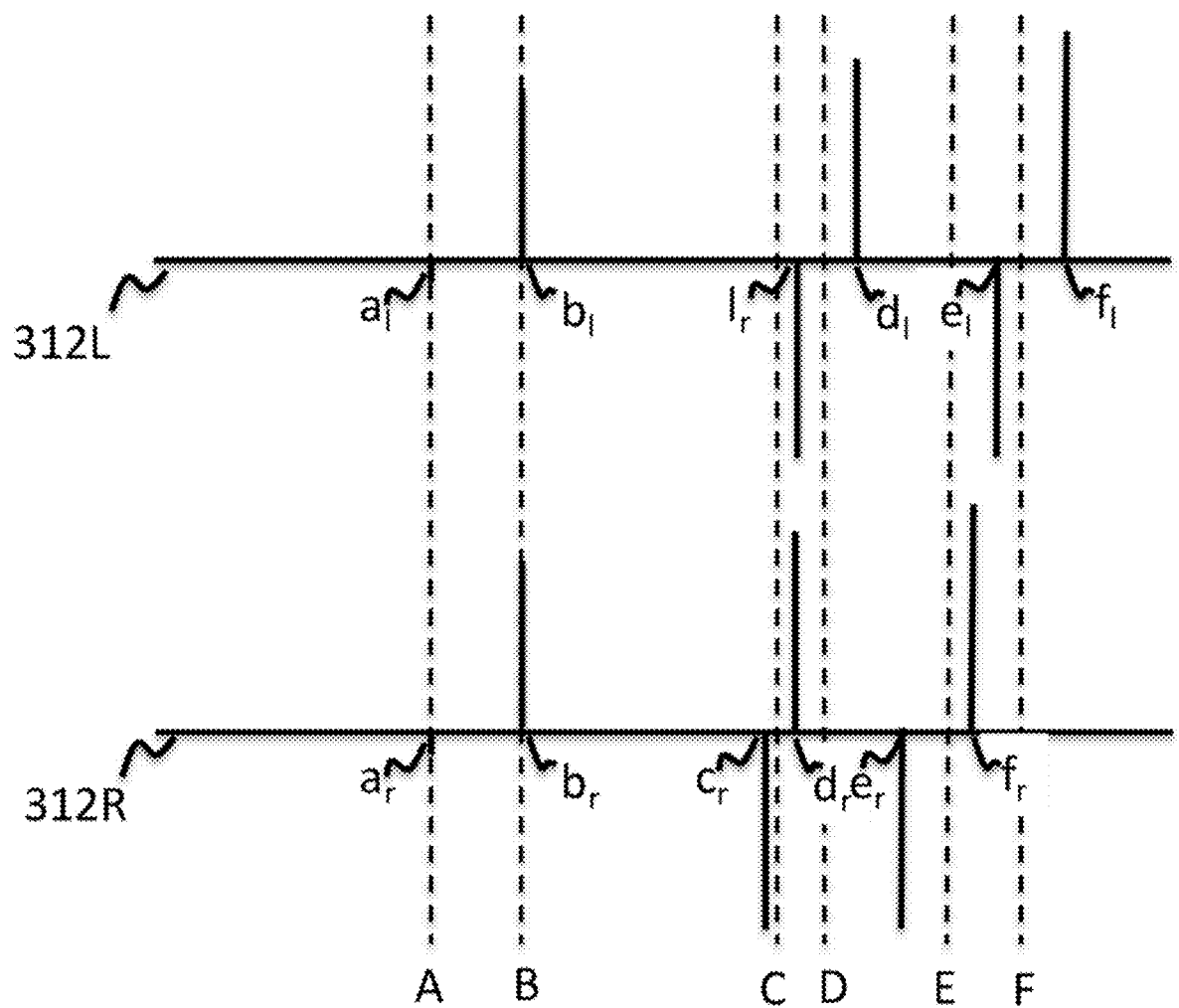
FIG. 9 is an example of identifying distinctive features at a scene.

To determine the height of identified distinctive features, in step S116 one or more of the identified distinctive features of image plane VIL line 312L are matched with a corresponding one of the identified distinctive features of image plane VIL line 312R. Multiple correlation calculations are performed to find the best match. With each correlation calculation, identified distinctive features of image plane VIL line 312L are matched with different ones of the identified distinctive features on image plane VIL line 312R. FIG. 9 illustrates a simplified example, with distinctive features $a_l$, $b_l$, $c_l$, $d_l$, $e_l$, and $f_l$ being identified along image plane 312L and distinctive features $a_r$, $b_r$, $c_r$, $d_r$, $e_r$, and $f_r$ being identified along image plane 312R due to presence of distinctive image elements on ground VIL line at locations A and B and distinctive features of an object, e.g., vehicle, at locations C, D, E and F. In FIG. 9, the matching distinctive features have been similarly labeled, but it should be understood that such matching is the goal of the correlation and such information is not provided to the surveillance system but is be determined by the surveillance system. It should also be understood that multitudes of distinctive features may be made identified on each image plane VIL line, including distinctive features of one image plane VIL line that has no match on the other image plane VIL line. For example, features of an object may be viewable by only one camera and not the other camera, or features of an object may not be identified due to not meeting a certain threshold of an intensity gradient in one camera, but not the other camera.

As noted above, multiple correlation calculations are made, with each correlation calculation making a different "guess" or match hypothesis as to which distinctive features of image plane VIL line 312L match with those of image plane VIL line 312R. For example, a first correlation may hypothesize that distinctive feature $b_l$ of image plane VIL line 312L matches distinctive feature $d_r$ of image plane VIL line 312R, as well as hypothesize matches between remaining ones of the identified distinctive features, while a second correlation calculation may hypothesize that distinctive feature $d_l$ of image plane VIL line 312L matches distinctive feature $d_r$ of image plane VIL line 312R, as well as hypothesize matches between remaining ones of the identified distinctive features.

Thus, a correlation calculation may be performed for each match hypothesis of a set of identified distinctive features of one image plane VIL line match with a set of identified distinctive features of the another image plane VIL. For example, the correlation calculation may calculate a Pearson's correlation coefficient between the two sets of identified distinctive features, e.g., between distinctive features $a_l$, $b_l$, $c_l$, $d_l$, $e_l$ and $f_l$ and distinctive features $a_r$, $b_r$, $c_r$, $d_r$, $e_r$ and $f_r$ in the simplified example of FIG. 9. Considering a set X of n measurements, e.g., gradient of intensity measurements, for an image plane VIL line 312L and a set Y of n measurements for along image plane VIL line 312R, where identified distinctive features along image plane VIL line 312L are represented as $x_i$ and identified distinctive features along image plane VIL line 312R are represented as $y_i$ for i=1, 2, ..., n, then the sample correlation coefficient can be used to estimate the population Pearson correlation r between X and Y. The sample correlation coefficient may be written as indicated in Equation (2), below.

$$r_{xy} = \frac{\sum_{i=1}^{n}(x_i - \bar{x})(y_i - \bar{y})}{ns_x s_y} = \frac{\sum_{i=1}^{n}(x_i - \bar{x})(y_i - \bar{y})}{\sqrt{\sum_{i=1}^{n}(x_i - \bar{x})^2 \sum_{i=1}^{n}(y_i - \bar{y})^2}}. \tag{2}$$

In Equation 2, $\bar{x}$ and $\bar{y}$ are the sample means of X and Y, and $s_x$ and $s_y$ are the sample standard deviations of X and Y. Repeating this correlation calculation for each match hypothesis provides a correlation coefficient associated with a corresponding match hypothesis. The correlation coefficient that indicates the highest degree of correlation, e.g., the highest value, may be used to determine which match hypothesis is an actual match between the identified distinctive features of each image plane VIL line. The match hypothesis associated with this correlation coefficient, indicating the highest degree of correlation, may be assumed to represent the correct matching of the different identified distinctive features and used as the optimal matched distinctive features for determining characteristics of the object, and/or determining a lack of an object, as described below.

These initial correlation calculations may make several assumptions to restrict which distinctive features may be matched to narrow the set of correlation calculations that need to be made. As a first example, distinctive features of image plane VIL line 312L should be at the same relative location, within an acceptable tolerance margin, or further to the right of a matching distinctive feature on image plane VIL line 312R. Matching a distinctive feature of the image plane VIL line 312L that has a location significantly to the left as compared to the location of the distinctive feature of the image plane VIL line 312R would indicate that the real world object corresponding to this feature is located past the real world VIL line, e.g., having a negative height below a road surface. As a second example, for a set of matched distinctive feature pairs, the distinctive features of the set should have the same order on their corresponding image plane VIL lines. Thus, if sequencing through the set of matched distinctive feature pairs in an order of left to right of distinctive features of one image plane VIL line, e.g., image plane VIL line 312L, the matched distinctive features of the set of matched feature pairs of the other image plane VIL line, e.g., image plane VIL line 312R, should also appear in an order of left to right. For example, in FIG. 9, a set of matching distinctive feature pairs including ($b_l$, $f_r$) and ($f_l$, $b_r$) would violate the restriction of this second example.

As a third example, it may be required that the gradient value of each pair of matched distinctive features both be positive or both be negative. The correlation calculation resulting in the lowest probability of error is selected as representing the correct matching of the different identified distinctive features, i.e., those features that are matched in that correlation calculation are considered the optimal matched distinctive features.

The optimal matched distinctive features may be used to determine real world location of the distinctive features of an object, e.g., vehicle, obstructing the ground VIL line in step S118. Referring to FIG. 9, by matching identified distinctive features $a_l$, $b_l$, $c_l$, $d_l$, $e_l$ and $f_l$ respectively with identified features $a_r$, $b_r$, $c_r$, $d_r$, $e_r$ and $f_r$, the locations, e.g., real world x, y, z coordinates, of each of points A, B, C, D, E and F may be determined, as described herein.

Figure 10:
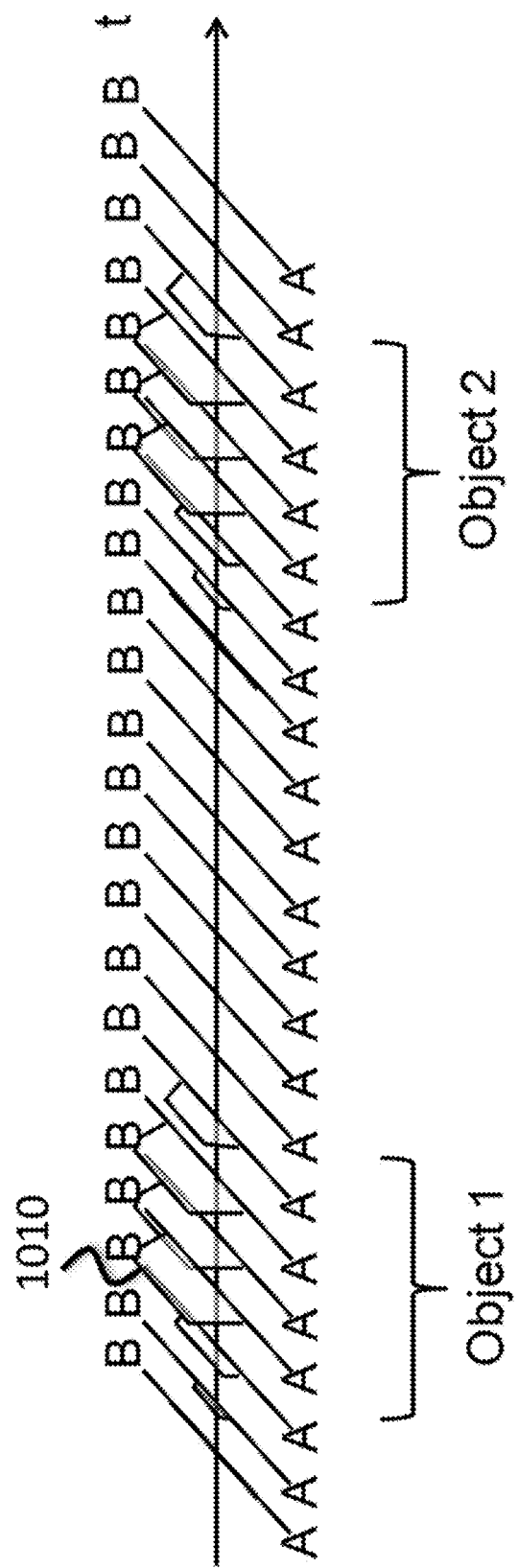
FIG. 10 is an example of cross sectional outlines of objects interposed between a virtual inductance loop line and cameras.

FIG. 10 shows an example of estimated cross sectional outlines of objects interposed between the ground VIL line and the cameras 210L and 210R. FIG. 10 illustrates a plurality of cross sectional outlines 1010 that are obtained from periodically matching of identified distinctive features between the image plane VIL lines 312L and 312R. Specifically, after matching identified distinctive features in step S118, any distinctive features, that have been identified and matched, having a real world height substantially greater than zero, such as greater than zero plus a margin of error in the accuracy of positional detection, may be considered as a point on an object that is interposed between the ground VIL line and the cameras 210L and 210R. Here, points C, D, E, and F are determined as points of an object at a height above the ground plane. Object points C, D, E, and F may then be used to identify a cross sectional boundary of the object interposed between the ground VIL line and the cameras 210L and 210R. Portions of the cross sectional boundary of the object not identified by such object points, may be estimated via interpolation between the locations of neighboring points, e.g., interpolation between the locations of object points C and D. Such cross sectional outline may represent the outer surface of the object interposed between the ground VIL line and cameras at time $t_n$. By periodically repeating steps S112, S114, S116, S118, and S120, a plurality of cross sectional outlines 1010 obtained at times $t_n$, $t_{n+1}$, $t_{n+2}$, . . . , $t_m$ may be obtained, such as those shown in FIG. 10.

Based on the plurality of cross sectional outlines 1010, various analyses may be performed. For example, it will be apparent that after initially detecting an object interposed between the ground VIL line and cameras 210L, 210R, failure to detect an object interposed between the ground VIL line and cameras 210L and 210R may be used to estimate that the object has passed the ground VIL line, e.g., step S122. A sequential, uninterrupted series of cross sectional outlines 1010 from first detection to last detection of an object obstructing a ground VIL line can be estimated to be cross sectional outlines of one continuous object. These cross sectional outlines of a single object can be analyzed to determine the size of the object and estimate the type of the object, e.g., if the object is a person, bicycle, motorcycle, car, truck or other type of vehicle, e.g., step S124. Appropriate action may then be taken based on the information obtained in steps S122 and S124, such as operation of a security gate, e.g., S126.

In some examples, motion detection may be used to improve the performance of the system. For example, motion detection may be used to predict and/or confirm the presence of an object crossing the real world VIL line, such as by detecting an object, tracking the movement of the object as it approaches, crosses and passes over the VIL line. As another example, if there is no motion detected, the system can skip processing or process at a lower frequency, e.g., repeat steps S112 sot S120, to save computing resources. Without detection of significant motion when a valid target is detected using the VIL loop of the embodiments herein, lower confidence may be applied to the detection and further analysis may be performed by the video surveillance system prior to making a determination and/or acting on the determination. In some examples, without detection of significant motion upon detecting a valid target, the system may update the ground background model, which may have slightly changed due to environmental changes. On the other hand, detecting significant motion at the time of detecting a valid target using the VIL loop described herein, may be used to increase the VIL loop detection confidence. Such confidence may be reflected in lowering a threshold, or not raising a threshold, used to make a determination, such as a threshold over which the correlation calculation result must be greater, or a threshold over which intensity gradients must be greater to be made part of further analysis, such being as part of a correlation calculation.

Figure 11:
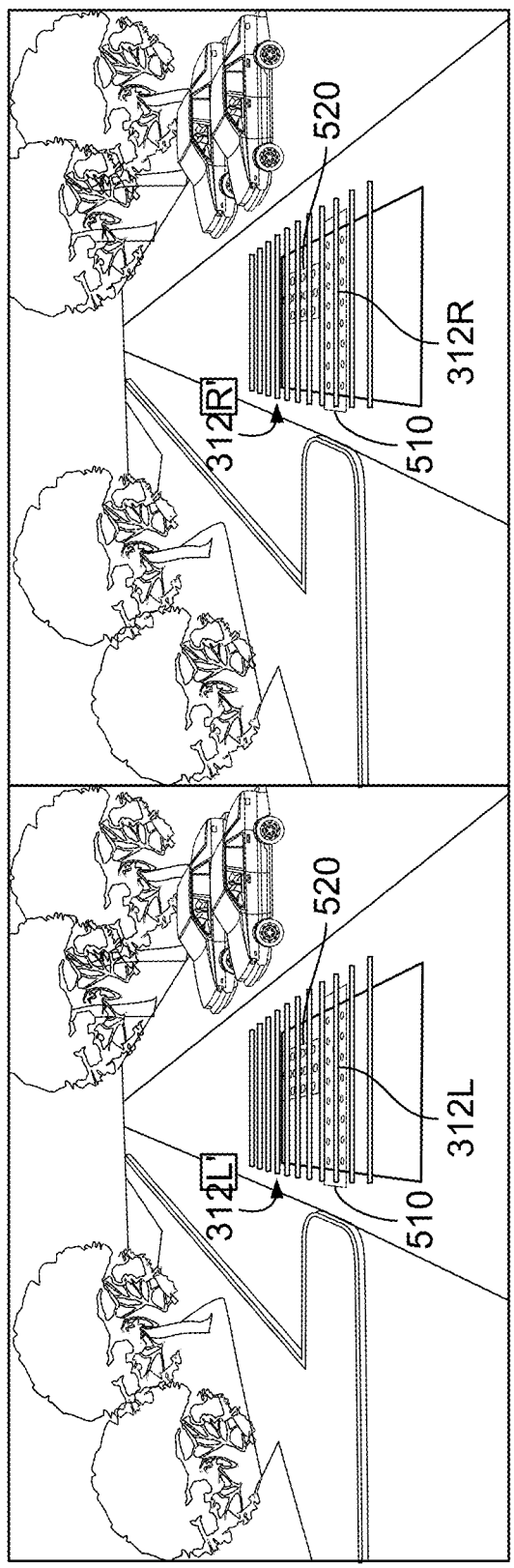
FIG. 11 is an example of generating additional virtual inductance loop lines.

FIG. 11 illustrates an example of establishing additional ground VIL lines. In FIG. 11, mats 510 and 520 are used to establish a first ground VIL line and associated image plane VIL lines 312L and 312R, such as described herein with respect to FIG. 3 and step S110. Additional ground VIL lines and associated additional image plane VIL lines 312L' and image plane VIL lines 312R' may then be established based on a predetermined offset distance, e.g., programmed and/or selectable by a user, from the first ground VIL line. For example, an additional ground VIL line may be established to be offset from the first ground VIL line by one meter and at ground level. Further additional ground VIL lines may be established at ground level and spaced apart from neighboring ground VIL lines at a pitch of one meter. The establishing of the additional ground VIL lines may be performed by determining the real world locations of the ends of the first ground VIL line, associated with 312L and 312R, and having ends of the additional ground VIL lines spaced one meter apart from the same on the ground plane in a direction perpendicular to the first ground VIL line. Image plane VIL lines for each camera may then be established for each of the additional ground VIL lines, e.g., an additional image plane VIL line 312L' and an additional image plane VIL line 312R' for each additional ground VIL line. Step S112 to S126 may be performed for each of the additional ground VIL lines and their associated image plane VIL line 312L' and image plane VIL line 312R'.

In addition, step S122 and S124 may comprise analyzing a detected cross sectional outlines of an object obstructing a plurality of neighboring ground VIL lines. For example, the plurality of cross sectional outlines 1010 shown in FIG. 10 may be obtained at a single instant in time, each being corresponding to a different ground VIL line. This plurality of cross sectional outlines 1010 may be used to determine vehicle height, width and/or depth and thus provide a 3D profile of the object, e.g., vehicle, crossing the monitored region, e.g., such as one of 218a, 218b, or 218c. It should be noted that a depth profile of the object may also be estimated from a single ground VIL line by estimating the speed of the moving object, e.g., through object detection and tracking through multiple frames of a video using standard video analytics.

It should be noted that comparisons between image plane VIL lines, such as discussed herein regarding identified distinctive features, may be with respect to normalized versions of the same, so that any deviation of size or location of these image plane VIL lines are taken into account. Thus, starting and ending points between these image plane VIL lines will be aligned.

Figure 12:
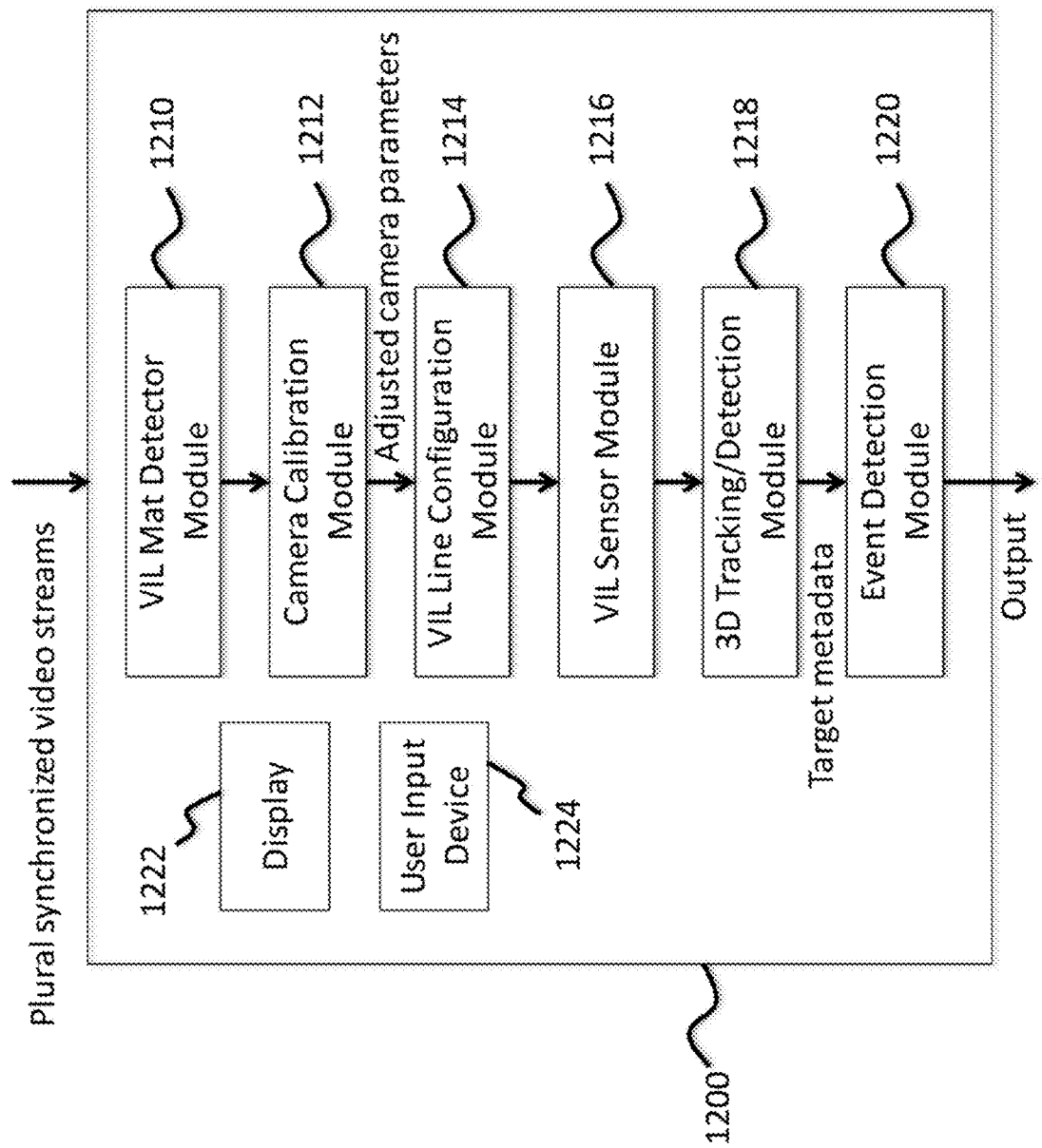
FIG. 12 is an example of a surveillance system using virtual inductance loop lines.

FIG. 12 illustrates an example of a video surveillance system 1200 configured to implement the methods described herein. The video surveillance system 1200 may be, for example, a computer, e.g., general-purpose computer, dedicated computer, network of computers, etc. The modules of the video surveillance system 1200 may be embodied in separate hardware of a computer, but may also be embodied in computer hardware configured by software, where such computer hardware is shared between the modules. The video surveillance system 1200 may also include cameras that generate the plurality of synchronized video streams, such as 210L and 210R discussed herein. Alternatively, the video surveillance system 1200 may include memory, e.g., non-volatile memory, such as NAND flash memory and/or hard disk(s), that stores previously obtained video images and provides the same to the modules shown in FIG. 12.

As shown in FIG. 12, the video surveillance system 1200 receives a plurality of synchronized video streams. The video streams may be sent to the surveillance system in real time, so that frames of different video streams received at a particular instant in time are considered to have been generated at the same time and processed as such. Alternatively, metadata identifying the time the portions of the video streams were taken may be associated with the video streams and sent with the video streams so that the video surveillance system 1200 may determine which frames of the different video correspond to the same instant time and process the video streams accordingly, as described herein.

VIL mat detector module receives the synchronized video streams and analyzes the same to detect VIL mats in the video images, such as discussed herein with respect to steps S110 and S410, S412 and S414. Camera calibration module 1212 receives pattern element location information from the VIL mat detector 1210, e.g., real world coordinates of the pattern elements, such as dots, of the mats, and/or location and orientation information of the VIL mats. Camera calibration module 1212 then calibrates internal and external parameters of each camera that is providing one of the synchronized video streams, such as discussed herein with respect to steps S416, S418, S420 and S422 of FIG. 4. The camera parameters that are calibrated by camera calibration module 1212 may include one or more of lens distortion, focal length, camera tilt angle, camera roll angle, and azimuth angle. After calibration camera parameters, the adjusted camera parameters obtained through such camera parameter calibration by camera module 1212 may be validated by displaying on display 1222 an overlay of virtual mats and pattern elements of the mats based on the determined location of the mats, locations of the pattern elements and the adjusted camera parameters. User input device 1224, such as a mouse, trackpad, keyboard, touchscreen, etc., may be used to confirm that adjusted camera parameters are acceptable, and thus usable by the camera surveillance system 1200 for detection during normal operation. User input device 1224 may be used to set the camera surveillance system 1200 in calibration mode and to exit the calibration mode upon validation noted herein.

VIL line configuration module 1214 may identify a ground VIL line in the real world and corresponding image plane VIL lines in each image plane of the received video streams, e.g., in each image plane of the cameras providing the received video streams. For example, a ground VIL line may be established by a line of pattern elements of a VIL mat, such as described herein with respect to step S110 of FIG. 1, e.g. Additional ground VIL lines and associated image plane VIL lines may be established, such as described with respect to 312L' and 312R' and FIG. 11.

VIL sensor module 1216 may analyze each ground VIL line to determine cross sectional outlines, e.g., 1010 of FIG. 10, associated with one or more ground VIL lines, e.g., the ground VIL lines as identified by VIL line configuration module 1214, by a camera. VIL sensor module 1216 may perform the steps as described herein with respect to S114, S116, S118, and S120 of FIG. 1.

3D target detection and tracking module 1218 may analyze the cross sectional outlines provided by VIL sensor module 1216 to determine if an object has obstructed one or more ground VIL lines. 3D target detection and tracking module 1218 may determine a height, a width and/or depth of an object obstructing a ground VIL line, a type, e.g., person or vehicle, a classification, e.g., motorcycle, car or truck, and/or location of an object obstructing a ground VIL line, such as described herein, e.g., with respect to steps S122 and S124 of FIG. 1. These determinations may be associated with the video streams as metadata by the 3D target detection and tracking module 1218, e.g., associate metadata with the appropriate frames of the video streams.

Event detection module 1220 analyzes the determination results provided by 3D target tracking detection module 1218, which may be in the form of metadata or some other form, to detect an event. The detected event may be one as described elsewhere herein, such as detecting an event that a vehicle has passed a ground VIL line. Event detection module 1220 may detect events using only the determination results provided by 3D target tracking detection module 1218, or may use additional information as well, such as metadata provided by other forms of video analysis, e.g., metadata associated with object identification and object speed by analysis of the video streams.

For example, the video surveillance system 1200 may be configured to receive a plurality of video streams from multiple pairs of cameras. The multiple pairs of cameras may be directed towards a scene. The video streams from the multiple pairs of cameras may be obtained and coupled together to estimate a 3D shape of an object located at the scene. In some examples, the 3D shape of the object is determined by estimated a target height for each virtual inductance loop line that the object passes over in the scene. The various heights may be probabilistically combined to generate a profile for the object, such as a height profile.

In another example, the plurality of video streams may be obtained from cameras directed towards multiple different scenes. Specifically, there may be one or more cameras directed towards each of a plurality different scenes. The plurality of video streams may be obtained and synchronized to be further analyzed to detect features and/or events of the plurality of scenes.

Detected events may cause an output by event detection module 1220. The output may take many forms. For example, the output may cause operation of a security barrier, such as described herein, e.g., with respect to S126 of FIG. 1. The output may be adding metadata to the video streams describing the detected event. The output may be an alert, e.g., alarm, provided to a user, such as to security personnel within security booth 21. The output may be in the form of a report, e.g., when the surveillance system is used in connection with monitoring shopping habits or crowd analysis, or in the form of controlling an operation, e.g., providing an instruction or signal to cause operation of a security gate.

Figure 13A:
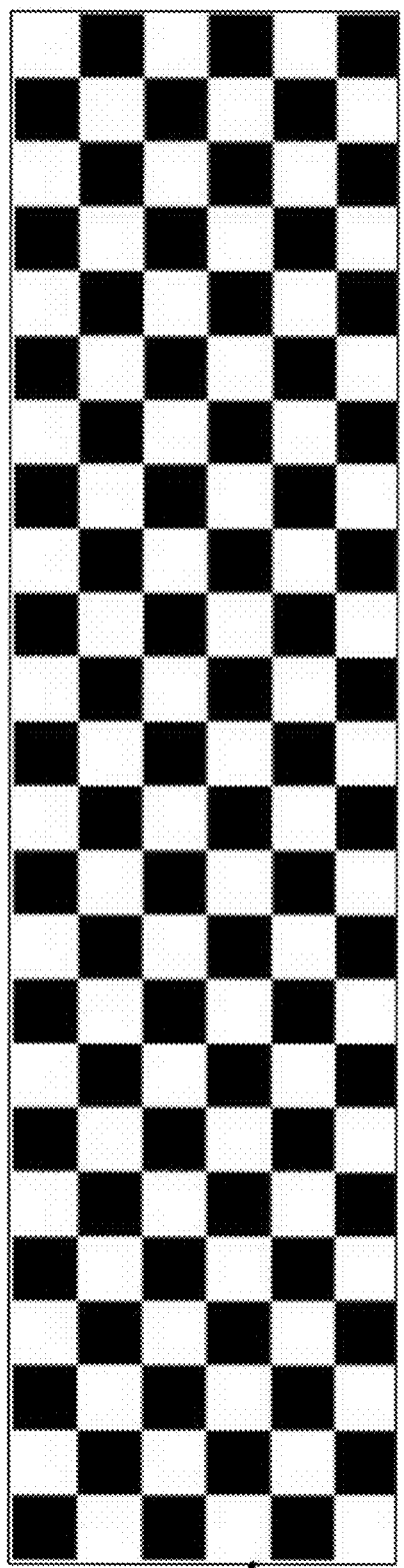
FIGS. 13A-B are examples of surface regions.
Figure 13B:
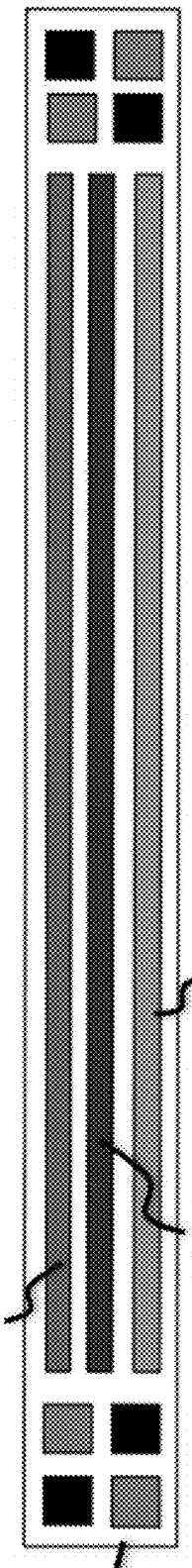

FIGS. 13A and 13B illustrate examples of alternative VIL mats, with different patterns and pattern elements, that may be used with the embodiments described herein. Mat 1310 of FIG. 13A is rectangular with a black and white checkerboard pattern comprised of black square pattern elements and white square pattern elements. Mat 1320 of FIG. 13B is rectangular having pattern elements comprising three different colored lines 1322, 1324, and 1326 extending along the majority of the mat, with two sets of four squares at the ends of mat between which the three colored lines 1322, 1324, and 1326 extend. The two sets of four squares may be symmetrically arranged and colored with respect to each set.

Figure 14:
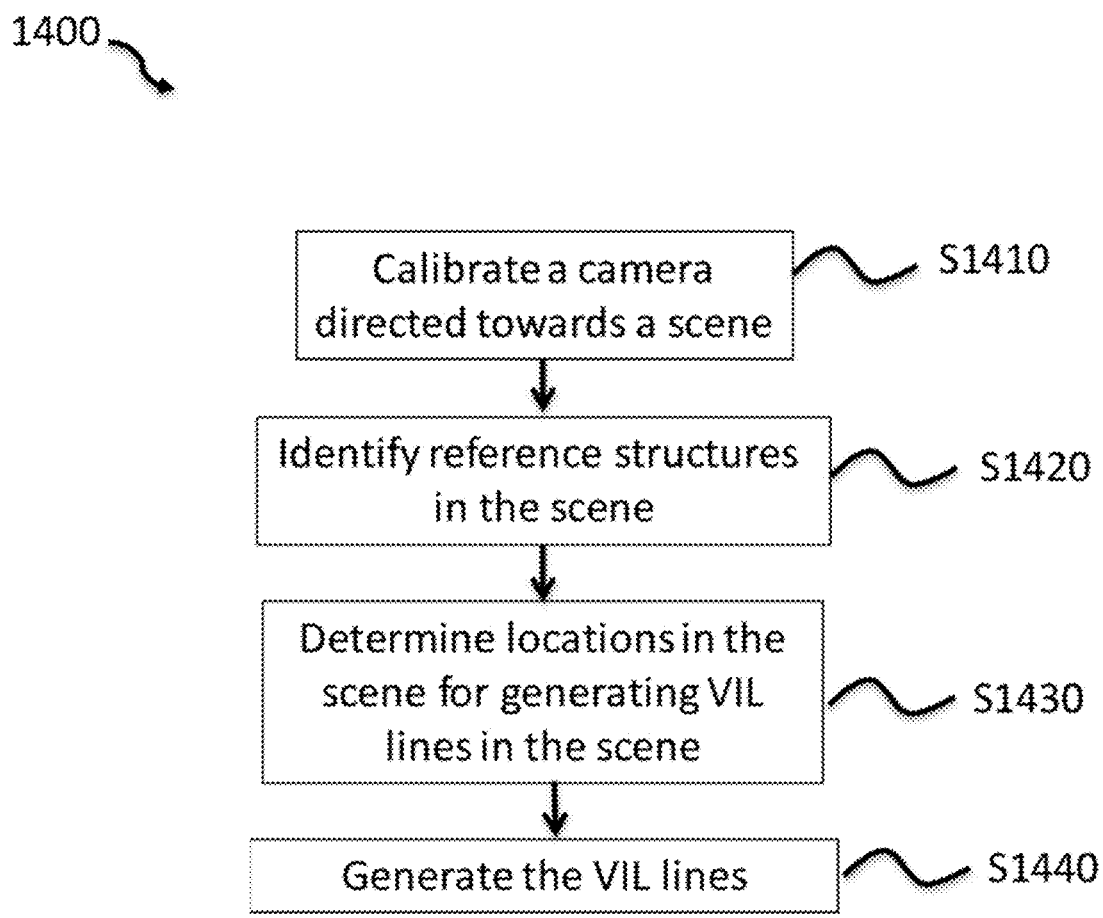
FIG. 14 is a flow chart illustrating an example process for generating virtual inductance loop lines.

FIG. 14 is a flow chart illustrating an example process 1400 for generating virtual inductance loop lines. One or more processors or other computing devices can perform the process 1400. For example, operations of the process 1400 can be performed by system 1200 of FIG. 12. Operations of process 1400 can also be implemented as instructions stored on a non-transitory computer readable medium, and when one or more processors, or other computing devices execute the instructions, the instructions cause the one or more processors to perform operations of the process 1400.

In step S1410, the system is configured to calibrate a camera directed towards a scene. There may be more than one cameras directed towards the scene. For example, the cameras 210R and 210L may be directed towards the scene of FIG. 2A that includes a pivoting barrier arm security gate 212 configured to lower across the roadway, thereby preventing or allowing passage of vehicles 214a, 214b, and 214c. The cameras may be calibrated independently from one another, or calibrated in unison. The camera is calibrated using calibration parameters. The calibration parameters may be received from a remote device by the system. The calibration parameters may also be received input via user input at the remote device, and received by the system. The calibration parameters can include one or more calibration parameters such as a focal length parameter, a tilt angle parameter, a roll angle parameter, and the like. The camera is calibrated so that it may view the scene in focus, and detect objects within the scene.

In step S1420, the system is configured to identify a reference structure in the scene. The process can be configured to identify more than one reference structures in the scene. For example, the system can be configured to identify mats 510 and 520 located in the scene illustrated in FIG. 5. The reference structure can include a mat such as a rollable mat, a folding mat, a constructible mat, and the like. The reference structure may be placed so that it is stationary in the scene to be observed by the camera. In some aspects, the reference structure may include a pattern of identifiers. The pattern of identifiers can include multiple identifiers with similar or different shapes and sizes. The pattern of identifiers may be observed by the cameras and compared to a predetermined set of reference structure including predetermined shapes and sizes. In this instance, a predetermined reference structure may be compared to the observed reference structure to determined locational information pertaining to the observed reference structure with respect to the camera. In certain examples, the reference structure in the scene is identified to extend in a direction parallel to a horizontal displacement of the camera. In this instance, the camera may be determined to have a roll angle of zero degrees with respect to the placement of the reference structure.

In step S1430, the system determines locations in the scene for generating virtual inductance loop lines for the scene. For example, the system may calculate the real locations of dots 512 and 522, corresponding to the respective mats 510 and 520 in FIG. 5, to determine locations in the scene at which to generate the virtual inductance loop lines. The system may determine the locations in the scene based on the identified reference structures such as the dots 512 and 522 of FIG. 5. The locations can include one or more real locations that the camera observes within the scene. In some aspects, the system determines a focal length adjustment for the camera based on the locations in the scene. The system can also determine a tilt angle adjustment and a roll angle adjustment for the camera based on the locations in the scene.

In step S1440, the system generates the virtual inductance loop lines for the scene. For example, as shown in FIG. 3, the system may generate multiple virtual inductance loop lines for the scene. In this example, the system generates a virtual inductance loop line for each of a pair of cameras directed toward the scene. Specifically, the system generates a first virtual inductance loop line 312L for a first camera, and generates a second virtual inductance loop line 312R for a second camera. The virtual inductance loop lines may be generated based on the determined locations in the scene. In some aspects, the process adjusts the calibrations parameters using the generated virtual inductance loop lines. The system can calculate an error value between the calibration parameters and the adjusted calibration parameters. In response to calculating the error value, the system may determine new calibration parameters that minimize a new error value between the calibration parameters and the new calibration parameters. The error value may be used to tune the camera. In this instance, the camera may be tuned so that it is focused to observe the generated virtual inductance loop lines at the scene.

In certain aspects, the system is configured to identify characteristics in the scene. The system can be configured to identify the characteristics in the scene based on the generated virtual inductance loop lines. The identified characteristics may be used to further generate one or more virtual references structures corresponding to the scene. In some examples, the virtual references structures may be compared to the reference structures identified in the scene. In this instance, the system can be configured to determine whether the reference structures match the one or more virtual reference structures. In other examples, the system is configured to identify non-moving objects in the scene. For example, the system can identify a 3D object left behind in regions between the virtual inductance loop lines at the scene.

Figure 15:
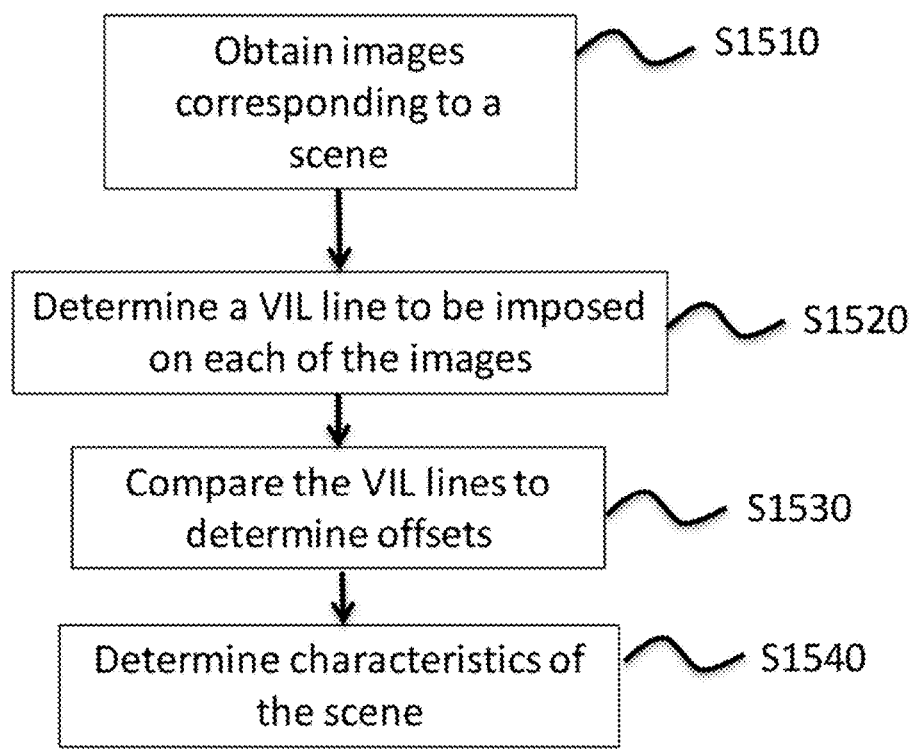
FIG. 15 is a flow chart illustrating an example process for determining characteristics of a scene.

FIG. 15 is a flow chart illustrating an example process 1500 for determining characteristics of a scene. One or more processors or other computing devices can perform the process 1500. For example, operations of the process 1500 can be performed by system 1200 of FIG. 12. Operations of process 1500 can also be implemented as instructions stored on a non-transitory computer readable medium, and when one or more processors, or other computing devices execute the instructions, the instructions cause the one or more processors to perform operations of the process 1500.

In step S1510, two or more cameras directed towards a scene obtain an image corresponding to the scene. Specifically, each of the two or more cameras obtain a respective image of the scene. For example, as shown in FIGS. 2A and 2B, the two cameras 210L and 210R are positioned to view the automated access control point. The image can include a single still image, a plurality of still images, a frame of a video captured by the camera, multiple frames of a video captured by the camera, and the like. In some aspects, the images are synchronized to so that multiple images received at a particular instant in time are considered to have been generated at the same time and processed as such.

In step S1520, a system determines a virtual inductance loop line to be imposed on each of the images. For example, as shown in FIG. 3, the system may generate multiple virtual inductance loop lines for the scene. In this example, the system generates a virtual inductance loop line for each of a pair of cameras directed toward the scene. Specifically, the system generates a first virtual inductance loop line 312L for a first camera, and generates a second virtual inductance loop line 312R for a second camera. The system may determine a virtual inductance loop line to be imposed on each of the images based on a change in light intensity of the virtual inductance loop lines, a change in color of the virtual inductance loop lines, a predetermined length of a particular intensity of the virtual inductance loop lines, a predetermined length of a particular color along the virtual inductance loop lines, and the like. In some aspects, the system determines the virtual inductance loop lines to be imposed on each of the images by establishing a respective ground level plane at the scene and imposing the virtual inductance loop line at the respective ground level plane at the scene for each of the images. Additionally, or alternatively, the process can determine the virtual inductance loop lines to be imposed on each of the images by identifying identifiers at the scene. The process can be configured to determine a location of each of the identifiers at the scene and generate the virtual inductance loop lines with respect to the locations of the identifiers at the scene for each of the images. In some examples, the system is configured to project the virtual inductance loop lines onto an image plane for each of the images corresponding to the scene.

In step S1530, the system compares the virtual inductance loop lines to determine one or more offsets. For example, the system may compare the virtual inductance lines 312L and 312R to determine one or more offsets. The virtual inductance loop line of each image may be compared to determine a difference between the images observed by the cameras with reference to the virtual inductance loop lines.

In step S1540, the system determines one or more characteristics of the scene. For example, FIG. 7C shows an example of identifying characteristics $a_r$, $b_r$, $c_r$, $d_r$, $e_r$, and $f_r$ in a scene. In this instance, the system uses images obtained by the cameras to identify the characteristics $a_r$, $b_e$, $c_r$, $d_r$, $e_r$, and $f_r$ at relative locations along each of the VIL lines 312L and 312R. The system may use the determined characteristics of the scene to determine whether an object passes over the virtual inductance loop lines corresponding to each of the obtained images. For example, if the system determines that the object passes over the virtual inductance lines based on the determined characteristics, the system may perform an action. In this instance, the action may include one or more actions such as triggering a security gate, providing an audio indication of the object passing over the virtual inductance loop lines, providing a visual indication of the object passing over the virtual inductance loop lines, and the like.

In certain aspects, the system is configured to generate cross sectional outlines of an object. The cross sectional outlines may correspond to intersections between the object and the virtual inductance lines. The system can use the generated cross sectional outlines to further determine whether the object has passed over the virtual inductance lines. For example, the system can determine if an object has passed over the virtual inductance lines as well as a particular direction that the object has passed over each of the virtual inductance lines. In some aspects, the system is configured to calculate a height and/or width for each of the determined characteristics of the scene. In this instance, the calculated heights and/or widths of the characteristics may be used to generate the cross sectional outlines of the object. In other aspects, the system is configured to determine a size of the object based on the generated cross sectional outlines of the object. The system may use the determined size of the object to identify the object as a particular type of vehicle, a person, an animal, a person in the vehicle, an animal within the vehicle, and the like.

Figure 16:
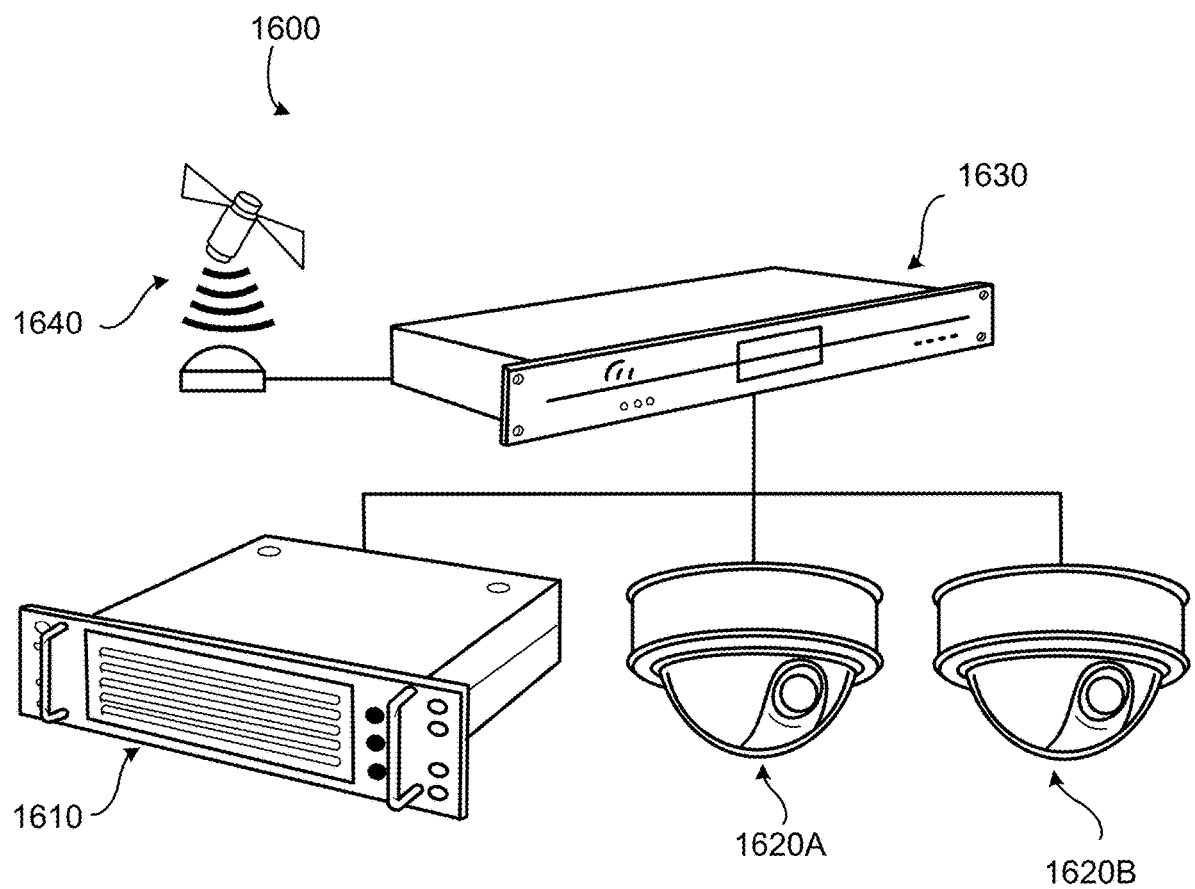
FIG. 16 is an example system for frame synchronization.

FIG. 16 is an example system 1600 for frame synchronization. The system 1600 includes a reference clock 1610, a pair of cameras 1620A and 1620B, a Network Time Protocol (NTP) server 1630, and a Global Positioning System (GPS) device 1640. The system 1600 is configured to determine 3D information of objects that fall within overlapping fields of view of the cameras 1620A and 1620B. For example, as shown in FIG. 12, the frames of images obtained by a plurality of cameras are time-synchronized so that features of the object may be determined using 3D target estimation.

The cameras 1620A and 1620B each include an internal clock that periodically checks the times of each camera. In certain aspects, the cameras 1620A and 1620b check their times using a Network Time Protocol. NTP is a network protocol developed to disseminate accurate time in a computer network, whereby internal clocks of network devices are synchronized with a hardware reference clock, such as reference clock 1610. Usually when a camera is connected to the internet, the camera's clock can be synchronized with a publicly available NTP server that is present within the same geographic region. As such, the NTP server 1630 is configured to initialize the clock settings on each of the cameras 1620A and 1620B. The NTP server 1630 can be configured to periodically correct for any clock drifts that occur on the cameras 1620A and 1620B.

The NTP server 1630 may be a GPS based NTP server that synchronizes the IP camera's clock with that of the same. In this instance, the NTP server 1630 may be connected to a GPS device 1640 over a network. The NTP may periodically check the camera clocks for clock drifts. When clock drifts are detected at the cameras 1620A and 1620B, the cameras' internal clocks may be reset by the GPS based NTP server 1630. In some examples, a video plugin is used to minimize synchronization errors in the video feeds received from the cameras 1620A and 1620B.

Figure 17:
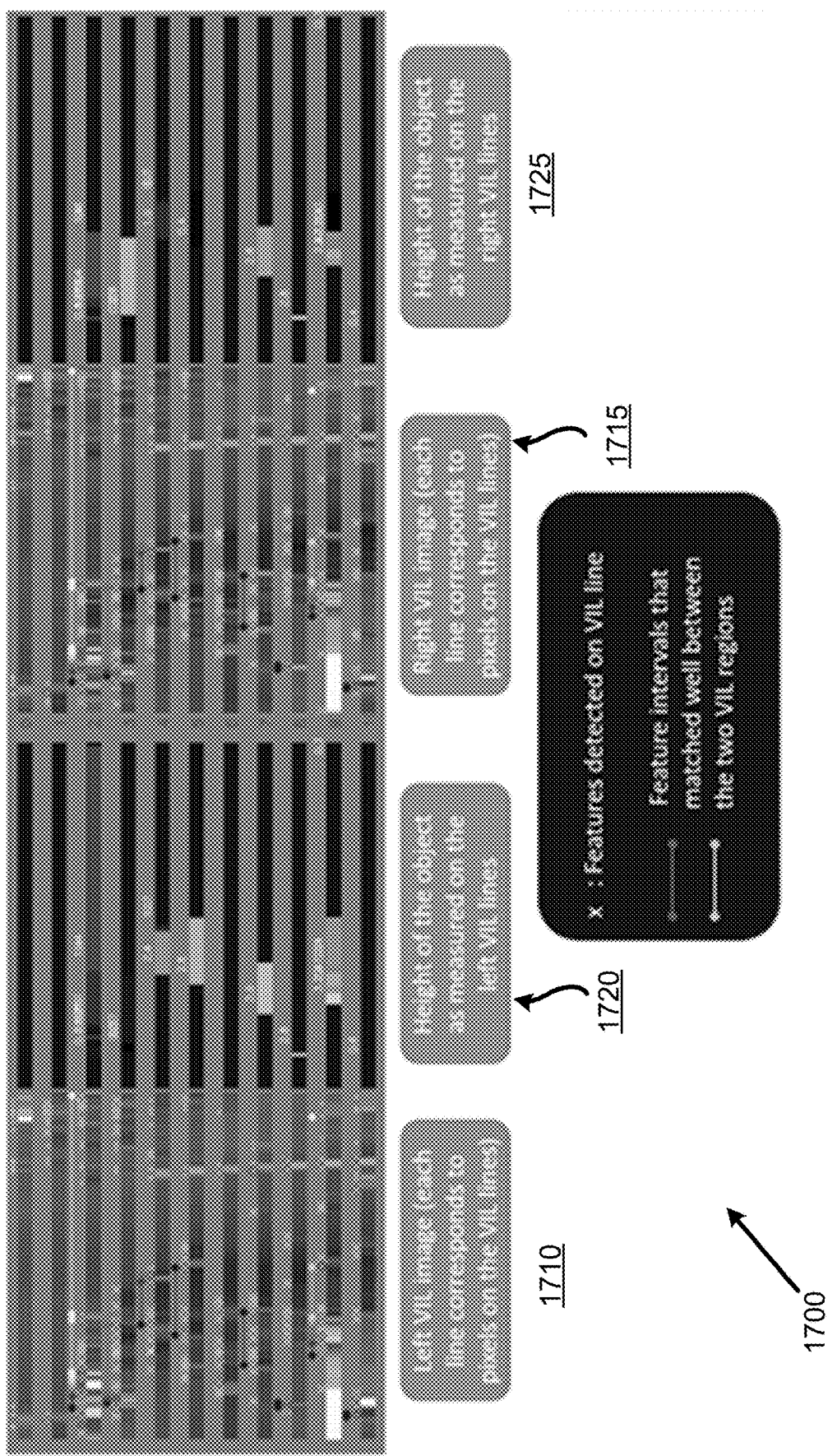
FIG. 17 is an example diagram of feature detection and matching.

FIG. 17 is an example diagram of feature detection and matching 1700. The diagram of feature detection and matching 1700 includes a left virtual inductance loop line image 1710 and a right virtual inductance loop line image 1720. The example diagram of feature detection and matching 1700 illustrates a debugging tool that is configured to analyze the functioning of the virtual inductance loop line system.

Each of the left 1710 and right 1720 virtual inductance loop line images include a plurality of lines. Each line in the images 1710 and 1720 correspond to pixels of the respective images 1710 and 1720 on the virtual inductance loop lines. The left virtual inductance loop line image 1710 is analyzed by the virtual inductance loop line system for features of the scene the left camera is directed towards. The features of the image 1710 may be used to determine a height 1715 of an object that passes over the established virtual inductance loop lines of the left image 1710. The right virtual inductance loop line image 1720 is also analyzed by the virtual inductance loop line system for features of the scene the right camera is directed towards. The features of the image 1720 may be used to determine the height 1725 of the object that passes over the established virtual inductance loop lines of the right image 1720.

For example, referring to FIG. 1, the virtual inductance loop lines may be analyzed by the debugging tool to detect cross sectional outlines of an object obstructing a plurality of established, virtual inductance loop lines. By analyzing the functioning of the virtual inductance loop line system in real time or near-real time, the debugging tool may be used to effectively measure heights of objects that pass across the established virtual inductance loop lines at the scene.

Figure 18:
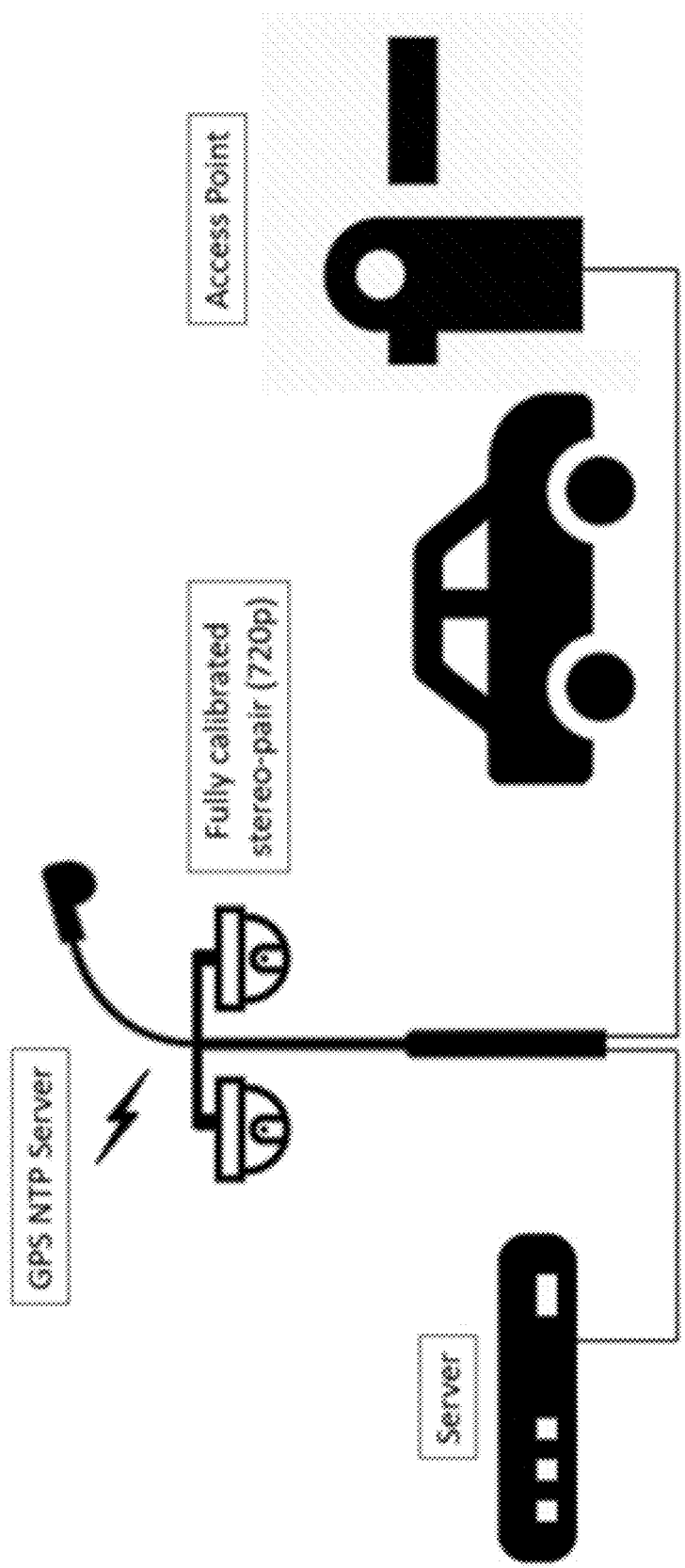
FIG. 18 is an example of a virtual inductive loop system.

FIG. 18 is an example of a virtual inductive loop system. The technologies that are commonly adopted for vehicle detection at access points span one or more combinations of inductive loops, light array sensors, wireless magnetometers, and wireless ultrasonic sensors. Table 1 shown below summarizes the performance of such systems. Upon carefully installing the system and selecting environment friendly system settings, these technologies above have been shown to be mostly effective in detecting vehicles with low detection latency. However, some systems above can pose a fairly invasive installation process, some struggle to detect smaller vehicles, and some other require periodic tuning of detection settings. The costs associated with maintenance and repair of access control systems may be avoided in an alternative more efficient solutions.

Figure 19:
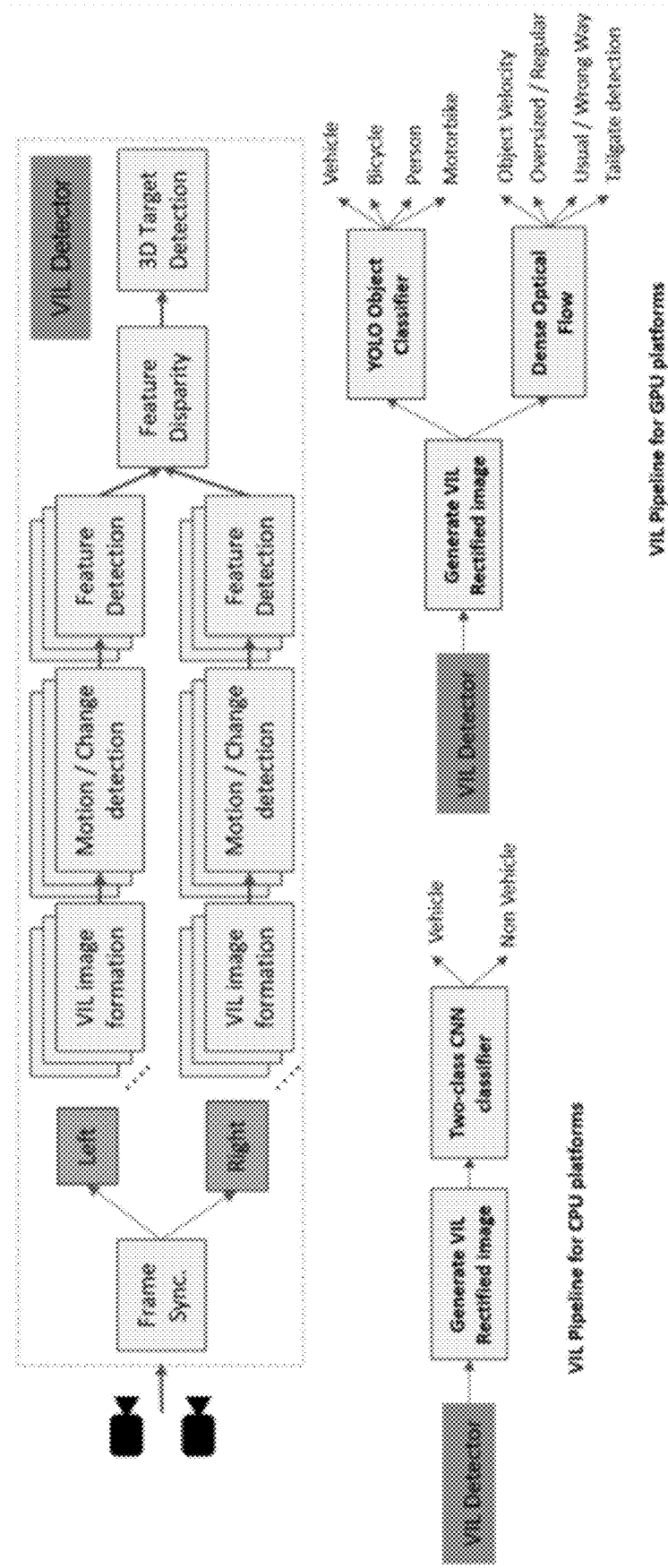
FIG. 19 is an example of a virtual inductive loop system for computer processing unit (CPU) and graphical processing unit (GPU) platforms.

A real-time video analytics system is provided for automated access control named the Virtual Inductive Loop (VIL) system. FIG. 18 depicts the components included in the VIL system. The system components may be selected to maintain low system cost and that the system can be easily installed at a wide variety of environments. The system may detect vehicles with high accuracy, e.g., ~97\% and above, and low detection latency, e.g., ~60 ms, with both metrics meeting the requirements of access control systems. The system can further enhance the functionality of the access gate by providing valuable event analytics, one that is usually missing in traditional solutions. The system may come with built-in tools that self-analyze the operational health of the system, thereby rendering maintenance costs to be low.

forms and GPU platforms, with the latter system packed with a suite of additional capabilities. FIG. 19 illustrates the system pipeline for either platforms. In addition to vehicle detection, the VIL system poses capabilities such as vehicle classification, pedestrian detection, tailgate detection, wrong-way detection, vehicle dismount detection, oversized vehicle detection among other events that pertain directly to the overall security of the facility. The system can be equipped with a web-based user-interface that caters to system setup and event notification in the form of an event dashboard.

The VIL system can include of a pair of outdoor IP cameras overlooking access points, a CPU or GPU server that runs the video analytics algorithms, a GPS based NTP time server that, in an environment devoid of internet access, sets the clock periodically on all system components, and a network switch that provides connectivity between devices. For example, the CPU pipeline can be developed on a Dell PowerEdge R430 and the GPU pipeline on a Dell PowerEdge R730 with a Tesla V100 card on-board.

Figure 20:
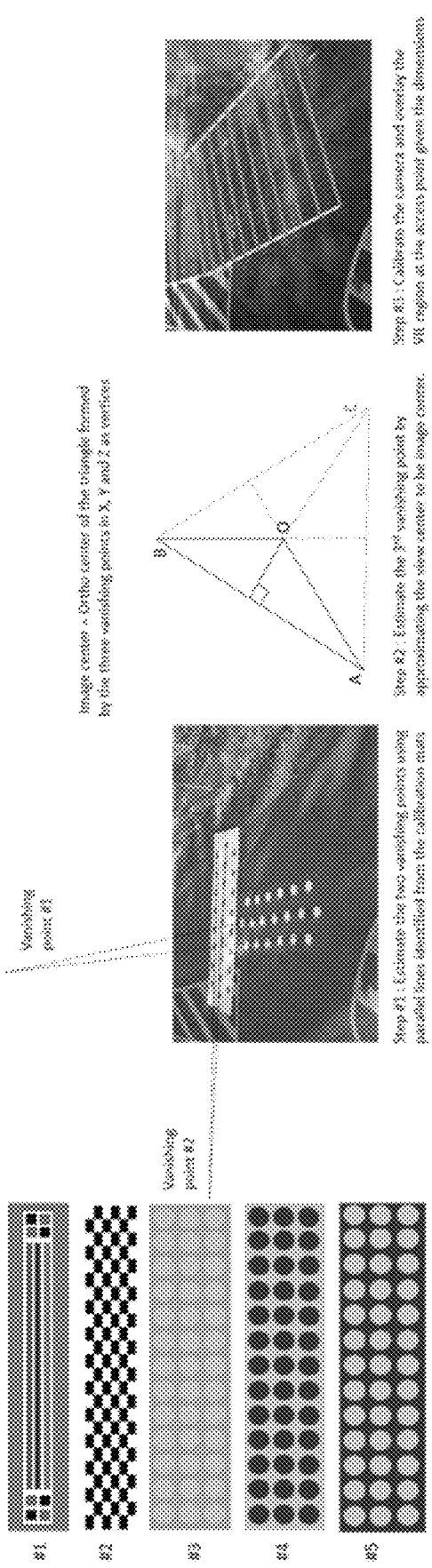
FIG. 20 is an example of camera calibration for a virtual inductive loop system.

FIG. 20 is an example of camera calibration for a virtual inductive loop system. The five calibration mats that were provided for usability across scene conditions are shown. The 3-step camera calibration process is also visually illustrated. A pair of stereo cameras can be installed on an electric pole, or a regular pole, at a height of ~15 ft., for example, with a baseline separation of ~3 ft., for example, overlooking the access point. The electric pole can be located within 30 ft. from the access point, on a same side of the access gate as the approaching vehicle. The stereo cameras can be positioned such that they get an unoccluded view of the access point at all times, with no interference from gate operations, e.g., such as gate opening and closing, and waving tree branches. Benefits exist if both the cameras were similar in pose, e.g., comparable in roll, pitch, and yaw angles.

In environments devoid of network access, a GPS based NTP time server can be installed at the site. The antenna can be set up at a location where it has a clear view of the sky. The clock on the IP cameras and the CPU or GPU server can be set using the GPS NTP time server. Automatic means can be setup to correct clock drifts on all the devices, if one is noted. Additional details on this topic will be discussed subsequently.

TABLE 1

Analysis of commonly adopted technologies for automated access control

| Technology: How it works | Advantages | Disadvantages |
| --- | --- | --- |
| Inductive Loops: Insulated looped electrical cables are are installed under access lanes. Loop inductance increases when vehicles (metal bodies) traverse over it | Works well for large vehicles. Resilient to weather conditions. | High installation costs. Difficulty in selecting sensitivity settings. |
| Light array sensors: A series of light emitters and receivers are installed on either side of the access lane. Vehicles, inside the sensing field, alter receiver output | Works well for large and small vehicles. Less invasive in system installation. | Performance drops in inclement weather conditions |
| Wireless magnetometer: A passive sensing technology to detect large ferrous objects in the vicinity upon measuring change in ambient magnetic field. | Highly compact solution. Works well for large vehciles. Easy installation. | Needs to learn ambient magnetic profile. Misses smaller vehicles. |
| Wireless ultrasonic sensor: An ideal solution for indoor or covered parking. With ultrasonic sensors mounted at access points, vehicles can be detected | Easy installation process, one that eliminates need to. run wires and conduit | Not suitable for outdoor conditions. |

FIG. 19 is an example of a virtual inductive loop system for CPU and GPU platforms. The VIL system is a real-time video analytics system for vehicle detection at access locations. The VIL system was developed to serve CPU plat- A key advantage of the VIL system may be that it can identify a virtual region-of-interest, dubbed as the virtual inductive loop region, over access points, a process that can complete in minutes, and one that can involve no physical modifications to access points. The VIL region can be a rectangular region along the ground plane, at the access point, that comprises of a set of equally spaced parallel VIL lines. Image features can be extracted from the VIL lines and the extracted image features play a key role in object detection. As such, VIL region configuration is a key step. A precursor to VIL region configuration can include the step of camera calibration.

Camera calibration can aid in determining the geometric properties of the image formation process. Camera calibration can entail estimating the intrinsic and extrinsic parameters of the camera. A calibrated camera can understand real-life dimensions of the world and objects that interact with the world around. While there are many techniques to calibrate cameras, the technique described herein can be adopted across different scene conditions. To calibrate the VIL cameras, a few candidate calibration mats with calibration patterns can be overlaid to determine how decipherable the respective patterns were across different daytime illumination conditions.

Five candidate mats can be used.

Mat #1: Patterns appear washed out under direct sunlight. The colors overlaid on the mat and their respective shapes may not be decipherable.

Mat #2: Checkerboard pattern was readable under sunlight, but the corners of squares may not be readable when shadows were cast on the calibration mat.

Mat #3: Yellow circular patterns against gray background may not be readable under sunlight, but not in overcast conditions or when shadows were cast on the mat.

Mat #4 and #5: Both the mats fared well across different illumination conditions. The yellow circular patterns against red background and the same patterns with colors reversed, both performed well in readability. Patterns were readable up to a distance of ~30 feet from the cameras.

Mat #4 and Mat #5 were selected for VIL camera calibration. To calibrate the cameras, mats #4 and #5 can be placed perpendicular to one another on a flat surface in close proximity to the access point location. Subsequently, through the VIL web user-interface, the mid-point and physical dimensions of the access point location need to be specified. This initiates a 3-step camera calibration process, as illustrated in FIG. 20.

Step #1: VIL system can detect the circles on the mat and can identify a set of parallel lines. The VIL system can estimate the two vanishing points along the ground plane.

Step #2: The system can make the assumption that the image sensor comprises of square pixels, has zero skew factor and that the view-center is the image center. Since the camera image center corresponds to the same as the orthocenter of the triangle formed with the three vanishing points as its vertices, the above assumptions naturally yield into estimating the location of the 3rd vanishing point.

Step #3: With the locations of all three vanishing points in hand, the system can seek to identify the focal length, the euler angles, and the translation vector with respect to a world coordinate frame. Given that the calibration mat dimensions are known, the translation vector can be estimated to scale. Upon successful camera calibration, the next immediate step corresponds to the VIL system identifying the VIL region over the access point.

Examples of VIL regions identified in different access control locations are illustrated in FIG. 22(a).

VIL system can adopt the following steps in detecting vehicles at access points. (A) The VIL system can estimate a 3D profile of objects at the VIL region, using stereo depth disparity. (B) The VIL system can perform object tracking and can compute a motion consistency metric to qualify detected events as real or spurious. (C) As a final step, the VIL system can perform a single-frame event verification using a pre-trained deep learning model.

FIG. 21 is an example of an event detection using a virtual inductive loop system. VIL Event Detection: The drawing on the left can illustrate how object of height h in the scene, causes stereo disparity of d pixels on the VIL line. On the right, a vehicle is inside the VIL region and is observed by the stereo cameras. The lateral feature shifts are observed as: red x and green x pertain to locations of strong gradient features from left VIL and right VIL region; yellow line indicates feature correspondences; more the object height at that VIL line, the longer is the yellow line.

The VIL region can comprise a set of parallel, equally spaced lines called the VIL lines that are virtually overlaid at the access point. A VIL image can be formed upon performing image rectification over the VIL region and collating just the image pixels that fall on the VIL lines. FIG. 21 illustrates the VIL images formed when a vehicle entered the access region. The VIL system can execute a background subtraction based change detection algorithm to process the VIL image continuously and upon detecting change on a VIL line, the VIL system can invoke the 3D profile estimation algorithm. On those VIL lines where change was detected, the VIL system can detect feature points corresponding to high 1-D gradients. Subsequently, the VIL system can extract a compact 1-D feature descriptor on these feature points from either cameras and feature correspondences are established.

Corresponding feature points that came from 3D objects inside the VIL region, due to the stereo disparity effect, can appear with a lateral shift in the respective views, while points that came from the ground plane can appear with no shift. FIG. 21 illustrates this effect. With D as the baseline between the stereo cameras, H as the camera height, d as the stereo disparity on the VIL line, the height h of the object inducing the disparity can be approximately estimated as shown in Equation (3), below.

$$h \approx \frac{H \times d}{d + D}. \quad (3)$$

Figure 22:
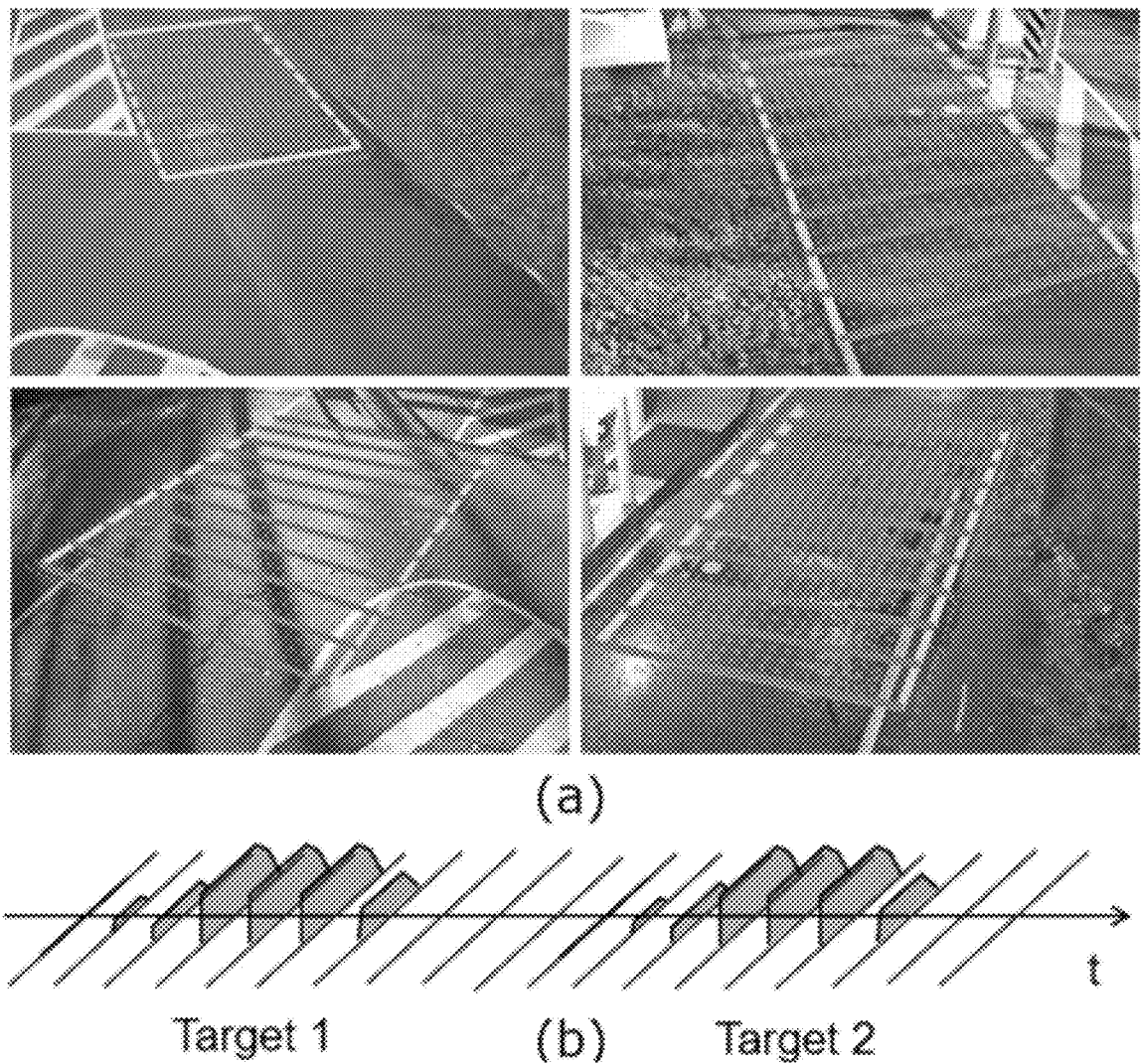
FIG. 22 is an example of identified virtual inductive loop regions during an event detection.

FIG. 22 is an example of identified virtual inductive loop regions during an event detection. FIG. 22a illustrates different VIL regions identified at different access points. FIG. 22b illustrates sample vehicle height profile observed at VIL regions and observed at the VIL lines.

Figure 23:
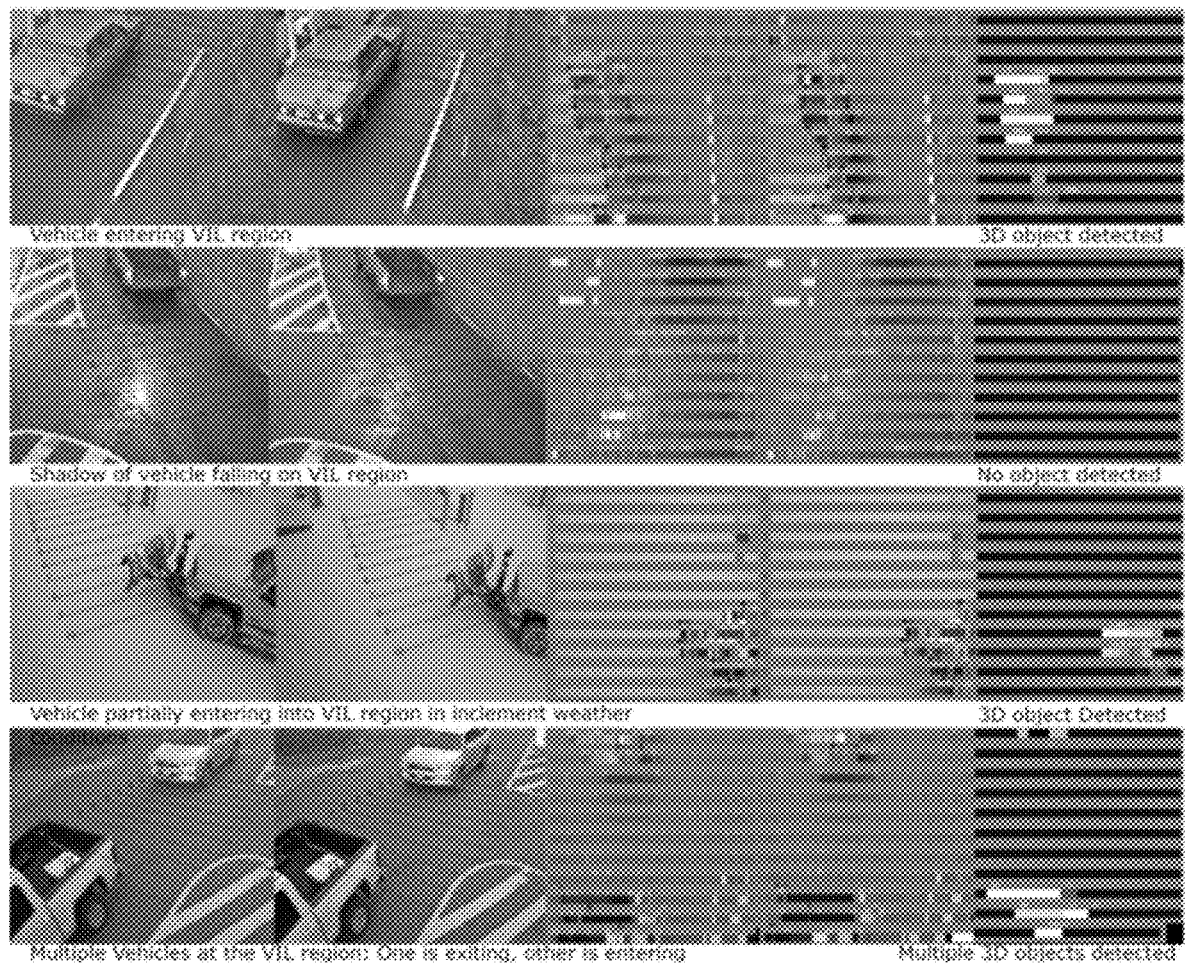
FIG. 23 is another example of an event detection using a virtual inductive loop system.

FIG. 23 is another example of an event detection using a virtual inductive loop system. Four different events are illustrated: (i) Vehicle is waiting at the access region. The depth map estimated in the right column, indicates presence of a vehicle. (ii) Vehicle has exited from the VIL region. The shadows cast on the VIL region and the glare on the road surface, may not impact VIL. The VIL system can identify the VIL region as being devoid of objects. (iii) A snow plow truck is partly entering into the VIL region. The depth estimates localize the truck inside the VIL region (iv) two vehicles are simultaneously present at the VIL region with one entering and one exiting. Depth profiles were estimated at the respective VIL regions.

Figure 24:
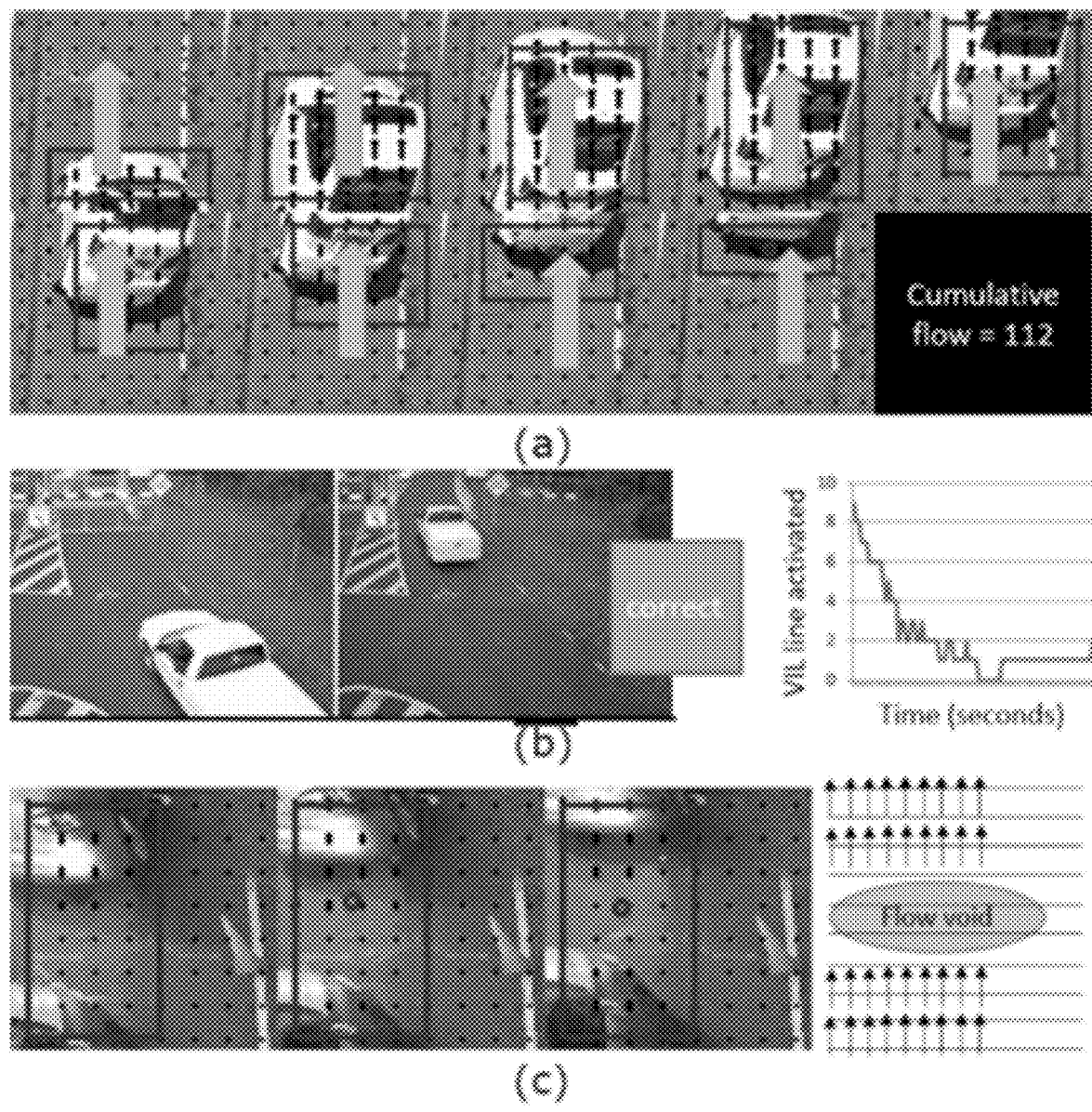
FIG. 24 is an example of computing an optical flow based metric in a virtual inductive loop system.

FIG. 24 is an example of computing an optical flow based metric in a virtual inductive loop system. FIG. 24 provides an illustration of optical flow based metric that is computed for every tracked object. Further, the VIL line activation sequence for a typical event is illustrated.

The VIL system can detect 3D objects at the VIL region, and can track the detected 3D objects using mean-shift tracking. In some implementations, the VIL system can associate a unique track-ID with an object over its entire course of traversing through the access point. Under challenging conditions, the mean-shift tracker can lose track of the object and incorrectly assign a new track ID to the same entity. In circumventing such challenges, the VIL system can correct for the tracking error, by studying trajectory hand-off characteristics between the disjoint object track-IDs such as: proximity between locations at which object track termination and re-initiation was observed. Further, upon computing optical flow over the VIL region, the VIL system can observe discontinuity in optical flow as illustrated in FIGS. 24(a) and 24(c) as a cue that two distinct objects are present at the access region and hence two objects with distinct object IDs are tracked.

Upon tracking an object at the VIL region, the VIL system can compute a motion consistency metric using the sequence at which VIL lines were activated. A VIL line is said to be activated, if the VIL system detects a 3D object with a height that is above a preset threshold that was first detected at that line. Real events involving vehicles traversing through the access point display continuity in the VIL line activation sequence, an attribute that can hardly be associated with spurious events. FIG. 24(b) illustrates the typical sequence of VIL line activations as a vehicle traverses through the access region.

FIG. 25 is an example of training data for a neural network classifier in a virtual inductive loop system. FIG. 25(a) illustrates that the VIL system can train a lightweight convolutional neural network (CNN) vehicle classifier for CPU platforms using data acquired from real-life access points for event verification. FIG. 25(b) illustrates that a YOLO detector was used for single-frame based event verification in GPU platforms.

As a final step, the VIL system can perform a one-frame event verification on detected events, using a pre-trained deep learning model. In CPU platforms, a lightweight CNN classifier is invoked to verify the event. In GPU platforms, the YOLO detector for vehicle presence can review the video frame that was most representative of the event.

The VIL system, apart from solving vehicle detection at access points, has the inherent ability to gather invaluable event metadata listed below:

(i) Tailgating: When two vehicles are simultaneously detected and tracked at the VIL region, the VIL system can keep track of a spacing between them by counting the number of non-activated VIL lines between them as shown in FIG. 24(c). If that number falls below a threshold, the system can generate an alert for tailgating.

(ii) Oversized vehicle: When oversized vehicles enter the VIL region, the system can detect them using cumulative optical flow computed when the vehicle traversed through the VIL region and the number of instances when all the VIL lines remained activated as cues.

(iii) Wrong-way motion: When the VIL system determines that the VIL line activation sequence is the reverse of what is anticipated, the VIL system can signal that objects are moving in the wrong direction.

(iv) Speeding: If a vehicle sped through the access point, the VIL system can compute the median length of optical flow vectors to detect such an instance.

(v) Delayed access: the VIL system can keep track of the median time taken for each authorized vehicle to gain access onto the site. If a vehicle remained at the access point for longer than a preset threshold, the VIL system can generate an alert for delayed access.

(vi) Pedestrian/bicycle activity: The VIL system, using the VIL-GPU solution, can detect this event, given that YOLO classifier can perform event verification.

The VIL system was set up at a Naval Base in The United States and five real-life access regions were monitored upon setting up a stereo camera pair over each access region. The VIL-CPU and VIL-GPU solutions, both were run simultaneously on the VIL server running event detection over the five access regions. Further, the VIL system included a DVR application that was set up such that hour-long time-synchronized videos were collected from the access regions continuously for many months over a 2-year span. Hundreds of hours of videos that were collected across months were passed through a manual ground truth annotation process. The ground truth annotation process collected the following metadata for each event. Event timestamps: Event-start and event-end, as vehicles traversed through the access region. Object type: The object-types were saved as regular vehicle, human, motorbike, truck, and bicycle.

The VIL system can measure the performance of the VIL-CPU and VIP-GPU solutions using precision and recall. Precision can be calculated as indicated in Equation (4) below. Recall can be calculated as indicated in Equation (5), below.

$$\text{precision} = \frac{TP * 100}{TP + FP}\%. \quad (4)$$

$$\text{recall} = \frac{TP * 100}{TP + FN}\%, \quad (5)$$

In Equations 4 and 5 above, TP, FP and FN correspond to True positives, False positives and False negatives. The VIL system can count VIL event detection segments that began any earlier than event-start or persisted for any longer than event-end by over a second as False positives. Similarly, the VIL system can count event detections that were either delayed or truncated by more than a second in comparison to event-start and event-end timestamps as False negatives.

Table 2 details precision and recall numbers of the VIL-CPU and VIL-GPU solutions on data gathered from five access point locations. Further, the table provides the detection rates on randomly sampled 119 hours of data from outward traffic and 51 hours of data from inward traffic, whereby vehicles approach the access point from behind the stereo camera and from front of the stereo camera respectively. Table 3 provides information on how far into the VIL region, do vehicles have to traverse for them to be detected by the VIL system. The addition of deep learning based event verification delayed the event detection marginally, with the vehicle having traversed two or three VIL lines further, prior to event verification.

TABLE 2

Performance of the VIL system at 5 different access points

|  | Classifier | TP | FP | FN | Pre | Rec |
|---|---|---|---|---|---|---|
| #1 | VIL only | 1018 | 38 | 24 | 96.4 | 97.7 |
|  | VIL + CNN | 1017 | 38 | 25 | 96.4 | 97.6 |
|  | VIL + YOLO | 1005 | 0 | 38 | 100 | 96.4 |
| #2 | VIL only | 1341 | 11 | 27 | 99.2 | 98 |
|  | VIL + CNN | 1338 | 10 | 30 | 99.3 | 97.8 |

TABLE 2-continued

Performance of the VIL system at 5 different access points

|    |            |      |    |    |       |      |
|----|------------|------|----|----|-------|------|
|    | VIL + YOLO | 1319 | 0  | 58 | 100   | 95.8 |
| #3 | VIL only   | 427  | 8  | 6  | 98.2  | 98.6 |
|    | VIL + CNN  | 427  | 6  | 6  | 98.6  | 98.6 |
|    | VIL + YOLO | 424  | 0  | 9  | 100   | 97.5 |
| #4 | VIL only   | 1036 | 10 | 5  | 99.0  | 99.5 |
|    | VIL + CNN  | 1036 | 7  | 5  | 99.3  | 99.5 |
|    | VIL + YOLO | 1035 | 1  | 6  | 99.9  | 99.4 |
| #5 | VIL only   | 280  | 25 | 0  | 100   | 91.8 |
|    | VIL + CNN  | 279  | 0  | 1  | 99.6  | 100  |
|    | VIL + YOLO | 278  | 0  | 2  | 99.28 | 100  |

| Lane: #hours   | TP   | FP | FN | Pre  | Rec  |
|----------------|------|----|----|------|------|
| Outward: 119 hrs | 3116 | 10 | 25 | 99.9 | 99.2 |
| Inward: 51 hrs   | 1422 | 0  | 17 | 100  | 98.8 |

TABLE 3

Median VIL line activated at detection

| Loc | VIL | VIL + CNN | VIL + YOLO |
|-----|-----|-----------|------------|
| #1  | 4   | 6         | 6          |
| #2  | 6   | 7         | 7          |
| #3  | 6   | 9         | 9          |
| #4  | 4   | 6         | 6          |
| #5  | 5   | 7         | 7          |

Figure 26:
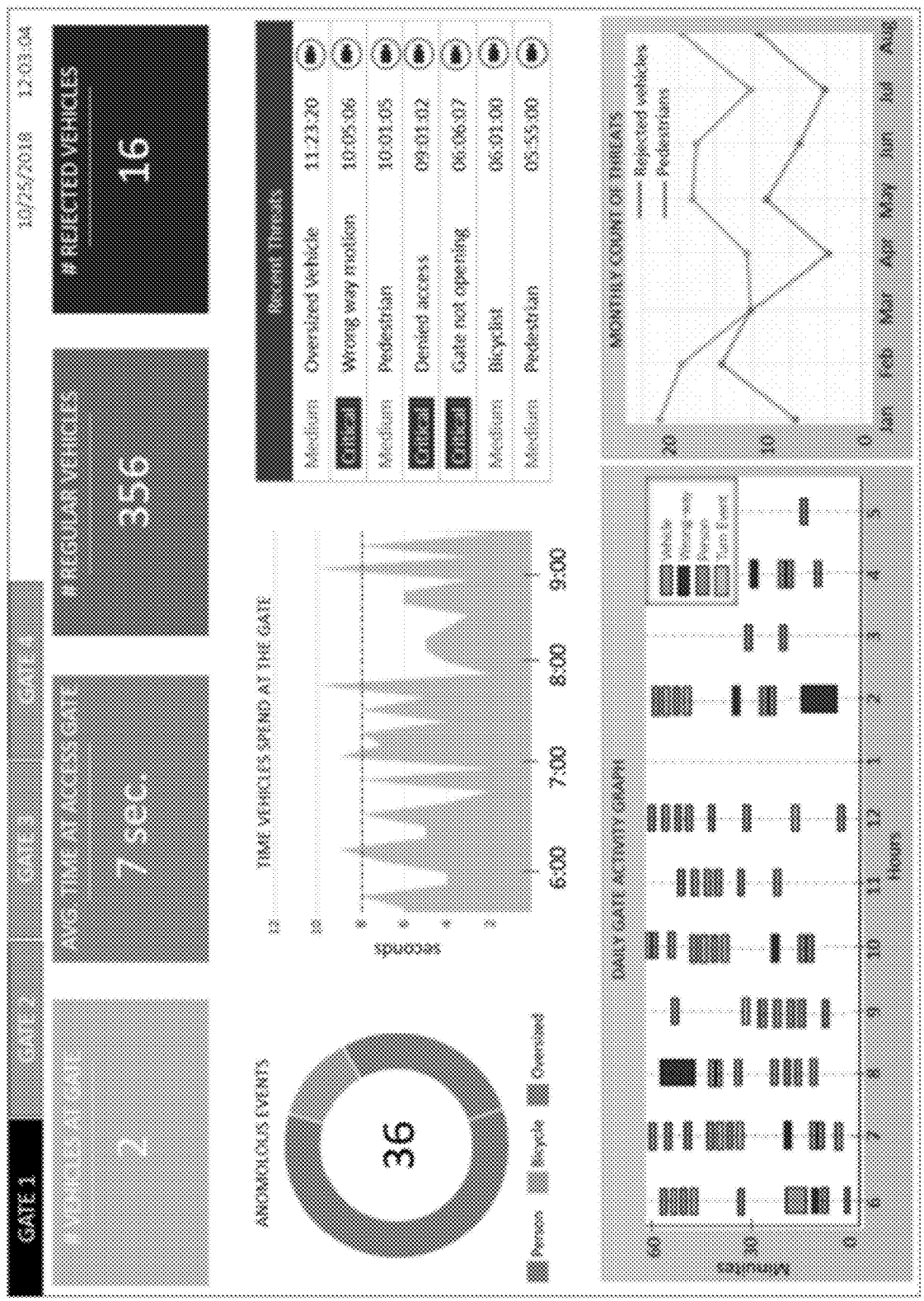
FIG. 26 is an example of a virtual inductive loop event dashboard.

FIG. 26 is an example of a virtual inductive loop event dashboard. FIG. 26 provides an illustration of the VIL event dashboard to which event updates are pushed periodically for user review. The VIL system can include a self-health analysis tools that checks for a high degree of time synchronization between the camera feeds and an unmitigated view of the access point on both cameras.

Time synchrony: a video plug-in that uses RTSP timestamp of video frames from the stereo cameras in providing two closest video frames, in time, as input to the VIL system. Over 99.7% of the frames provided as input to the VIL system were within 60 ms in inter-frame latency, for example. The VIL system can periodically estimate time drifts between the two frames by: (i) checking for one-to-one correspondence between activated VIL lines on either cameras, when event occurs; and, (ii) reading the clock timestamp embedded on the video frame using OCR and checking for time drifts. The VIL system can generate a health alert if a lack of time synchronization between the two camera feeds is detected. The VIL system can infer if lack of time synchronization is detected based on (i) or (ii) discussed above. The VIL system can generate a health alert if either event was observed.

Occluded camera view: Cameras can be occluded by factors such as foliage growth, spider webs, and other forms of debris covering the camera lens. When the VIL system detects object motion in one video stream and not the other, the system alerts the user on potentially blocked field of view on either of the cameras.

Finally, as illustrated in FIG. 26, the VIL can display an event dashboard to a user, whereby the user can be notified of activity at the access location. The dashboard can include a daily activity graph, which captures event type, event duration and time of occurrence in a compact form. In addition, the dashboard can provide key operational statistics of the access gate that both summarize activity and highlight need for improving operational efficiency at the gate.

The VIL system can be highly effective in detecting vehicles at access points. The VIL system can be set-up with ease and provide low long-term maintenance. The VIL system can arm users with invaluable event analytics, thereby augmenting the security of the facility. This technology is primed for rapid adoption in the space of access control systems.

FIG. 27 is a flowchart illustrating an example process 2700 for determining whether an object passes a virtual inductance loop line. The VIL system can perform the process 2700.

The VIL system can obtain image data from one or more cameras (2702). For example, the VIL system obtain image data from a pair of stereo cameras that overlook an access point. The pair of stereo cameras can be mounted, for example, to view a region at an inbound or outbound access point to a security station. The image data can be, video or images, taken at periodic intervals or at a continuous interval. The video images obtained from the two or more cameras may be synchronized so that the VIL system may analyze and compare information obtained from frames of the video images that are taken at the same moment in time.

The VIL system can identify a region in the image data, the region comprising a plurality of lines spaced a predetermined distance apart (2704). In some implementations, the pair of stereo cameras can be mounted to a location to view the region of the access point. The region can include one or more ground virtual inductance loop line or a ground VIL line that can be used to extend between two corresponding fix points at ground level in the real world. The two points in the real world may have been established or previously identified during calibration of the system. The pair of stereo cameras can analyze the region to identify markers and provide real world coordinates to the markers. For example, an origin may be determined as a point at ground level equidistant between the left camera and the right camera, or the origin may be determined as a point below one of the cameras 210L and 210R. Locations of a first marker, e.g., $(x_1, y_1, z_1)$, and a second marker, e.g., $(x_2, y_2, z_2)$, relative to the origin may be determined. The real world ground VIL line may be determined as a line extending between the locations of the first and second marker, i.e., between points $(x_1, y_1, z_1)$ and $(x_2, y_2, z_2)$. In some examples, a plurality of first and second markers may be realized, which can correspond to a plurality of ground VIL lines in the region. The plurality of ground VIL lines, which are virtually overlaid in the image data, can be equally spaced apart in the region at the access point.

For each line in the region, the VIL system can determine an activated line based on whether an object that satisfies a height criteria is detected in the line (2706). For example, the VIL system can identify distinctive features along an image plane of the VIL lines in the region from the image data. For example, the distinctive features can be identified by estimating one-dimensional gradients on the VL lines. For example, the distinctive features along the image plane VIL line may arise as a result of a sudden change in intensity of light, a sudden change in color, identification of a somewhat consistent uninterrupted length of intensity, and/or a somewhat consistent uninterrupted length of the same color. The VIL system can then match the identified distinctive features along the image plane VIL lines in which a change was detected of one camera to at least some of the identified distinctive features along the image plane VIL line in which a change was detected of the other video cameras. In other examples, the VIL system may employ more than two cameras to monitor the access point.

The VIL system can then determine a height of each of the matched features. The VIL system can determine the height of the matched features to estimate a cross sectional outline that can include the height and width of a cross section of any object intersecting on the VIL line, e.g., an object that is interposed between the cameras and a line extending between two known points in the real world. The VIL system can generate a plurality of cross sectional outlines to estimate when the object has completely passed the ground VIL line(s) or when the object has initially obstructed the ground VIL line(s).

Based on the determined size of the object, the VIL system can identify the object. For example, the VIL system can identify or estimate the object as the object passes over the ground VIL line due to the set of cross sectional outlines corresponding to three-dimensional characteristics of the vehicle. These three-dimensional characteristics can correspond to a detected height, width, and size of the object. For example, one such example to calculate the height corresponds to FIG. 21. With D as the baseline between two stereo cameras, H as the camera height, d as the stereo disparity on the VIL line, the height h of the object inducing the disparity can be approximately estimated using Equation (3) above. Here, the VIL system can detect the object can be a vehicle and that its plurality of cross sectional outline is consistent with a known vehicle size, e.g., consistent with a size of a sedan, SUV, pickup truck, convertible, eighteen-wheeler truck, etc. For example, minimum height and widths of a vehicle may be determined, e.g., a minimum height of 3 feet and a minimum width of 5 feet, and if the detected object has a height taller than the minimum height, e.g., higher than 3 feet, in height and wider than the minimum width, e.g., wider than 5 feet, it may be estimated that the object is a vehicle. Different criteria can be applied for other vehicles, e.g., small sedans, motorcycles, mopeds, and of pedestrians. In other examples, the VIL system can analyze a speed of the object to determine a relative spacing between the plurality of cross sectional outlines, and in response, determine a 3D outline of the object. The cross sectional outlines, e.g., height and width, detected by two ground VIL lines may be matched and thus the speed of the object may be estimated by determining how long it took the same portions of the object to move from the first ground VIL line to the second ground VIL line. Based on the detected speed of the object, the distances between the cross sectional outlines may be determined, and ultimately, aid the VIL system in identifying the object.

In response to determining that the object that is detected in the line satisfies the height criteria, the VIL system can determine whether an event occurred based on (i) which of the lines were activated and (ii) an order in which each of the activated lines were activated (2708). For example, in response to the VIL system detecting an object in the region, the VIL system can track the object. The object can be tracked by, for example, mean-shift tracking. When an object is detected, the VIL system assigns a unique track-ID associated with the object over a course of the objects traversal through the region, e.g., through the plurality of VIL lines.

The VIL system, when tracking the object at the VIL region, generates a motion consistency metric using the sequence at which VIL lines were activated. For example, the VIL system can determine that a VIL lines is activated when a 3D object with a height that is above a preset threshold was first detected at that line. Then, the VIL system can determine real events involving objects, e.g., vehicles, traversing through the access point display continuity in the VIL line activation sequence. These events can include, for example, tailgating between two vehicles, a vehicle moving in the wrong direction, a vehicle speeding, delayed access, pedestrian/bicycle activity, or an oversized vehicle.

In some implementations, the VIL system can perform an additional process verification of detected events. The additional process can include providing a frame of the image data to a pre-trained deep learning model to verify that the VIL system properly detected an event. For example, if the VIL system determines that an a vehicle traveling in the wrong direction was performed based on a number of lines that were activated and a determination that the order of the lines that were activated occurred in a reverse direction, then the VIL system can provide a frame of that image data to the pre-trained deep learning model to verify the vehicle was actually traveling in the wrong direction. In some implementations, the VIL system can provide the frame of image data to a particular system based on a component of the VIL system. For example, if the component of the VIL system that houses the pre-trained deep learning model corresponds to one or more CPUs, then a light weight CNN classifier is invoked to verify the event. In another example, if the component of the VIL system that houses the pre-trained deep learning model corresponds to one or more GPUs, then the video frame from the image data that was most representative of the event is provided to a YOLO detector for vehicle presence and verification of the event.

Figure 28:
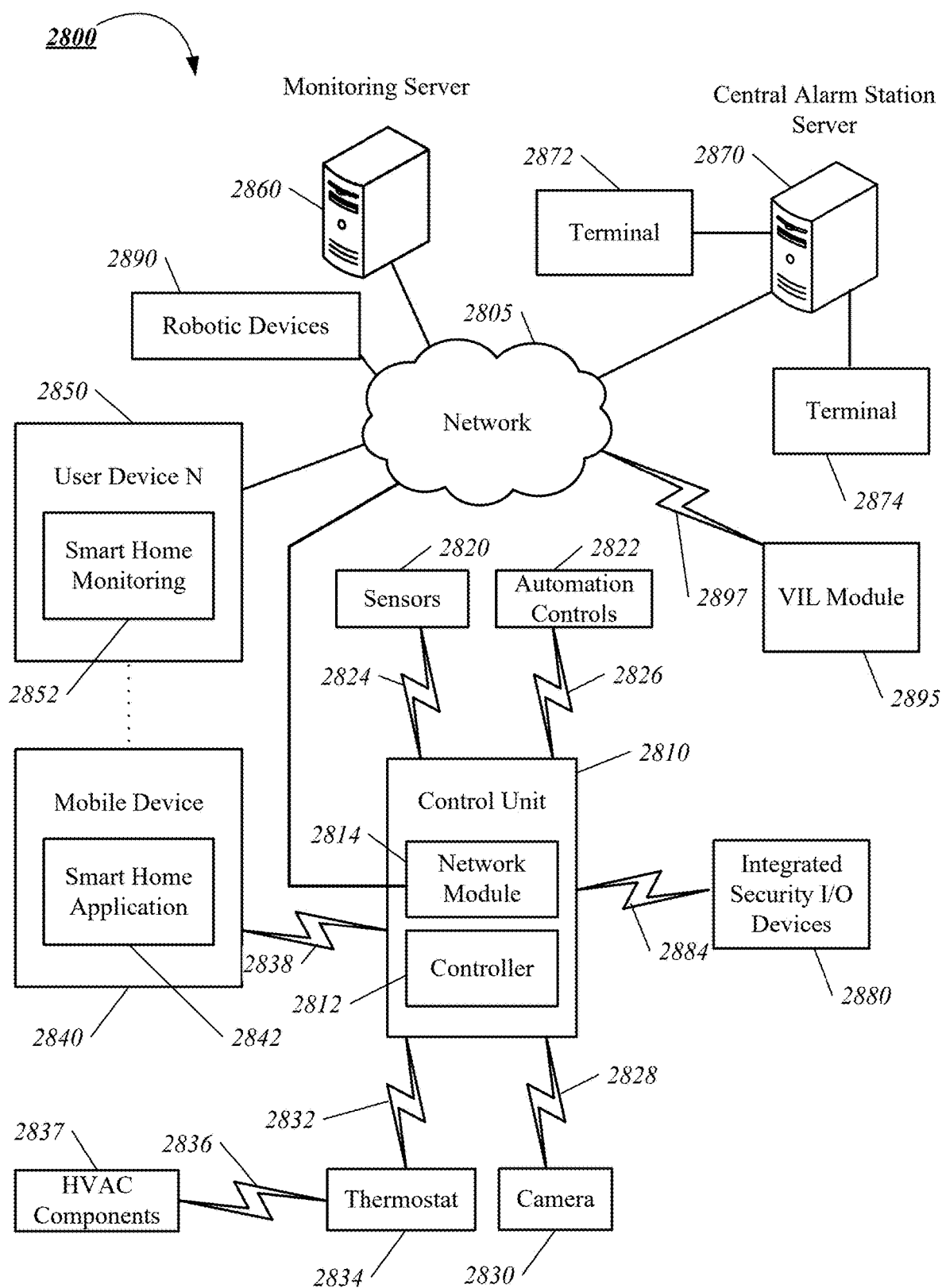
FIG. 28 is a block diagram of an example system for a virtual inductive loop that may utilize one or more various components.

FIG. 28 is a diagram illustrating an example of a property monitoring system 2800. The property monitoring system 2800 includes a network 2805, a control unit 2810, one or more user devices 2840 and 2850, a monitoring application server 2860, and a central alarm station server 2870. In some examples, the network 2805 facilitates communications between the control unit 2810, the one or more user devices 2840 and 2850, the monitoring application server 2860, and the central alarm station server 2870.

The network 2805 is configured to enable exchange of electronic communications between devices connected to the network 2805. For example, the network 2805 may be configured to enable exchange of electronic communications between the control unit 2810, the one or more user devices 2840 and 2850, the monitoring application server 2860, and the central alarm station server 2870. The network 2805 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 2805 may include multiple networks or subnetworks, each of which may include, for example, a wired or wireless data pathway. The network 2805 may include a circuit-switched network, a packet-switched data network, or any other network able to carry electronic communications (e.g., data or voice communications). For example, the network 2805 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 2805 may include one or more networks that include wireless data channels and wireless voice channels. The network 2805 may be a wireless network, a broadband network, or a combination of networks including a wireless network and a broadband network.

The control unit 2810 includes a controller 2812 and a network module 2814. The controller 2812 is configured to control a control unit monitoring system (e.g., a control unit system) that includes the control unit 2810. In some examples, the controller 2812 may include a processor or other control circuitry configured to execute instructions of a program that controls operation of a control unit system. In these examples, the controller 2812 may be configured to receive input from sensors, flow meters, or other devices included in the control unit system and control operations of devices included in the household (e.g., speakers, lights, doors, etc.). For example, the controller 2812 may be configured to control operation of the network module 2814 included in the control unit 2810.

The network module 2814 is a communication device configured to exchange communications over the network 2805. The network module 2814 may be a wireless communication module configured to exchange wireless communications over the network 2805. For example, the network module 2814 may be a wireless communication device configured to exchange communications over a wireless data channel and a wireless voice channel. In this example, the network module 2814 may transmit alarm data over a wireless data channel and establish a two-way voice communication session over a wireless voice channel. The wireless communication device may include one or more of a LTE module, a GSM module, a radio modem, a cellular transmission module, or any type of module configured to exchange communications in one of the following formats: LTE, GSM or GPRS, CDMA, EDGE or EGPRS, EV-DO or EVDO, UMTS, or IP.

The network module 2814 also may be a wired communication module configured to exchange communications over the network 2805 using a wired connection. For instance, the network module 2814 may be a modem, a network interface card, or another type of network interface device. The network module 2814 may be an Ethernet network card configured to enable the control unit 2810 to communicate over a local area network and/or the Internet. The network module 2814 also may be a voice band modem configured to enable the alarm panel to communicate over the telephone lines of Plain Old Telephone Systems (POTS).

The control unit system that includes the control unit 2810 includes one or more sensors. For example, the monitoring system 2800 may include multiple sensors 2820. The sensors 2820 may include a lock sensor, a contact sensor, a motion sensor, or any other type of sensor included in a control unit system. The sensors 2820 also may include an environmental sensor, such as a temperature sensor, a water sensor, a rain sensor, a wind sensor, a light sensor, a smoke detector, a carbon monoxide detector, an air quality sensor, etc. The sensors 2820 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the property. The health monitoring sensor can collect various health data, including pulse, heart-rate, respiration rate, sugar or glucose level, bodily temperature, or motion data. The sensors 2820 can include a radio-frequency identification (RFID) sensor that identifies a particular article that includes a pre-assigned RFID tag.

The control unit 2810 communicates with the module 2822 and a camera 2830 to perform monitoring. The module 2822 is connected to one or more devices that enable property automation, e.g., home or business automation. For instance, the module 2822 may be connected to one or more lighting systems and may be configured to control operation of the one or more lighting systems. Also, the module 2822 may be connected to one or more electronic locks at the property and may be configured to control operation of the one or more electronic locks (e.g., control Z-Wave locks using wireless communications in the Z-Wave protocol). Further, the module 2822 may be connected to one or more appliances at the property and may be configured to control operation of the one or more appliances. The module 2822 may include multiple modules that are each specific to the type of device being controlled in an automated manner. The module 2822 may control the one or more devices based on commands received from the control unit 2810. For instance, the module 2822 may cause a lighting system to illuminate an area to provide a better image of the area when captured by a camera 2830. The camera 2830 can include one or more batteries 2831 that require charging.

A drone 2890 can be used to survey the electronic system 2800. In particular, the drone 2890 can capture images of each item found in the electronic system 2800 and provide images to the control unit 2810 for further processing. Alternatively, the drone 2890 can process the images to determine an identification of the items found in the electronic system 2800.

The camera 2830 may be a video/photographic camera or other type of optical sensing device configured to capture images. For instance, the camera 2830 may be configured to capture images of an area within a property monitored by the control unit 2810. The camera 2830 may be configured to capture single, static images of the area or video images of the area in which multiple images of the area are captured at a relatively high frequency (e.g., thirty images per second) or both. The camera 2830 may be controlled based on commands received from the control unit 2810.

The camera 2830 may be triggered by several different types of techniques. For instance, a Passive Infra-Red (PIR) motion sensor may be built into the camera 2830 and used to trigger the camera 2830 to capture one or more images when motion is detected. The camera 2830 also may include a microwave motion sensor built into the camera and used to trigger the camera 2830 to capture one or more images when motion is detected. The camera 2830 may have a "normally open" or "normally closed" digital input that can trigger capture of one or more images when external sensors (e.g., the sensors 2820, PIR, door/window, etc.) detect motion or other events. In some implementations, the camera 2830 receives a command to capture an image when external devices detect motion or another potential alarm event. The camera 2830 may receive the command from the controller 2812 or directly from one of the sensors 2820.

In some examples, the camera 2830 triggers integrated or external illuminators (e.g., Infra-Red, Z-wave controlled "white" lights, lights controlled by the module 2822, etc.) to improve image quality when the scene is dark. An integrated or separate light sensor may be used to determine if illumination is desired and may result in increased image quality.

The camera 2830 may be programmed with any combination of time/day schedules, system "arming state," or other variables to determine whether images should be captured or not when triggers occur. The camera 2830 may enter a low-power mode when not capturing images. In this case, the camera 2830 may wake periodically to check for inbound messages from the controller 2812. The camera 2830 may be powered by internal, replaceable batteries, e.g., if located remotely from the control unit 2810. The camera 2830 may employ a small solar cell to recharge the battery when light is available. The camera 2830 may be powered by the controller's 2812 power supply if the camera 2830 is co-located with the controller 2812.

In some implementations, the camera 2830 communicates directly with the monitoring application server 2860 over the Internet. In these implementations, image data captured by the camera 2830 does not pass through the control unit 2810 and the camera 2830 receives commands related to operation from the monitoring application server 2860.

The system 2800 also includes thermostat 2834 to perform dynamic environmental control at the property. The thermostat 2834 is configured to monitor temperature and/or energy consumption of an HVAC system associated with the thermostat 2834, and is further configured to provide control of environmental (e.g., temperature) settings. In some implementations, the thermostat 2834 can additionally or alternatively receive data relating to activity at a property and/or environmental data at a property, e.g., at various locations indoors and outdoors at the property. The thermostat 2834 can directly measure energy consumption of the HVAC system associated with the thermostat, or can estimate energy consumption of the HVAC system associated with the thermostat 2834, for example, based on detected usage of one or more components of the HVAC system associated with the thermostat 2834. The thermostat 2834 can communicate temperature and/or energy monitoring information to or from the control unit 2810 and can control the environmental (e.g., temperature) settings based on commands received from the control unit 2810.

In some implementations, the thermostat 2834 is a dynamically programmable thermostat and can be integrated with the control unit 2810. For example, the dynamically programmable thermostat 2834 can include the control unit 2810, e.g., as an internal component to the dynamically programmable thermostat 2834. In addition, the control unit 2810 can be a gateway device that communicates with the dynamically programmable thermostat 2834. In some implementations, the thermostat 2834 is controlled via one or more module 2822.

A module 2837 is connected to one or more components of an HVAC system associated with a property, and is configured to control operation of the one or more components of the HVAC system. In some implementations, the module 2837 is also configured to monitor energy consumption of the HVAC system components, for example, by directly measuring the energy consumption of the HVAC system components or by estimating the energy usage of the one or more HVAC system components based on detecting usage of components of the HVAC system. The module 2837 can communicate energy monitoring information and the state of the HVAC system components to the thermostat 2834 and can control the one or more components of the HVAC system based on commands received from the thermostat 2834.

In some examples, the system 2800 further includes one or more robotic devices 2890. The robotic devices 2890 may be any type of robots that are capable of moving and taking actions that assist in security monitoring. For example, the robotic devices 2890 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 2890 may be robotic devices 2890 that are intended for other purposes and merely associated with the system 2800 for use in appropriate circumstances. For instance, a robotic vacuum cleaner device may be associated with the monitoring system 2800 as one of the robotic devices 2890 and may be controlled to take action responsive to monitoring system events.

In some examples, the robotic devices 2890 automatically navigate within a property. In these examples, the robotic devices 2890 include sensors and control processors that guide movement of the robotic devices 2890 within the property. For instance, the robotic devices 2890 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 2890 may include control processors that process output from the various sensors and control the robotic devices 2890 to move along a path that reaches the desired destination and avoids obstacles. In this regard, the control processors detect walls or other obstacles in the property and guide movement of the robotic devices 2890 in a manner that avoids the walls and other obstacles.

In addition, the robotic devices 2890 may store data that describes attributes of the property. For instance, the robotic devices 2890 may store a floorplan and/or a three-dimensional model of the property that enables the robotic devices 2890 to navigate the property. During initial configuration, the robotic devices 2890 may receive the data describing attributes of the property, determine a frame of reference to the data (e.g., a property or reference location in the property), and navigate the property based on the frame of reference and the data describing attributes of the property. Further, initial configuration of the robotic devices 2890 also may include learning of one or more navigation patterns in which a user provides input to control the robotic devices 2890 to perform a specific navigation action (e.g., fly to an upstairs bedroom and spin around while capturing video and then return to a property charging base). In this regard, the robotic devices 2890 may learn and store the navigation patterns such that the robotic devices 2890 may automatically repeat the specific navigation actions upon a later request.

In some examples, the robotic devices 2890 may include data capture and recording devices. In these examples, the robotic devices 2890 may include one or more cameras, one or more motion sensors, one or more microphones, one or more biometric data collection tools, one or more temperature sensors, one or more humidity sensors, one or more air flow sensors, and/or any other types of sensor that may be useful in capturing monitoring data related to the property and users in the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 2890 to take and store a biometric sample that can be used to identify the person (e.g., a biometric sample with DNA that can be used for DNA testing).

In some implementations, the robotic devices 2890 may include output devices. In these implementations, the robotic devices 2890 may include one or more displays, one or more speakers, and/or any type of output devices that allow the robotic devices 2890 to communicate information to a nearby user.

The robotic devices 2890 also may include a communication module that enables the robotic devices 2890 to communicate with the control unit 2810, each other, and/or other devices. The communication module may be a wireless communication module that allows the robotic devices 2890 to communicate wirelessly. For instance, the communication module may be a Wi-Fi module that enables the robotic devices 2890 to communicate over a local wireless network at the property. The communication module further may be a 900 MHz wireless communication module that enables the robotic devices 2890 to communicate directly with the control unit 2810. Other types of short-range wireless communication protocols, such as Bluetooth, Bluetooth LE, Z-wave, Zigbee, etc., may be used to allow the robotic devices 2890 to communicate with other devices in the property. In some implementations, the robotic devices 2890 may communicate with each other or with other devices of the system 2800 through the network 2805.

The robotic devices 2890 further may include processor and storage capabilities. The robotic devices 2890 may include any suitable processing devices that enable the robotic devices 2890 to operate applications and perform the actions described throughout this disclosure. In addition, the robotic devices 2890 may include solid-state electronic storage that enables the robotic devices 2890 to store applications, configuration data, collected sensor data, and/or any other type of information available to the robotic devices 2890.

The robotic devices 2890 are associated with one or more charging stations. The charging stations may be located at predefined home base or reference locations in the property. The robotic devices 2890 may be configured to navigate to the charging stations after completion of tasks needed to be performed for the property monitoring system 2800. For instance, after completion of a monitoring operation or upon instruction by the control unit 2810, the robotic devices 2890 may be configured to automatically fly to and land on one of the charging stations. In this regard, the robotic devices 2890 may automatically maintain a fully charged battery in a state in which the robotic devices 2890 are ready for use by the property monitoring system 2800.

The charging stations may be contact based charging stations and/or wireless charging stations. For contact based charging stations, the robotic devices 2890 may have readily accessible points of contact that the robotic devices 2890 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 2890 may charge through a wireless exchange of power. In these cases, the robotic devices 2890 need only locate themselves closely enough to the wireless charging stations for the wireless exchange of power to occur. In this regard, the positioning needed to land at a predefined home base or reference location in the property may be less precise than with a contact based charging station. Based on the robotic devices 2890 landing at a wireless charging station, the wireless charging station outputs a wireless signal that the robotic devices 2890 receive and convert to a power signal that charges a battery maintained on the robotic devices 2890.

In some implementations, each of the robotic devices 2890 has a corresponding and assigned charging station such that the number of robotic devices 2890 equals the number of charging stations. In these implementations, the robotic devices 2890 always navigate to the specific charging station assigned to that robotic device. For instance, a first robotic device may always use a first charging station and a second robotic device may always use a second charging station.

In some examples, the robotic devices 2890 may share charging stations. For instance, the robotic devices 2890 may use one or more community charging stations that are capable of charging multiple robotic devices 2890. The community charging station may be configured to charge multiple robotic devices 2890 in parallel. The community charging station may be configured to charge multiple robotic devices 2890 in serial such that the multiple robotic devices 2890 take turns charging and, when fully charged, return to a predefined home base or reference location in the property that is not associated with a charger. The number of community charging stations may be less than the number of robotic devices 2890.

Also, the charging stations may not be assigned to specific robotic devices 2890 and may be capable of charging any of the robotic devices 2890. In this regard, the robotic devices 2890 may use any suitable, unoccupied charging station when not in use. For instance, when one of the robotic devices 2890 has completed an operation or is in need of battery charge, the control unit 2810 references a stored table of the occupancy status of each charging station and instructs the robotic device to navigate to the nearest charging station that is unoccupied.

The system 2800 further includes one or more integrated security devices 2880. The one or more integrated security devices may include any type of device used to provide alerts based on received sensor data. For instance, the one or more control units 2810 may provide one or more alerts to the one or more integrated security input/output devices 2880. Additionally, the one or more control units 2810 may receive sensor data from the sensors 2820 and determine whether to provide an alert to the one or more integrated security input/output devices 2880.

The system further includes a VIL module 285. The VIL module 285 can include any type of device that communicates data indicative of object detection to the one or more control units 2810 over the network 2805.

The sensors 2820, the module 2822, the camera 2830, the thermostat 2834, the integrated security devices 2880, and the VIL module 2895 may communicate with the controller 2812 over communication links 2824, 2826, 2828, 2832, 2838, 2884, 2886, and 2897. The communication links 2824, 2826, 2828, 2832, 2838, 2884, 2886, and 2897 may be a wired or wireless data pathway configured to transmit signals from the sensors 2820, the module 2822, the camera 2830, the thermostat 2834, the drone 2890, the integrated security devices 2880, and the VIL module 2895 to the controller 2812. The sensors 2820, the module 2822, the camera 2830, the thermostat 2834, the drone 2890, the integrated security devices 2880, and the VIL module 2895 may continuously transmit sensed values to the controller 2812, periodically transmit sensed values to the controller 2812, or transmit sensed values to the controller 2812 in response to a change in a sensed value. In some implementations, the drone 2890 can communicate with the monitoring application server 2860 over network 2805. The drone 2890 can connect and communicate with the monitoring application server 2860 using a Wi-Fi or a cellular connection.

The communication links 2824, 2826, 2828, 2832, 2838, 2884, 2886, and 2897 may include a local network. The sensors 2820, the module 2822, the camera 2830, the thermostat 2834, the drone 2890 the integrated security devices 2880, the VIL module 2895, and the controller 2812 may exchange data and commands over the local network. The local network may include 802.11 "Wi-Fi" wireless Ethernet (e.g., using low-power Wi-Fi chipsets), Z-Wave, Zigbee, Bluetooth, "HomePlug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 2860 is an electronic device configured to provide monitoring services by exchanging electronic communications with the control unit 2810, the one or more user devices 2840 and 2850, and the central alarm station server 2870 over the network 2805. For example, the monitoring application server 2860 may be configured to monitor events (e.g., alarm events) generated by the control unit 2810. In this example, the monitoring application server 2860 may exchange electronic communications with the network module 2814 included in the control unit 2810 to receive information regarding events (e.g., alerts) detected by the control unit 2810. The monitoring application server 2860 also may receive information regarding events (e.g., alerts) from the one or more user devices 2840 and 2850.

In some examples, the monitoring application server 2860 may route alert data received from the network module 2814 or the one or more user devices 2840 and 2850 to the central alarm station server 2870. For example, the monitoring application server 2860 may transmit the alert data to the central alarm station server 2870 over the network 2805.

The monitoring application server 2860 may store sensor and image data received from the monitoring system 2800 and perform analysis of sensor and image data received from the monitoring system 2800. Based on the analysis, the monitoring application server 2860 may communicate with and control aspects of the control unit 2810 or the one or more user devices 2840 and 2850.

The monitoring application server 2860 may provide various monitoring services to the system 2800. For example, the monitoring application server 2860 may analyze the sensor, image, and other data to determine an activity pattern of a resident of the property monitored by the system 2800. In some implementations, the monitoring application server 2860 may analyze the data for alarm conditions or may determine and perform actions at the property by issuing commands to one or more of the controls 2822, possibly through the control unit 2810.

The central alarm station server 2870 is an electronic device configured to provide alarm monitoring service by exchanging communications with the control unit 2810, the one or more mobile devices 2840 and 2850, and the monitoring application server 2860 over the network 2805. For example, the central alarm station server 2870 may be configured to monitor alerting events generated by the control unit 2810. In this example, the central alarm station server 2870 may exchange communications with the network module 2814 included in the control unit 2810 to receive information regarding alerting events detected by the control unit 2810. The central alarm station server 2870 also may receive information regarding alerting events from the one or more mobile devices 2840 and 2850 and/or the monitoring application server 2860.

The central alarm station server 2870 is connected to multiple terminals 2872 and 2874. The terminals 2872 and 2874 may be used by operators to process alerting events. For example, the central alarm station server 2870 may route alerting data to the terminals 2872 and 2874 to enable an operator to process the alerting data. The terminals 2872 and 2874 may include general-purpose computers (e.g., desktop personal computers, workstations, or laptop computers) that are configured to receive alerting data from a server in the central alarm station server 2870 and render a display of information based on the alerting data. For instance, the controller 2812 may control the network module 2814 to transmit, to the central alarm station server 2870, alerting data indicating that a sensor 2820 detected motion from a motion sensor via the sensors 2820. The central alarm station server 2870 may receive the alerting data and route the alerting data to the terminal 2872 for processing by an operator associated with the terminal 2872. The terminal 2872 may render a display to the operator that includes information associated with the alerting event (e.g., the lock sensor data, the motion sensor data, the contact sensor data, etc.) and the operator may handle the alerting event based on the displayed information.

In some implementations, the terminals 2872 and 2874 may be mobile devices or devices designed for a specific function. Although FIG. 28 illustrates two terminals for brevity, actual implementations may include more (and, perhaps, many more) terminals.

The one or more user devices 2840 and 2850 are devices that host and display user interfaces. For instance, the user device 2840 is a mobile device that hosts or runs one or more native applications (e.g., the smart property application 2842). The user device 2840 may be a cellular phone or a non-cellular locally networked device with a display. The user device 2840 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 2840 may perform functions unrelated to the monitoring system, such as placing personal telephone calls, playing music, playing video, displaying pictures, browsing the Internet, maintaining an electronic calendar, etc.

The user device 2840 includes a smart property application 2842. The smart property application 2842 refers to a software/firmware program running on the corresponding mobile device that enables the user interface and features described throughout. The user device 2840 may load or install the smart property application 2842 based on data received over a network or data received from local media. The smart property application 2842 runs on mobile devices platforms, such as iPhone, iPod touch, Blackberry, Google Android, Windows Mobile, etc. The smart property application 2842 enables the user device 2840 to receive and process image and sensor data from the monitoring system.

The user device 2850 may be a general-purpose computer (e.g., a desktop personal computer, a workstation, or a laptop computer) that is configured to communicate with the monitoring application server 2860 and/or the control unit 2810 over the network 2805. The user device 2850 may be configured to display a smart property user interface 2852 that is generated by the user device 2850 or generated by the monitoring application server 2860. For example, the user device 2850 may be configured to display a user interface (e.g., a web page) provided by the monitoring application server 2860 that enables a user to perceive images captured by the camera 2830 and/or reports related to the monitoring system. Although FIG. 28 illustrates two user devices for brevity, actual implementations may include more (and, perhaps, many more) or fewer user devices.

In some implementations, the one or more user devices 2840 and 2850 communicate with and receive monitoring system data from the control unit 2810 using the communication link 2838. For instance, the one or more user devices 2840 and 2850 may communicate with the control unit 2810 using various local wireless protocols such as Wi-Fi, Bluetooth, Z-wave, Zigbee, HomePlug (Ethernet over power line), or wired protocols such as Ethernet and USB, to connect the one or more user devices 2840 and 2850 to local security and automation equipment. The one or more user devices 2840 and 2850 may connect locally to the monitoring system and its sensors and other devices. The local connection may improve the speed of status and control communications because communicating through the network 2805 with a remote server (e.g., the monitoring application server 2860) may be significantly slower.

Although the one or more user devices 2840 and 2850 are shown as communicating with the control unit 2810, the one or more user devices 2840 and 2850 may communicate directly with the sensors and other devices controlled by the control unit 2810. In some implementations, the one or more user devices 2840 and 2850 replace the control unit 2810 and perform the functions of the control unit 2810 for local monitoring and long range/offsite communication.

In other implementations, the one or more user devices 2840 and 2850 receive monitoring system data captured by the control unit 2810 through the network 2805. The one or more user devices 2840, 2850 may receive the data from the control unit 2810 through the network 2805 or the monitoring application server 2860 may relay data received from the control unit 2810 to the one or more user devices 2840 and 2850 through the network 2805. In this regard, the monitoring application server 2860 may facilitate communication between the one or more user devices 2840 and 2850 and the monitoring system.

In some implementations, the one or more user devices 2840 and 2850 may be configured to switch whether the one or more user devices 2840 and 2850 communicate with the control unit 2810 directly (e.g., through link 2838) or through the monitoring application server 2860 (e.g., through network 2805) based on a location of the one or more user devices 2840 and 2850. For instance, when the one or more user devices 2840 and 2850 are located close to the control unit 2810 and in range to communicate directly with the control unit 2810, the one or more user devices 2840 and 2850 use direct communication. When the one or more user devices 2840 and 2850 are located far from the control unit 2810 and not in range to communicate directly with the control unit 2810, the one or more user devices 2840 and 2850 use communication through the monitoring application server 2860.

Although the one or more user devices 2840 and 2850 are shown as being connected to the network 2805, in some implementations, the one or more user devices 2840 and 2850 are not connected to the network 2805. In these implementations, the one or more user devices 2840 and 2850 communicate directly with one or more of the monitoring system components and no network (e.g., Internet) connection or reliance on remote servers is needed.

In some implementations, the one or more user devices 2840 and 2850 are used in conjunction with only local sensors and/or local devices in a house. In these implementations, the system 2800 includes the one or more user devices 2840 and 2850, the sensors 2820, the module 2822, the camera 2830, and the robotic devices, e.g., that can include the drone 2890. The one or more user devices 2840 and 2850 receive data directly from the sensors 2820, the module 2822, the camera 2830, and the robotic devices and send data directly to the sensors 2820, the module 2822, the camera 2830, and the robotic devices. The one or more user devices 2840, 2850 provide the appropriate interfaces/processing to provide visual surveillance and reporting.

In other implementations, the system 2800 further includes network 2805 and the sensors 2820, the module 2822, the camera 2830, the thermostat 2834, and the robotic devices are configured to communicate sensor and image data to the one or more user devices 2840 and 2850 over network 2805 (e.g., the Internet, cellular network, etc.). In yet another implementation, the sensors 2820, the module 2822, the camera 2830, the thermostat 2834, and the robotic devices are intelligent enough to change the communication pathway from a direct local pathway when the one or more user devices 2840 and 2850 are in close physical proximity to the sensors 2820, the module 2822, the camera 2830, the thermostat 2834, and the robotic devices to a pathway over network 2805 when the one or more user devices 2840 and 2850 are farther from the sensors 2820, the module 2822, the camera 2830, the thermostat 2834, and the robotic devices. In some examples, the system leverages GPS information from the one or more user devices 2840 and 2850 to determine whether the one or more user devices 2840 and 2850 are close enough to the sensors 2820, the module 2822, the camera 2830, the thermostat 2834, and the robotic devices to use the direct local pathway or whether the one or more user devices 2840 and 2850 are far enough from the sensors 2820, the module 2822, the camera 2830, the thermostat 2834, and the robotic devices that the pathway over network 2805 is required. In other examples, the system leverages status communications (e.g., pinging) between the one or more user devices 2840 and 2850 and the sensors 2820, the module 2822, the camera 2830, the thermostat 2834, and the robotic devices to determine whether communication using the direct local pathway is possible. If communication using the direct local pathway is possible, the one or more user devices 2840 and 2850 communicate with the sensors 2820, the module 2822, the camera 2830, the thermostat 2834, and the robotic devices using the direct local pathway. If communication using the direct local pathway is not possible, the one or more user devices 2840 and 2850 communicate with the sensors 2820, the module 2822, the camera 2830, the thermostat 2834, and the robotic devices using the pathway over network 2805.

In some implementations, the system 2800 provides end users with access to images captured by the camera 2830 to aid in decision-making. The system 2800 may transmit the images captured by the camera 2830 over a wireless WAN network to the user devices 2840 and 2850. Because transmission over a wireless WAN network may be relatively expensive, the system 2800 can use several techniques to reduce costs while providing access to significant levels of useful visual information (e.g., compressing data, downsampling data, sending data only over inexpensive LAN connections, or other techniques).

In some implementations, a state of the monitoring system 2800 and other events sensed by the monitoring system 2800 may be used to enable/disable video/image recording devices (e.g., the camera 2830). In these implementations, the camera 2830 may be set to capture images on a periodic basis when the alarm system is armed in an "away" state, but set not to capture images when the alarm system is armed in a "stay" state or disarmed. In addition, the camera 2830 may be triggered to begin capturing images when the alarm system detects an event, such as an alarm event, a door-opening event for a door that leads to an area within a field of view of the camera 2830, or motion in the area within the field of view of the camera 2830. In other implementations, the camera 2830 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:
maintaining, for a field of view of a camera, a region that is in the field of view and comprises a plurality of lines;
for each of one or more lines in the plurality of lines included in the region:
determining whether an object depicted in a sequence of images captured by the camera both intersects the line and has a height that satisfies height criteria, the intersection of the line by the object having a height that satisfies the height criteria indicating that the line is activated;
in response to determining, for at least one of the lines in the plurality of lines, that an object depicted in the sequence of images both intersects the line and has a height that satisfies the height criteria:
determining data indicating which lines of the plurality of lines were activated;
detecting an order in which at least one of the lines were activated using times at which the object intersected at least one of the lines from the plurality of lines; and
determining, from a plurality of event types, a first event type that likely occurred using (i) the data indicating which lines of the plurality of lines were activated and (ii) the order in which the at least one of the lines were activated;
in response to determining the first event type that likely occurred, selecting, from a plurality of actions each of which correspond to an event type from the plurality of event types, one or more actions for the first event type; and
performing the one or more actions using at least some of the data.

2. The computer-implemented method of claim 1, further comprising:
prior to maintaining the region that is in the field of view, performing calibration of the camera, comprising:
identifying a first mat and a second mat depicted in the region in the field of view, the first and second mat displaying a visible pattern that aid the camera to detect a location of the first mat and the second mat;
detecting the visible pattern on the first mat and the second mat in the field of view;
estimating physical locations of the visible pattern on the first mat and the second mat using the detected visible pattern;
in response to estimating the physical locations of the visible pattern, determining camera parameters of the camera using the estimated physical locations of the visible pattern on the first mat and the second mat, wherein the camera parameters comprise one or more of a focal length, a tilt angle, and a roll angle;
obtaining second image data from the camera; and
validating, using the obtained second image data, the camera parameters and the physical locations of the visible pattern.

3. The computer-implemented method of claim 1, wherein maintaining the region that is in the field of view further comprises:
obtaining initial image data from the camera;
projecting one or more identifiers in the initial image data;

determining, for each of the one or more projected identifiers in the initial image data, a location of the region in which the identifier is depicted;

generating, for each of the locations of the one or more projected identifiers in the region, an initial line of a plurality of initial lines in the initial image data with respect to the locations of the one or more projected identifiers at the region;

determining a respective projected ground level plane in the initial image data; and determining a first line from the plurality of lines by projecting the initial line of the plurality of initial lines onto the respective projected ground level plane in the region in the image data.

4. The computer-implemented method of claim 1, wherein:

determining the lines that were activated based on whether the object that satisfies the height criteria is detected in the lines further comprises:

identifying (i) one or more first distinctive features along a first image plane of one or more lines of the plurality of lines from a first camera of two or more cameras and (ii) one or more second distinctive features along a second image plane of one or more lines of the plurality of lines from a second camera of the two or more cameras;

matching the one or more first distinctive features along the first image plane from the first camera to at least some of the one or more second distinctive features along the second image plane from the second camera;

estimating a plurality of cross sectional outlines of an object that intersected with the plurality of lines using the matched first distinctive features and the matched second distinctive features, wherein the plurality of cross sectional outlines comprise a height and a width of the object that intersected with the plurality of lines;

determining, for each cross sectional outline of the plurality of cross sectional outlines of the object, whether the cross sectional outline satisfies the height criteria; and in response to determining at least some of the cross sectional outlines of the object satisfy the height criteria, the method comprises identifying the lines of the plurality of lines intersected by the object as activated.

5. The computer-implemented method of claim 4, further comprising:

in response to determining at least some of the cross sectional outlines of the object satisfy the height criteria, identifying a type of the object that intersected with the lines that were activated;

in response to identifying the type of the object that intersected with the lines that were activated:

determining, using the type of the object, whether to open a security gate; and in response to determining to open the security gate, transmitting a notification to a security gate causing the security gate to open that allows passage of the object; or in response to determining to not open the security gate, transmitting a notification to the security gate causing the security gate to remain closed to prevent passage of the object.

6. The computer-implemented method of claim 4, wherein identifying the one or more first and second distinctive features comprises one or more of identifying a change in light intensity along the first image plane and the second image plane, a change in color along the first image plane and the second image plane, a predetermined length of a particular intensity along the first image plane and the second image plane, and a predetermined length of a particular color along the first image plane and the second image plane.

7. The computer-implemented method of claim 4, further comprising determining a three-dimensional outline of the object by analyzing a speed of the object that intersected the lines that were activated, wherein determining whether the event likely occurred uses the three-dimensional outline of the object.

8. The computer-implemented method of claim 7, wherein analyzing the speed of the object further comprises:

determining an amount of time taken by the object to move between a first line and a subsequent second line of the lines that were activated;

determining a distance between each cross sectional outline of the plurality of cross sectional outlines;

determining the speed of the object using (i) the amount of time taken by the object to move between the first line and the subsequent second line of the lines that were activated and (ii) the distance between each cross sectional outline of the plurality of cross sectional outlines; and determining the three-dimensional outline of the object using the distance between each cross sectional outline of the plurality of cross sectional outlines and the speed of the object.

9. The computer-implemented method of claim 1, wherein determining the first event type that likely occurred using (i) the data indicating which lines of the plurality of lines were activated and (ii) the order in which the at least one of the lines that were activated further comprises:

determining to track the object;

in response to determining to track the object, assigning a unique track-ID associated with the object over a course of a traversal of the object through each line of the plurality of lines; and during the tracking, detecting one or more events that occurred associated with the object.

10. The computer-implemented method of claim 9, wherein the one or more events include at least one of (i) detecting tailgating between two vehicles traversing over the plurality of lines, (ii) detecting a vehicle moving in a wrong direction while traversing over the plurality of lines, (iii) detecting an oversized vehicle, or (iv) detecting a vehicle traveling in excess speed over the plurality of lines.

11. The computer-implemented method of claim 9, wherein performing the one or more actions using at least some of the data comprises:

in response to detecting the one or more events that occurred associated with the object, identifying, using at least some of the data, a frame of image data that illustrates the detected event; and providing the frame of image data to a trained machine-learning model to verify that the detected event was properly detected.

12. The computer-implemented method of claim 1, further comprises:

obtaining image data from a first camera and a second camera, wherein obtaining the image data from the first camera and the second camera comprises synchronizing the image data obtained by the first camera and the second camera, the first camera and the second camera monitoring the region.

13. The computer-implemented method of claim 1, further comprising detecting whether the object is depicted crossing one or more lines from the plurality of lines.

14. The computer-implemented method of claim 1, comprising setting the plurality of lines spaced apart by a distance that satisfies a distance threshold further comprising setting the distance between each line of the plurality of lines by at least a predetermined distance apart.

15. A system comprising:
one or more computers and one or more storage devices storing instructions that are operable, when executed by the one or more computers, to cause the one or more computers to perform operations comprising:
   maintaining, for a field of view of a camera, a region that is in the field of view and comprises a plurality of lines;
   for each of one or more lines in the plurality of lines included in the region:
      determining whether an object depicted in a sequence of images captured by the camera both intersects the line and has a height that satisfies height criteria, the intersection of the line by the object having a height that satisfies the height criteria indicating that the line is activated;
   in response to determining, for at least one of the lines in the plurality of lines, that an object depicted in the sequence of images both intersects the line and has a height that satisfies the height criteria;
      determining data indicating which lines of the plurality of lines were activated;
      detecting an order in which at least one of the lines were activated using times at which the object intersected at least one of the lines from the plurality of lines; and
      determining, from a plurality of event types, a first event type that likely occurred using (i) the data indicating which lines of the plurality of lines were activated and (ii) the order in which the at least one of the lines were activated;
   in response to determining the first event type that likely occurred, selecting, from a plurality of actions each of which correspond to an event type from the plurality of event types, one or more actions for the first event type; and
   performing the one or more actions using at least some of the data.

16. The system of claim 15, further comprising:
prior to maintaining the region that is in the field of view, performing calibration of the camera, comprising:
   identifying a first mat and a second mat depicted in the region in the field of view, the first and second mat displaying a visible pattern that aid the camera to detect a location of the first mat and the second mat;
   detecting the visible pattern on the first mat and the second mat in the image data field of view;
   estimating physical locations of the visible pattern on the first mat and the second mat using the detected visible pattern;
   in response to estimating the physical locations of the visible pattern, determining camera parameters of the camera using the estimated physical locations of the visible pattern on the first mat and the second mat, wherein the camera parameters comprise one or more of a focal length, a tilt angle, and a roll angle;
   obtaining second image data from the camera; and
   validating, using the obtained second image data, the camera parameters and the physical locations of the visible pattern.

17. The system of claim 15, wherein identifying maintaining the region in the field of view further comprises:
   obtaining initial image data from the camera;
   projecting one or more identifiers in the initial image data;
   determining, for each of the one or more projected identifiers in the initial image data, a location of the region in which the identifier is depicted;
   generating, for each of the locations of the one or more projected identifiers in the region, an initial line of a plurality of initial lines in the initial image data with respect to the locations of the one or more projected identifiers at the region;
   determining a respective projected ground level plane in the initial image data; and
   determining a first line from the plurality of lines by projecting the initial line of the plurality of initial lines onto the respective projected ground level plane in the region in the image data.

18. The system of claim 15, wherein:
determining the lines that were activated based on whether the object that satisfies the height criteria is detected in the lines further comprises:
   identifying (i) one or more first distinctive features along a first image plane of one or more lines of the plurality of lines from a first camera of two or more cameras and (ii) one or more second distinctive features along a second image plane of one or more lines of the plurality of lines from a second camera of the two or more cameras;
   matching the one or more first distinctive features along the first image plane from the first camera to at least some of the one or more second distinctive features along the second image plane from the second camera;
   estimating a plurality of cross sectional outlines of an object that intersected with the plurality of lines using the matched first distinctive features and the matched second distinctive features, wherein the plurality of cross sectional outlines comprise a height and a width of the object that intersected with the plurality of lines;
   determining, for each cross sectional outline of the plurality of cross sectional outlines of the object, whether the cross sectional outline satisfies the height criteria; and
   in response to determining at least some of the cross sectional outlines of the object satisfy the height criteria, the operations comprise identifying the lines of the plurality of lines intersected by the object as activated.

19. The system of claim 18, further comprising:
in response to determining at least some of the cross sectional outlines of the object satisfy the height criteria, identifying a type of the object that intersected with the lines that were activated;
in response to identifying the type of the object that intersected with the lines that were activated:
   determining, using the type of the object, whether to open a security gate; and
   in response to determining to open the security gate, transmitting a notification to a security gate causing the security gate to open that allows passage of the object; or in response to determining to not open the security gate, transmitting a notification to the security gate causing the security gate to remain closed to prevent passage of the object.

20. A non-transitory computer-readable medium storing software comprising instructions executable by one or more computers which, upon such execution, cause the one or more computers to perform operations comprising:

maintaining, for a field of view of a camera, a region that is in the field of view and comprises a plurality of lines;

for each of one or more lines in the plurality of lines included in the region:

determining whether an object depicted in a sequence of images captured by the camera both intersects the line and has a height that satisfies height criteria, the intersection of the line by the object having a height that satisfies the height criteria indicating that the line is activated;

in response to determining, for at least one of the lines in the plurality of lines, that an object depicted in the sequence of images both intersects the line and has a height that satisfies the height criteria:

determining data indicating which lines of the plurality of lines were activated;

detecting an order in which at least one of the lines were activated using times at which the object intersected at least one of the lines from the plurality of lines; and determining, from a plurality of event types, a first event type that likely occurred using (i) the data indicating which lines of the plurality of lines were activated and (ii) the order in which the at least one of the lines were activated;

in response to determining the first event type that likely occurred, selecting, from a plurality of actions each of which correspond to an event type from the plurality of event types, one or more actions for the first event type; and performing the one or more actions using at least some of the data.

* * * * *